US012748506B2

(12) United States Patent
Mizuhashi et al.

(10) Patent No.: US 12,748,506 B2
(45) Date of Patent: Sep. 29, 2026

(54) DISPLAY

(71) Applicant: Wacom Co., Ltd., Saitama (JP)

(72) Inventors: Hiroshi Mizuhashi, Saitama (JP); Joo Hoon Lee, Saitama (JP); Fumitaka Goto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/292,175

(22) Filed: Aug. 6, 2025

(65) Prior Publication Data

US 2025/0362770 A1 Nov. 27, 2025

Related U.S. Application Data

(63) Continuation of application No. PCT/JP2024/017583, filed on May 13, 2024.

(30) Foreign Application Priority Data

Jun. 1, 2023 (JP) ................................ 2023-090702

(51) Int. Cl.
*G06F 3/041* (2006.01)
*G06F 3/044* (2006.01)
*G06F 3/046* (2006.01)

(52) U.S. Cl.
CPC ........ *G06F 3/04164* (2019.05); *G06F 3/0412* (2013.01); *G06F 3/04166* (2019.05); (Continued)

(58) Field of Classification Search
CPC ........... G06F 3/044–0448; G06F 3/046; G06F 3/0416–04186
See application file for complete search history.

(56) References Cited

U.S. PATENT DOCUMENTS 10,739,889 B2 8/2020 Hwang et al.
11,462,597 B2 10/2022 Gwon et al.
(Continued)

FOREIGN PATENT DOCUMENTS

JP 2018022226 A 2/2018
JP 2019035842 A 3/2019
(Continued)

OTHER PUBLICATIONS

International Search Report mailed Jul. 30, 2024, for International Application No. PCT/JP2024/017583. (5 pages).
(Continued)

*Primary Examiner* — Patrick F Marinelli
(74) *Attorney, Agent, or Firm* — Seed Intellectual Property Law Group LLP

(57) ABSTRACT

A display is provided which is capable of detecting positions of both a finger and an electromagnetic resonance pen. The display includes a display layer including a group of light-emitting elements disposed in a display area and a group of pixel drive circuits for turning on and off the light-emitting elements, an encapsulation layer encapsulating the display layer, a group of linear electrodes disposed on the encapsulation layer, and a group of routing paths having ends connected to the linear electrodes. A switching circuit is disposed in the display layer within the display area and is connected to other ends of the routing paths, for switching between a first mode in which the linear electrodes are used to detect induced currents and a second mode in which the linear electrodes are used to detect capacitances.

18 Claims, 38 Drawing Sheets

(52) U.S. Cl.
CPC .......... *G06F 3/0445* (2019.05); *G06F 3/0446* (2019.05); *G06F 3/046* (2013.01); *G06F 2203/04106* (2013.01); *G06F 2203/04111* (2013.01); *G06F 2203/04114* (2019.05)

(56) References Cited

U.S. PATENT DOCUMENTS 11,656,729 B2 * 5/2023 Park .................... G06F 3/04164 345/174
12,079,421 B2 * 9/2024 Lim .................... G06F 3/04166
12,236,037 B2 * 2/2025 Gao ...................... G06F 3/0412
12,474,801 B1 * 11/2025 Vaze .................. G06F 3/04166
2004/0155871 A1 8/2004 Perski et al.
2012/0154327 A1 * 6/2012 Liu ......................... G06F 3/042 345/173
2012/0327040 A1 * 12/2012 Simon ................ G06F 3/03545 345/179
2013/0113743 A1 * 5/2013 Han ....................... G06F 3/046 345/173
2014/0071082 A1 3/2014 Singh et al.
2014/0078104 A1 * 3/2014 Lee ....................... G06F 3/0446 345/174
2015/0015536 A1 * 1/2015 Chang .................. G06F 3/0412 345/174
2015/0097808 A1 4/2015 Roh et al.
2016/0041677 A1 * 2/2016 Tahara ............... G06F 3/04166 345/174
2016/0195946 A1 * 7/2016 Ahn ...................... G06F 3/0446 345/173
2016/0246399 A1 8/2016 Huang et al.
2017/0277297 A1 9/2017 Li et al.
2018/0032205 A1 * 2/2018 Katsuta ................ G06F 3/0416
2018/0095571 A1 * 4/2018 Park ...................... G06F 3/0412
2019/0324580 A1 10/2019 Tanaka
2020/0026390 A1 1/2020 Gwon et al.
2022/0091686 A1 * 3/2022 Nomura ............... G06F 3/0446
2023/0049665 A1 * 2/2023 Lim .................... G06F 3/04166
2023/0214053 A1 * 7/2023 Lim .................... G06F 3/04166 345/174
2023/0367413 A1 * 11/2023 Gao ........................ G06F 3/044
2024/0385716 A1 * 11/2024 Lim .................... G06F 3/04166
2025/0315139 A1 * 10/2025 Mizuhashi ........... G01D 5/2208
2025/0362770 A1 * 11/2025 Mizuhashi .......... G06F 3/04164

FOREIGN PATENT DOCUMENTS

JP 2019191212 A 10/2019
WO 2014014493 A1 1/2014

OTHER PUBLICATIONS

Written Opinion of the International Searching Authority mailed Jul. 30, 2024, for International Application No. PCT/JP2024/017583. (5 pages).

* cited by examiner

STYLUS DETECTION (EMR PROCESS)

FINGER DETECTION (CAPACITANCE PROCESS)

FINGER DETECTION (CAPACITANCE PROCESS)

STYLUS DETECTION (EMR PROCESS)

FINGER DETECTION (CAPACITANCE PROCESS)

STYLUS DETECTION (EMR PROCESS)

STYLUS DETECTION (EMR PROCESS) 2

STYLUS DETECTION (EMR PROCESS) 1

STYLUS DETECTION (EMR PROCESS) 1-2

STYLUS DETECTION (EMR PROCESS) 1-1

STYLUS DETECTION (EMR PROCESS) 2-2

STYLUS DETECTION (EMR PROCESS) 2-1

STYLUS DETECTION (EMR PROCESS) 1-2

STYLUS DETECTION (EMR PROCESS) 1-1

STYLUS DETECTION (EMR PROCESS) 2-2

STYLUS DETECTION (EMR PROCESS) 2-1

DISPLAY

BACKGROUND OF THE INVENTION

1. Field of the Invention

The present disclosure relates to a display and more particularly to a display based on the on-cell touch technology.

2. Description of the Related Art

Recent years have seen growing attention to a technology (hereinafter referred to as an "on-cell touch technology") in which a group of linear electrodes used to detect a position of a finger on a touch panel is disposed on the upper surface of a display. For example, according to the on-cell touch technology related to organic electroluminescence (EL) displays, a group of linear electrodes is formed on the upper surface of an encapsulation layer that encapsulates a display layer, i.e., a layer on which light-emitting elements and pixel drive circuits are disposed. U.S. Pat. Nos. 10,739,889 and 11,462,597 disclose examples of the on-cell touch technology.

The inventors of the present invention have been working on detecting a position of an electromagnetic resonance stylus by way of an electromagnetic resonance sensing method in addition to detecting a position of a finger by way of a capacitance sensing method. This case needs switching circuits for applying voltages to detect capacitances and for supplying currents to detect electromagnetic resonance currents in a time-division multiplex fashion. It has heretofore been customary to place the switching circuits in a bezel area A2, i.e., an area outside a display area, or in a sensor controller that includes integrated circuits for applying voltages and supplying currents to a group of touch electrodes. According to the former approach, however, the switching circuits present an obstacle to attempts to reduce the size of the bezel area. The latter design tends to increase the circuit scale of the sensor controller.

SUMMARY OF THE INVENTION

Therefore, according to one aspect, a display is provided that is capable of detecting the positions of both a finger and an electromagnetic resonance stylus with respect to the display without presenting an obstacle to attempts to reduce the size of a bezel area thereof, also without involving an increase in the circuit scale of a sensor controller of the display.

Circuits for applying voltages and supplying currents to a group of linear electrodes, i.e., drive circuits for a group of linear electrodes, usually need to include complementary metal-oxide-semiconductors (CMOS) in their output stages. Metal-oxide semiconductor field effect transistors (MOSFETs), which constitute pixel drive circuits of displays, are generally of either the P-channel type or the N-channel type. Consequently, a process such as ion implantation would be required for the sole purpose of putting the drive circuits for a group of linear electrodes in a display layer of a display, resulting in an increase in the cost of the display.

Therefore, according to another aspect, a display is provided that is capable of avoiding an increase in the cost thereof, while its drive circuits for a group of linear electrodes are disposed in a display layer of the display.

In accordance with an aspect of the present invention, there is provided a display including a display layer including a group of light-emitting elements disposed in a display area and a group of pixel drive circuits for turning on and off the light-emitting elements, an encapsulation layer encapsulating the display layer, a group of linear electrodes disposed on the encapsulation layer, a group of routing paths having ends connected to the linear electrodes, and a switching circuit disposed in the display layer within the display area and connected to other ends of the routing paths, for switching between a first mode in which the linear electrodes are used to detect induced currents and a second mode in which the linear electrodes are used to detect capacitances.

In accordance with another aspect of the present invention, there is provided a display including a display layer including a group of light-emitting elements disposed in a display area and a group of pixel drive circuits for turning on and off the light-emitting elements, a group of linear electrodes superposed on the display layer, and a group of drive circuits disposed in the display layer for driving the linear electrodes, in which each of the drive circuits includes one or more MOSFETs of one type.

According to the aspect of the present invention, since the switching circuit is disposed in the display layer within the display area, attempts to reduce the size of a bezel area are not obstructed and the circuit scale of the sensor controller is prevented from increasing while, at the same time, the positions of both a finger and an electromagnetic resonance stylus can be detected.

According to the other aspect of the present invention, since all of the drive circuits disposed in the display layer for driving the linear circuits are constructed of MOSFETs of the same channel type, the cost of manufacturing the display can be prevented from increasing while the drive circuits for driving the linear electrodes are disposed in the display layer.

DETAILED DESCRIPTION OF THE PREFERRED EMBODIMENTS

Preferred embodiments of the present disclosure will be described in detail below with reference to the accompanying drawings.

Figure 1:
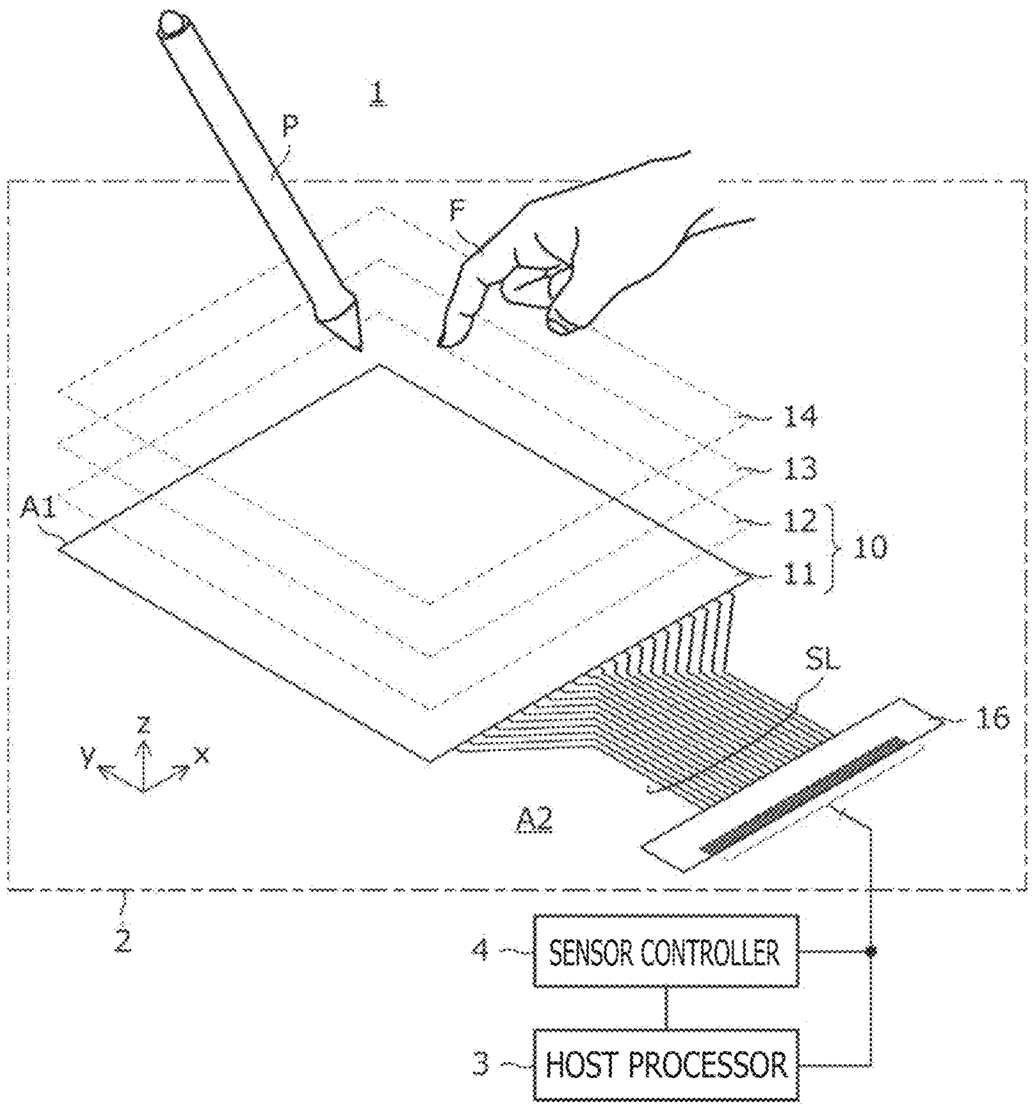
FIG. 1 is a perspective view, partly in block form, of a computer according to a first embodiment of the present disclosure.

FIG. 1 illustrates in perspective a computer 1 according to a first embodiment of the present disclosure. As illustrated in FIG. 1, the computer 1 according to the first embodiment has an organic EL display 2, a host processor 3, and a sensor controller 4. Although the principles of the present disclosure will be described as being applied to the computer 1 including the organic EL display 2 according to the first embodiment, the principles of the present disclosure are also applicable to other types of displays including a liquid crystal display, for example.

The organic EL display 2 has a panel surface that is illustrated as an upper surface as viewed in perspective in FIG. 1. As illustrated in FIG. 1, the organic EL display 2 is of a layered structure including a circuit layer 11, an organic EL layer 12, an encapsulation layer 13, and a sensor layer 14 that are successively stacked in this order from a lower side remote from the panel surface. The circuit layer 11 and the organic EL layer 12 jointly make up a display layer 10 that incorporates therein various components, such as light-emitting elements 30 and pixel drive circuits 35 to be described later, for performing the display function of the organic EL display 2. The sensor layer 14 incorporates therein various components, such as linear electrodes 52 and 53 to be described later, for detecting the positions of an electromagnetic resonance stylus P and a finger E on the panel surface.

As illustrated in FIG. 1, the organic EL display 2 includes a display area A1 and a bezel area A2 disposed outside and surrounding the display area A1. The bezel area A2 contains a plurality of lines or interconnects SL and a terminal area 16 supporting a plurality of terminals thereon. The lines SL electrically connect circuits, lines, and electrodes disposed in the circuit layer 11, the organic EL layer 12, and the sensor layer 14 to the terminals on the terminal area 16. For the sake of brevity, only some of the lines SL that are actually provided in the organic EL display 2 are illustrated in FIG. 1. The terminals on the terminal area 16 are electrically connected to the host processor 3 or the sensor controller 4 via lines disposed outside the organic EL display 2.

Figure 2:
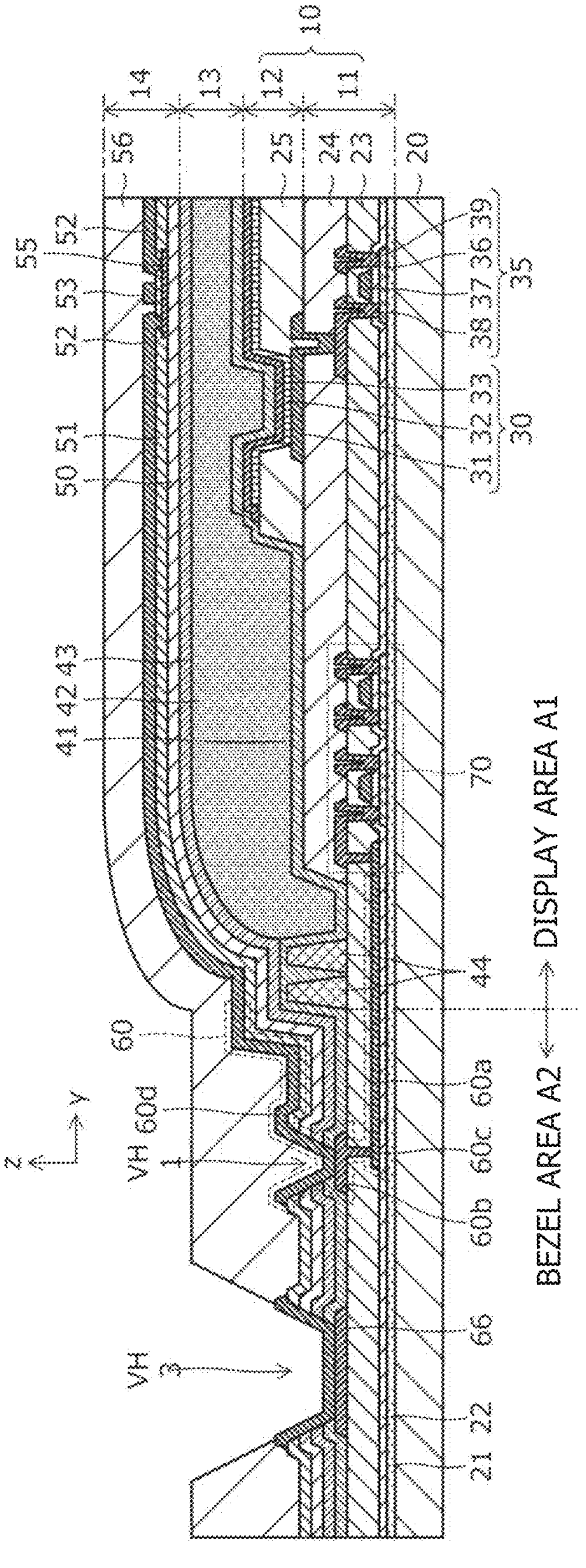
FIG. 2 is an enlarged cross-sectional view of an organic EL display, taken along line A-A of FIG. 3.

FIG. 2 illustrates the organic EL display 2 in cross section, taken along line A-A of FIG. 3 to be described later. As FIG. 2 is a schematic cross-sectional view illustrating structural details for an easier understanding of the organic EL display 2, the structural details illustrated in FIG. 2 may not necessarily be in agreement with those illustrated in FIG. 3. This also holds true for FIGS. 7 and 8 to be described later. As illustrated in FIG. 2, the circuit layer 11, the organic EL layer 12, the encapsulation layer 13, and the sensor layer 14 are successively stacked in this order on the upper face side of a substrate 20. The structure of the organic EL display 2 will briefly be described below with reference to FIG. 2.

The circuit layer 11 refers to a layer including a matrix of pixel drive circuits 35 and is made up of a buffer layer 21, a gate insulating film 22, an interlayer insulating film 23, and a planarizing insulating film 24. The pixel drive circuits 35 act as active elements associated with respective pixels of the organic EL display 2. The pixels are arranged in a two-dimensional matrix in which the pixels are arrayed in rows and columns. Specifically, each of the pixel drive circuits 35 includes a P-channel MOSFET. Each of the pixel drive circuits 35 includes a semiconductor layer 36 that provides a channel region, a gate electrode 37 disposed over the semiconductor layer 36 with the gate insulating film 22 interposed therebetween, a drain electrode 38, and a source electrode 39. Each of the drain electrode 38 and the source electrode 39 includes a via conductor having a lower end held in contact with the semiconductor layer 36 and an electric conductor disposed on the upper surface of the interlayer insulating film 23.

Although not depicted, the circuit layer 11 further has a plurality of gate lines extending along the rows of pixels and a plurality of data lines extending along the columns of pixels. The gate lines are electrically connected in common to the respective gate electrodes 37 of those pixel drive circuits 35 that are disposed along the corresponding rows. The data lines are electrically connected in common to the respective source electrodes 39 of those pixel drive circuits 35 that are disposed along the corresponding columns. The gate lines and the data lines are electrically connected to the host processor 3 through the lines SL illustrated in FIG. 1.

The organic EL layer 12 represents a layer including a matrix of light-emitting elements 30, i.e., a group of light-emitting elements, and is made up of an anode electrode 31, a bank layer 25, a light-emitting layer 32, and a cathode electrode 33 successively stacked in this order from the substrate 20. The anode electrode 31 includes an electrically conductive film disposed on the upper surface of the planarizing insulating film 24, and includes separate sections associated respectively with the pixels. The planarizing insulating film 24 has via holes defined therein at respective positions where the drain electrodes 38 of the respective pixel drive circuits 35 are exposed. The separate sections of the anode electrode 31 are held in contact with the drain electrodes 38 of the corresponding pixel drive circuits 35 through its portions formed in the via holes.

The bank layer 25 includes an insulating film provided to separate adjacent ones of the pixels and increase the light extraction efficiency with which to extract light from the light-emitting layer 32. The light-emitting layer 32 includes a thin film of an organic material having such a property as to emit light when it is supplied with an electric current. The organic material of the light-emitting layer 32 has a specific composition selected to emit light in a preset color from each of the pixels. The bank layer 25 has via holes defined therein at respective positions where the separate sections of the anode electrode 31 of the respective pixel drive circuits 35 are exposed. The light-emitting layer 32 is held in contact with the corresponding separate sections of the anode electrode 31 through its portions formed in the via holes.

The cathode electrode 33 includes an electrically conductive film disposed on the upper surface of the light-emitting layer 32 and is shared by the pixels. Although not depicted, the organic EL layer 12 has ground lines that are supplied with a ground potential through the lines SL illustrated in FIG. 1. The cathode electrode 33 is electrically connected to the ground lines. A structure in which the anode electrode 31 and the cathode electrode 33 sandwich the light-emitting layer 32 therebetween is disposed in the position of each of the pixels, providing one of the light-emitting elements 30.

Operation of the light-emitting elements 30 and the pixel drive circuits 35 will briefly be described below. The host processor 3 generates video signals and drives the gate lines and the data lines on the basis of the generated video signals by executing programs stored in a memory, not depicted. Specifically, on the basis of the generated video signals, the host processor 3 determines luminance values for respective pixels arrayed along a gate line, activates the gate line along which the pixels are arrayed, and supplies data lines with drive currents representing the determined luminance values for the pixels along the activated gate line. The host processor 3 repeats the above process while switching from one gate line to another for activation.

When the gate line is activated by the host processor 3, the pixel drive circuits 35 arrayed in the row along the gate line are simultaneously turned on, connecting the anode electrodes 31 of the corresponding light-emitting elements 30 to those data lines that are connected to the pixel drive circuits 35. Then, the host processor 3 supplies voltages depending on the luminance values for the pixels associated with the pixel drive circuits 35 to the respective data lines, enabling the light-emitting elements 30 arrayed along the row to emit light simultaneously. In this fashion, the organic EL display 2 displays an image based on the video signals.

As illustrated in FIG. 2, the encapsulation layer 13 represents a layer for protecting the light-emitting layer 32 from external water and oxygen, and is disposed to cover the display area A1 in its entirety. The encapsulation layer 13 includes a stack of an inorganic layer 41 of glass or metal, for example, an organic layer 42 of polymer, for example, and an inorganic layer 43 of glass or metal, for example, that are successively layered in this order from the substrate 20. The display area A1 includes dams 44 in its peripheral edge portion as an insulating film for preventing the encapsulation layer 13 from collapsing. The dams 44 provide an edge portion of the encapsulation layer 13 and extend along the peripheral edge of the display area A1.

The sensor layer 14 represents a layer that incorporates a touch sensor for detecting the positions of the electromagnetic resonance stylus P and the finger E (see FIG. 1) on the panel surface. The sensor layer 14 includes a stack of an insulating film 50, an insulating film 51, a bridge conductor 55, linear electrodes 52 and 53, and a protective film 56 that are successively layered in this order from the substrate 20. The linear electrodes 52 and 53 are electrically conductive films disposed on the upper surface of the insulating film 51 and extend along a y-direction and an x-direction, respectively. The linear electrodes 52 and 53 will be described in detail below later with reference to FIGS. 3 through 6.

The bridge conductor 55 represents a conductor disposed on the upper surface of the insulating film 50. The bridge conductor 55 is provided to allow the linear electrodes 52 and 53 to cross each other without physical interference with each other. Specifically, as illustrated in FIG. 2, the linear electrode 52 that extends in the y-direction is interrupted at a position where the linear electrode 53 extends across the linear electrode 52. At the position where the linear electrode 52 is interrupted, the linear electrode 52 has two ends electrically connected to the bridge conductor 55 by via conductors extending through the insulating film 51. Therefore, although the linear electrode 52 is interrupted, it remains electrically conductive throughout itself, and the linear electrodes 52 and 53 are allowed to cross each other without physical interference with each other.

Figure 3:
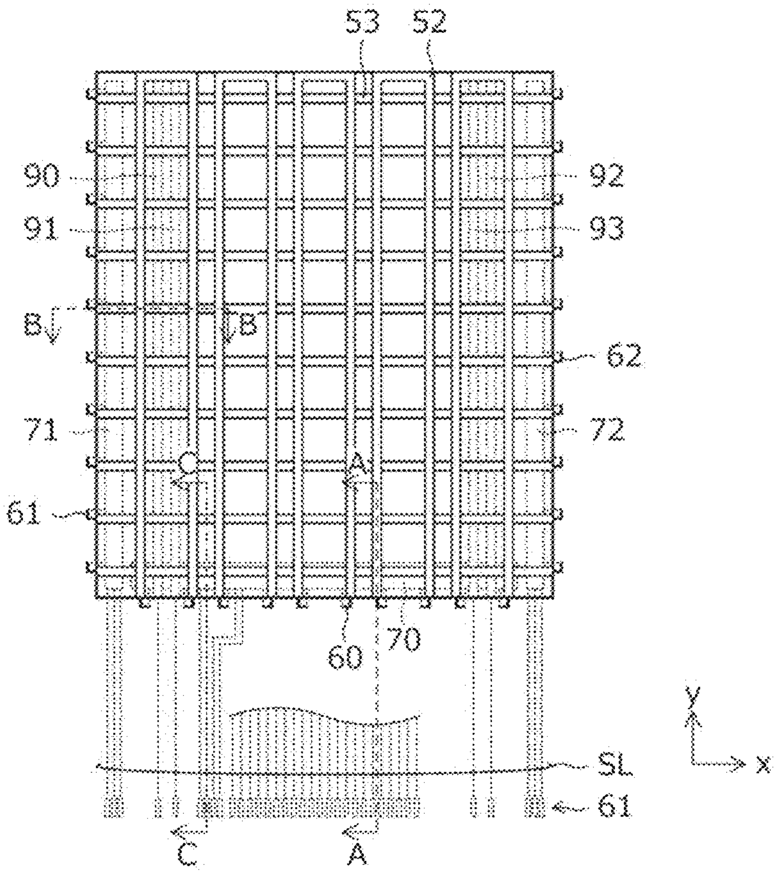
FIG. 3 is a plan view of a sensor layer according to the first embodiment of the present disclosure.
Figure 4:
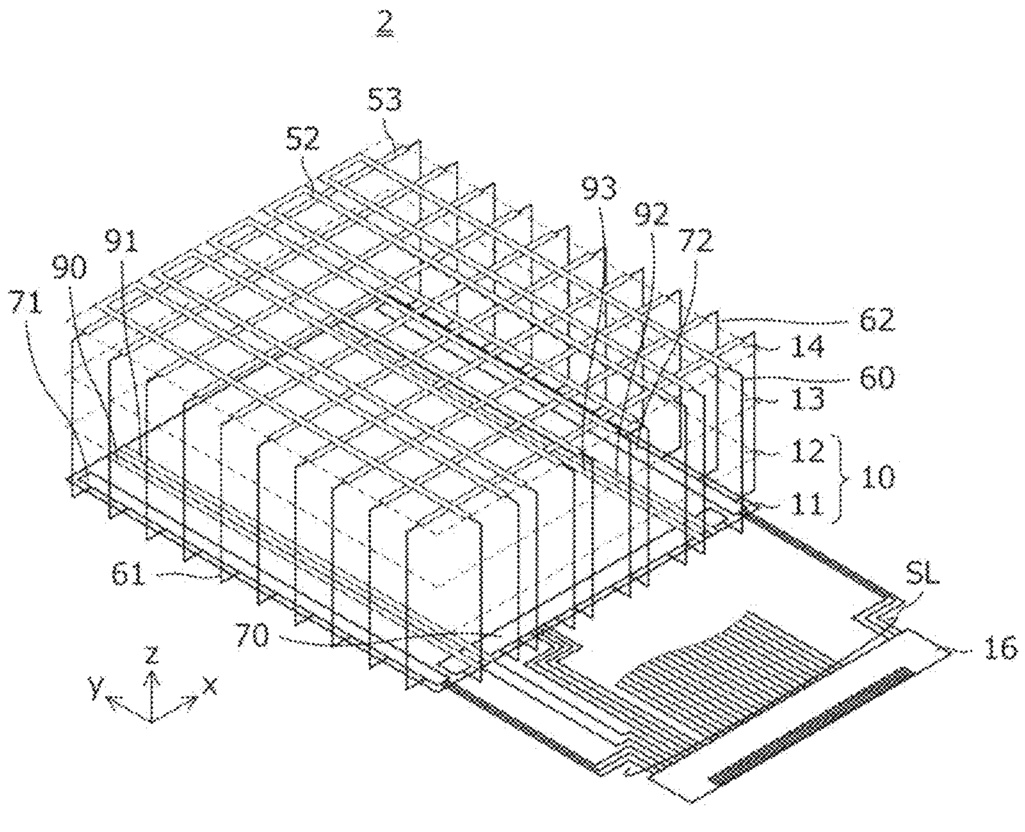
FIG. 4 is a perspective view of the organic EL display according to the first embodiment.

FIG. 3 is a plan view of the sensor layer 14. FIG. 4 illustrates the organic EL display 2 in perspective. In FIG. 3, some structural details of the circuit layer 11 and the lines SL are depicted in broken lines. In FIG. 4, the positions of the organic EL layer 12 and the encapsulation layer 13 are depicted in broken lines, and some structural details of the circuit layer 11 are depicted. An arrangement for detecting the positions of the electromagnetic resonance stylus P and the finger E on the panel surface will be described below with reference to FIGS. 3 and 4.

As illustrated in FIGS. 3 and 4, the sensor layer 14 has a group of linear electrodes including the linear electrodes 52 and 53. Each of linear electrodes 52 and 53 includes a solid conductor as an electrically conductive film in the shape of a rectangle. In FIGS. 3 and 4, only five linear electrodes 52 and ten linear electrodes 53 are depicted for illustrative purposes. Actually, however, the sensor layer 14 has more linear electrodes 52 and 53. The circuit layer 11 has switching circuits 70 through 72 and drive lines 90 through 93 that are disposed within the display area A1.

Each of the linear electrodes 52 includes a conductor made up of two linear conductors extending in the y-direction and having respective ends, which are remote from the terminal area 16, connected to each other. In the sensor layer 14, the linear electrodes 52 thus shaped are arrayed at equally spaced intervals in the x-direction. Each of the linear electrodes 52 has two ends closer to the terminal area 16 that are electrically connected to the switching circuit 70 in the circuit layer 11 by routing paths 60 extending from the sensor layer 14 to the circuit layer 11. Stated otherwise, each of the linear electrodes 52 is shaped as a loop coil extending from the switching circuit 70.

Each of the linear electrodes 53 includes a linear conductor extending in the x-direction. In the sensor layer 14, the linear electrodes 53 thus shaped are arrayed at equally spaced intervals in the y-direction. Each of the linear electrodes 53 has an end electrically connected to the switching circuit 71 in the circuit layer 11 by a routing path 61 extending from the sensor layer 14 to the circuit layer 11 and an opposite end electrically connected to the switching circuit 72 in the circuit layer 11 by a routing path 62 extending from the sensor layer 14 to the circuit layer 11.

The switching circuits 70 through 72 represent circuits for switching between a first mode in which the sensor controller 4 uses the linear electrodes 52 and 53 to detect induced currents and a second mode in which the sensor controller 4 uses the linear electrodes 52 and 53 to detect capacitances. The first mode represents a mode for detecting induced currents produced in the linear electrodes 52 by alternating magnetic fields transmitted from the electromagnetic resonance stylus P in response to alternating magnetic fields sent from the linear electrodes 53. The sensor controller 4 that has entered the first mode detects the position of the electromagnetic resonance stylus P on the basis of the detected induced currents. The second mode represents a mode for detecting capacitances at the respective crossings of the linear electrodes 52 and the linear electrodes 53 by detecting voltage signals produced in the linear electrodes 52 by voltage signals applied to the linear electrodes 53. The sensor controller 4 that has entered the second mode detects the position of the finger F on the basis of the detected capacitances.

More specifically, in each of the first and second modes, the switching circuit 70 extracts an induced current or a voltage signal from each of the linear electrodes 52 and outputs a reception signal Rx representing the extracted induced current or voltage signal to the sensor controller 4. Each of the switching circuits 71 and 72 supplies an alternating current for generating an alternating magnetic field to each of the linear electrode 53 in the first mode and applies a voltage signal to each of the linear electrode 53 in the second mode.

Figure 5:
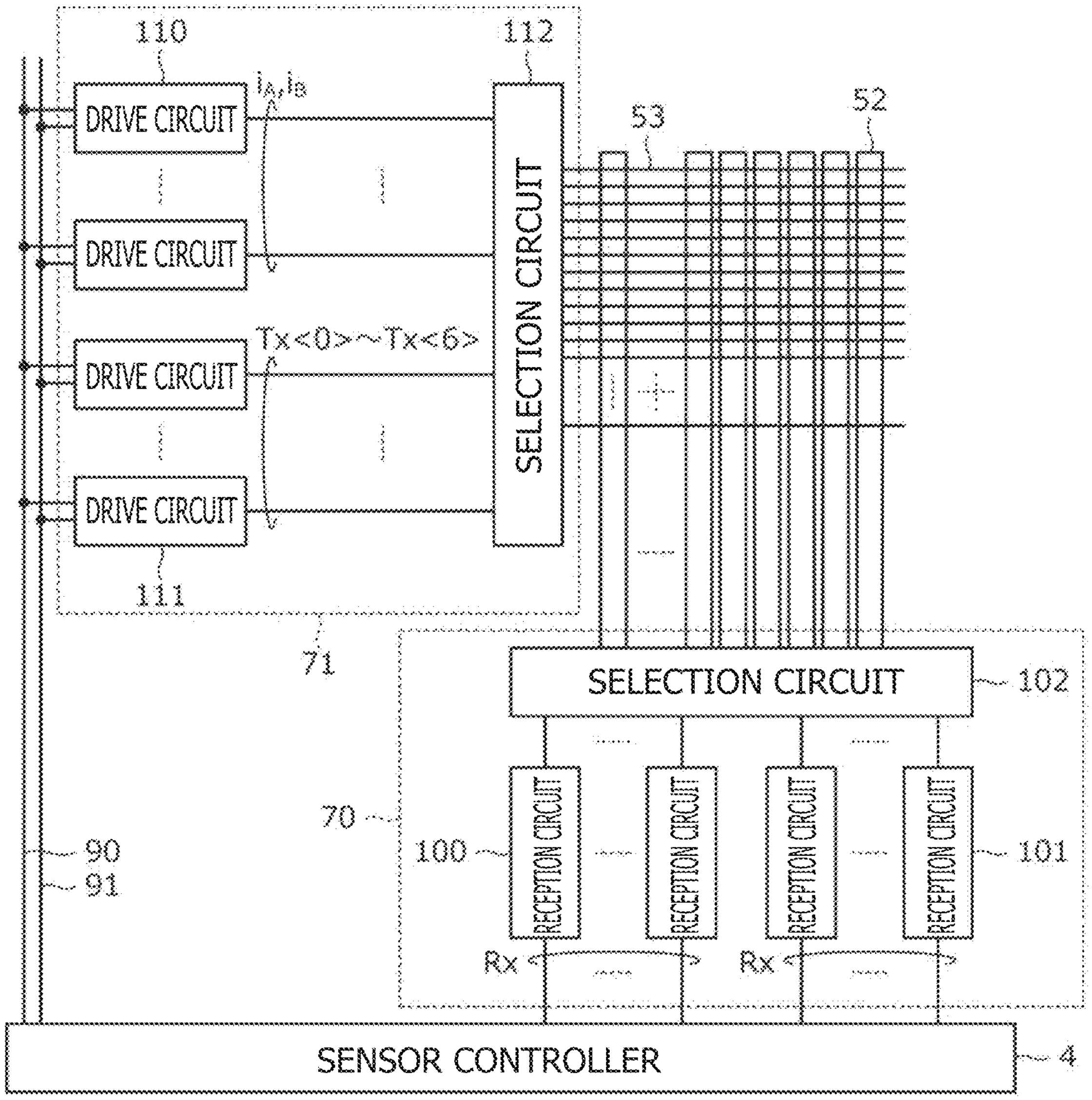
FIG. 5 is a block diagram illustrating the internal configurations of switching circuits according to the first embodiment.

FIG. 5 illustrates in block form the internal configurations of the switching circuits 70 and 71. In FIG. 5, the internal configuration of the switching circuit 72 is omitted from illustration as it is identical to the internal configuration of the switching circuit 71.

As illustrated in FIG. 5, the switching circuit 70 has one or more reception circuits 100 for extracting a reception signal Rx from each of the linear electrodes 52 in the first mode, one or more reception circuits 101 for extracting a reception signal Rx from each of the linear electrodes 52 in the second mode, and a selection circuit 102 for selectively connecting each of the linear electrodes 52 to either the reception circuit 100 or the reception circuit 101 or other linear electrodes 52. The switching circuit 70 is controlled by the sensor controller 4 to switch between the reception circuits 100 and 101 to be used and also between the connection destinations for each of the linear electrodes 52 in a time-division multiplex fashion for extracting a reception signal Rx from each of the linear electrodes 52.

The switching circuit 71 has one or more drive circuits 110 for generating alternating currents $i_A$ and $i_B$, to be described later, using drive signals, to be described later, supplied from the sensor controller 4 to the drive lines 90 and 91 and supplying the generated alternating currents $i_A$ and $i_B$ to the linear electrodes 53, one or more drive circuits 111 for generating transmission signals Tx<0> through Tx<6> as voltage signals, to be described later, using drive signals, to be described later, supplied from the sensor controller 4 to the drive lines 90 and 91 and applying the generated transmission signals Tx<0> through Tx<6> to the linear electrodes 53, and a selection circuit 112 for selectively connecting each of the linear electrodes 53 to either one of the drive circuits 110 and 111. The switching circuit 71 is controlled by the sensor controller 4 to switch between the drive circuits 110 and 111 to be used and also between the connection destinations for each of the linear electrodes 53 for supplying a current or applying a voltage to each of the linear electrodes 53.

Figure 6A:
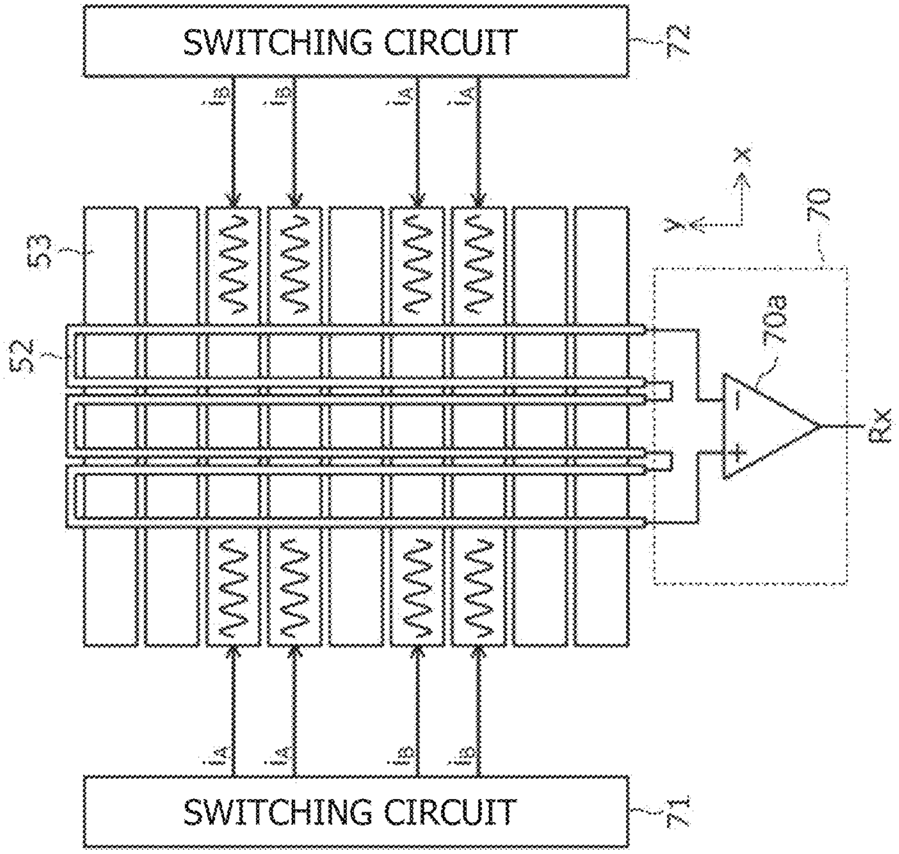
FIGS. 6A and 6B are block diagrams illustrating the manner in which a sensor controller controls the switching circuits in the computer according to the first embodiment.
Figure 6B:
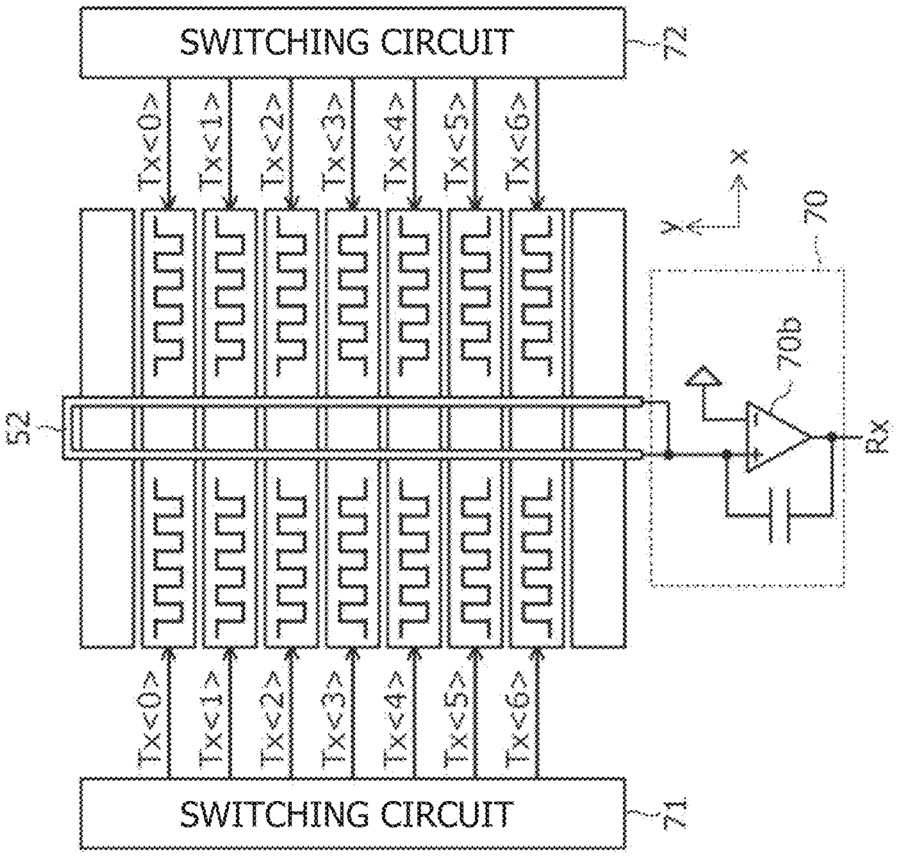

FIGS. 6A and 6B illustrate in block form the manner in which the sensor controller 4 controls the switching circuits 70 through 72 in the computer 1 according to the first embodiment. FIG. 6A illustrates the manner in which the sensor controller 4 controls the switching circuits 70 through 72 for detecting the position of the electromagnetic resonance stylus P, and FIG. 6B illustrates the manner in which the sensor controller 4 controls the switching circuits 70 through 72 for detecting the position of the finger F. Operation of the switching circuits 70 through 72 will be described in detail below with reference to FIGS. 6A and 6B.

As illustrated in FIG. 6A, the sensor controller 4 that has entered the first mode controls the switching circuits 71 and 72 to select one at a time of the linear electrodes 53 except two linear electrodes 53 at each of opposite ends in the y-direction and, each time the linear electrode 53 is selected, to supply an alternating current $i_A$ or an alternating current $i_B$ intermittently a plurality of times to two linear electrodes 53 adjacent on both sides of the selected linear electrode 53. The sensor controller 4 also controls the switching circuit 70 to select one at a time of the linear electrodes 52 except one linear electrode 52 at each of opposite ends in the x-direction and, each time the linear electrode 52 is selected, to extract reception signals Rx from the selected linear electrode 52 and the linear electrodes 52 adjacent on both sides of the selected linear electrode 52. The sensor controller 4 controls the switching circuits 70 and 72 while adjusting timing in order to extract the reception signals Rx immediately after stopping to supply the alternating currents $i_A$ and $i_B$.

The alternating current $i_A$ represents a current that oscillates at a constant frequency and phase, whereas the alternating current $i_B$ represents a phase-inverted current that is in opposite phase to the alternating current $i_A$. Typically, each of the alternating currents $i_A$ and $i_B$ includes a sine-wave signal as illustrated in FIG. 6A, although it may include a rectangular-wave signal. The sensor controller 4 controls the switching circuit 71 to supply the alternating current $i_A$ to the two linear electrodes 53 adjacent to one side of the selected linear electrode 53 in the y-direction and to supply the alternating current $i_B$ to the two linear electrodes 53 adjacent to the other side of the selected linear electrode 53 in the y-direction. In synchronism with its operation to control the switching circuit 72, the sensor controller 4 controls the switching circuit 72 to supply an alternating current $i_B$ to two linear electrodes 53 adjacent to one side of the selected linear electrode 53 in the y-direction and to supply an alternating current $i_A$ to two linear electrodes 53 adjacent to the other side of the selected linear electrode 53 in the y-direction. As a result, the supplied alternating currents $i_A$ and $i_B$ generate an alternating magnetic field above the selected linear electrode 53. When the coil of a resonance circuit disposed in the electromagnetic resonance stylus P enters the alternating magnetic field, the electromagnetic resonance stylus P generates and transmits an alternating magnetic field as a reflective signal.

FIG. 6A illustrates a differential amplifier 70*a* as a specific example of each of the reception circuits 100 illustrated in FIG. 5. The switching circuit 70 connects the three linear electrodes 52 including the selected linear electrode 52 in series with each other using the selection circuit 102 illustrated in FIG. 5, and connects the opposite ends of the series-connected linear electrodes 52 to the differential amplifier 70*a*. The switching circuit 70 supplies a signal output from the differential amplifier 70*a* immediately after the switching circuits 71 and 72 have stopped supplying the alternating currents $i_A$ and $i_B$ as the reception signal Rx to the sensor controller 4.

The sensor controller 4 acquires as many signal intensities of reception signals Rx supplied from the switching circuit 70 as the number of combinations of linear electrodes 52 and 53 selected by the switching circuits 70 through 72, and derives the position, i.e., the two-dimensional position, of the electromagnetic resonance stylus P on the basis of the distribution on the panel surface of the acquired signal intensities of the organic EL display 2. Specifically, the sensor controller 4 may derive the position corresponding to the peak of the distribution as the position of the electromagnetic resonance stylus P. In a case where the sensor controller 4 has a function to modulate the frequency of the alternating magnetic field transmitted from the electromagnetic resonance stylus P with data, e.g., a stylus pressure value representing the pressure applied to the tip of the electromagnetic resonance stylus P, a value representing whether a switch on the electromagnetic resonance stylus P is turned on or off, or a stylus identification (ID) pre-assigned to the electromagnetic resonance stylus P, the sensor controller 4 performs a process of acquiring the data transmitted from the electromagnetic resonance stylus P by demodulating the reception signals Rx supplied from the switching circuit 70. Each time the sensor controller 4 derives a position and acquires data, the sensor controller 4 supplies the derived position and the acquired data to the host processor 3.

As illustrated in FIG. 6B, the sensor controller 4 that has entered the second mode controls the switching circuits 71 and 72 to select seven at a time of the linear electrodes 53 and to supply transmission signals Tx<0> through Tx<6> to the selected seven linear electrodes 53. Each time the sensor controller 4 controls the switching circuits 71 and 72 to select seven at a time of the linear electrodes 53, the sensor controller 4 controls the switching circuit 70 to select one at a time of the selected linear electrodes 52 and to extract a reception signal Rx from the selected linear electrode 52.

The transmission signals Tx<0> through Tx<6> represent alternating signals whose phases are indicated by the columns of a 7×7 matrix A expressed by the equation (1) given below. In the matrix A, "+1" corresponds phase 0° and "−1" corresponds phase 180°. Typically, each of the transmission signals Tx<0> through Tx<6> includes a rectangular-wave signal as illustrated in FIG. 6B, although it may include a sine-wave signal. The switching circuits 71 and 72 successively generate the transmission signals Tx<0> through Tx<6> corresponding to the columns of the matrix A and supply the generated transmission signals Tx<0> through Tx<6> to the respective selected linear electrodes 53.

[Math. 1]

$$A=\begin{pmatrix} -1 & +1 & +1 & -1 & +1 & -1 & -1 \\ -1 & -1 & +1 & +1 & -1 & +1 & -1 \\ -1 & -1 & -1 & +1 & +1 & -1 & +1 \\ +1 & -1 & -1 & -1 & +1 & +1 & -1 \\ -1 & +1 & -1 & -1 & -1 & +1 & +1 \\ +1 & -1 & +1 & -1 & -1 & -1 & +1 \\ +1 & +1 & -1 & +1 & -1 & -1 & -1 \end{pmatrix} \tag{1}$$

The matrix A represents an M-sequence code. With the matrix A representing an M-sequence code, the elements of each column may be shifted by one element to create a next column. Therefore, the circuits for generating the transmission signals Tx<0> through Tx<6> can be simplified in structure. Specific structural details of those circuits will be described later with reference to FIGS. 9 through 21. The matrix A may not necessarily be configured as an M-sequence code, and may be configured as any desired code such as a Walsh code, an orthogonal variable spreading factor (OVSF) code, or a Barker code, for example. The matrix A may also be configured as a square matrix other than a 7×7 matrix. With the latter matrix A, the sensor controller 4 controls the switching circuits 71 and 72 to select as many linear electrodes 53 as the number of the rows of the matrix A.

FIG. 6B illustrates an operational amplifier 70*b* as a specific example of each of the reception circuits 101 illustrated in FIG. 5. The operational amplifier 70*b* has an inverted input terminal connected to ground. A capacitor for removing high-frequency noise is connected parallel to the operational amplifier 70*b*. The switching circuit 70 connects the both ends of the selected linear electrode 52 to a non-inverted input terminal of the operational amplifier 70*b* using the selection circuit 102 illustrated in FIG. 5, thereby supplying a series of signals output from the operational amplifier 70*b* as a reception signal Rx to the sensor controller 4 while the switching circuits 71 and 72 are successively supplying the transmission signals Tx<0> through Tx<6> that correspond to the columns of the matrix A.

It is assumed that the elements of the xth column of the matrix A are indicated by $A_{x1}$, $A_{x2}$, . . . and the capacitances formed between the linear electrode 52 selected by the switching circuit 70 and the seven linear electrodes 53 selected by the switching circuits 71 and 72 are indicated by $C_1$ and $C_2$, . . . . Then, a reception signal Rx_TP supplied from the operational amplifier 70*b* to the sensor controller 4 has a value indicated by the following equation (2).

[Math. 2]

$$\begin{pmatrix} A_{x1} & A_{x2} & A_{x3} & \cdots & A_{x7} \end{pmatrix}\begin{pmatrix} C_1 \\ C_2 \\ C_3 \\ \vdots \\ C_7 \end{pmatrix} \qquad (2)$$

Consequently, the reception signal Rx obtained as the result of sending the transmission signals Tx<0> through Tx<6> that correspond to the columns of the matrix A from the switching circuits 71 and 72 to the linear electrodes 53 is represented by a vector b indicated by the following equation (3).

[Math. 3]

$$b = A^T\begin{pmatrix} C_1 \\ C_2 \\ C_3 \\ \vdots \\ C_7 \end{pmatrix} \qquad (3)$$

where $A^T$ represents a transposed matrix of the matrix A.

The sensor controller 4 performs an arithmetic operation expressed by the left side of the equation (4) given below on the vector b, thereby separately acquiring the respective capacitances of the linear electrodes 53. In the equation (4), the matrix $(A^T)^{-1}$ represents an inverted matrix of the matrix $A^T$. Since multiplying the matrix $A^T$ by the matrix $(A^T)^{-1}$ produces an identity matrix I as indicated by the equation (4), the sensor controller 4 can separately acquire the capacitances at the crossings between the linear electrode 52 selected by the switching circuit 70 and the seven linear electrodes 52 selected by the switching circuits 71 and 72 by performing the arithmetic operation, as indicated by the right side of the equation (4).

[Math. 4]

$$(A^T)^{-1}b = (A^T)^{-1}A^T\begin{pmatrix} C_1 \\ C_2 \\ C_3 \\ \vdots \\ C_7 \end{pmatrix} = I\begin{pmatrix} C_1 \\ C_2 \\ C_3 \\ \vdots \\ C_7 \end{pmatrix} = \begin{pmatrix} C_1 \\ C_2 \\ C_3 \\ \vdots \\ C_7 \end{pmatrix} \qquad (4)$$

The sensor controller 4 performs the arithmetic operation expressed by the equation (4) each time the switching circuits 70 through 72 switch from an electrode selection to another electrode selection, thereby deriving capacitances at the crossings between the linear electrodes 52 and the linear electrodes 53. Then, the sensor controller 4 derives the position, i.e., the two-dimensional position, of the finger F on the basis of the distribution on the panel surface of the derived capacitances of the organic EL display 2. Specifically, the sensor controller 4 may derive the position corresponding to the peak of the distribution as the position of the finger F. Each time the sensor controller 4 derives a position, the sensor controller 4 supplies the derived position to the host processor 3.

Referring back to FIG. 3 and FIG. 4, the drive lines 90 through 93 represent lines for supplying drive signals required to generate the alternating currents $i_A$ and $i_B$ and the transmission signals Tx<0> through Tx<6> from the sensor controller 4 to the switching circuits 71 and 72. As will be described by way of a specific example later, a drive signal Tx_clk supplied as a first drive signal to the drive lines 90 and 92 and a drive signal xTx_clk supplied as a second drive signal to the drive lines 91 and 93 are alternating signals that are in opposite phase to each other. The drive signals Tx_clk and xTx_clk may be alternating-current signals such as sine-wave signals or signals generated by a switch as it is turned on and off such as rectangular-wave signals. The switching circuit 71 is configured to generate the alternating currents $i_A$ and $i_B$ and the transmission signals Tx<0> through Tx<6> on the basis of the drive signals Tx_clk and xTx_clk supplied from the sensor controller 4 through the drive lines 90 and 91. The switching circuit 72 is configured to generate the alternating currents $i_A$ and $i_B$ and the transmission signals Tx<0> through Tx<6> on the basis of the drive signals Tx_clk and xTx_clk supplied from the sensor controller 4 through the drive lines 92 and 93.

Specific structural details of the routing paths 60 and 61 and the lines SL will be described below with reference to cross-sectional views including FIG. 2. The routing paths 62 are structurally identical to the routing paths 61.

FIG. 2 illustrates one of the routing paths 60 in enlarged cross section. As illustrated in FIG. 2, the routing path 60 includes a line 60*a* disposed on the upper surface of the gate insulating film 22, a pad electrode 60*b* disposed on the upper surface of the interlayer insulating film 23, a via conductor 60*c* interconnecting the line 60*a* and the pad electrode 60*b*, and an extension 60*d* of the electrically conductive film of the linear electrode 52. The pad electrode 60*b* and the via conductor 60*c* are positioned in the bezel area A2. The line 60*a* extends below and across the dams 44 and interconnects the switching circuit 70 in the display area A1 and the via conductor 60*c* in the bezel area A2. The extension 60*d* extends over the dams 44 and is connected to the upper surface of the pad electrode 60*b* through its portion disposed in a via hole VH1 defined in the bezel area A2.

As can be understood from the structural details of the routing path 60 described above, the routing path 60 extends from an upper side of the encapsulation layer 13 to a lower side thereof over and around the dams 44 in and along the edge portion of the encapsulation layer 13, thereby enclosing the dams 44. The routing path 60 thus constructed makes it possible to place the switching circuit 70 within the display area A1 of the organic EL display 2 according to the first embodiment.

As the pixel drive circuits 35 take up an area smaller than the organic EL layer 12, the circuit layer 11 in the display area A1 has a sufficient space therein required to place the switching circuit 70 therein. According to the first embodiment, the switching circuit 70 is disposed in such a sufficient space in the circuit layer 11 in the display area A1.

Figure 7:
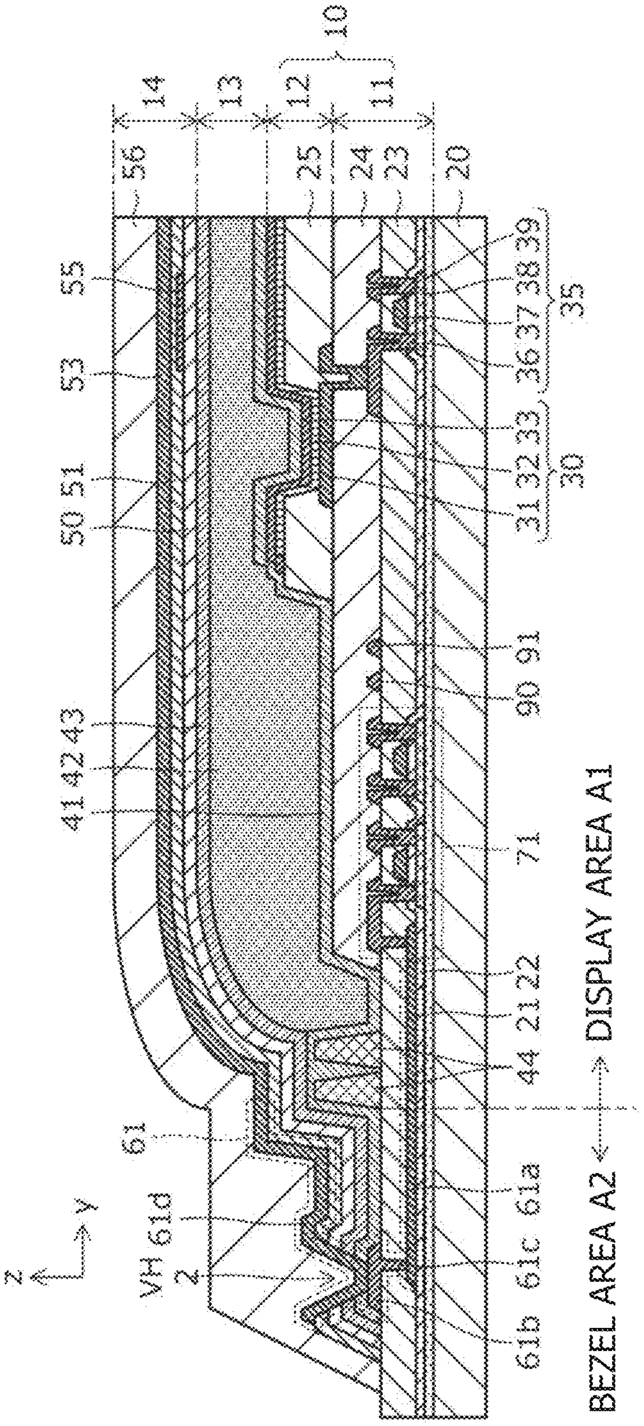
FIG. 7 is an enlarged cross-sectional view of the organic EL display, taken along line B-B of FIG. 3.

FIG. 7 illustrates the organic EL display 2, taken along line B-B of FIG. 3, in enlarged cross-section. FIG. 7 illustrates the structural details of the routing path 61. As illustrated in FIG. 7, as with the routing path 60, the routing path 61 includes a line 61*a* disposed on the upper surface of the gate insulating film 22, a pad electrode 61*b* disposed on the upper surface of the interlayer insulating film 23, a via conductor 61*c* interconnecting the line 61*a* and the pad electrode 61*b*, and an extension 61*d* of the electrically conductive film of the linear electrode 53. The pad electrode 61*b* and the via conductor 61*c* are positioned in the bezel area A2. The line 61*a* extends below and across the dams 44 and interconnects the switching circuit 71 in the display area A1 and the via conductor 61*c* in the bezel area A2. The extension 61*d* extends over the dams 44 and is connected to the upper surface of the pad electrode 61*b* through its portion disposed in a via hole VH2 defined in the bezel area A2.

As can be understood from the structural details of the routing path 61 described above, the routing path 61 extends from an upper side of the encapsulation layer 13 to a lower side thereof over and around the dams 44 in and along the edge portion of the encapsulation layer 13, thereby enclosing the dams 44. The routing path 60 thus constructed makes it possible to place the switching circuit 70 within the display area A1 of the organic EL display 2 according to the first embodiment.

FIG. 7 also illustrates the drive lines 90 and 91. As illustrated in FIG. 7, the drive lines 90 and 91 extend on the upper surface of the interlayer insulating film 23, as is the case with the data lines.

Figure 8:
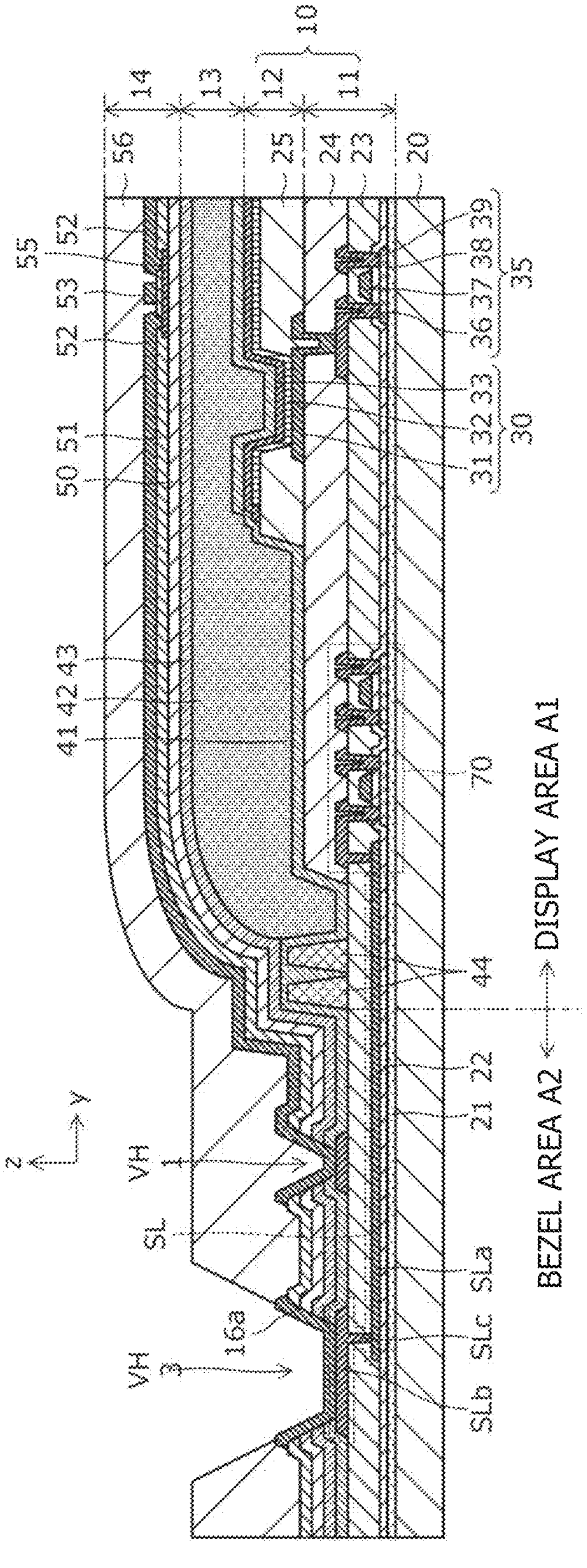
FIG. 8 is an enlarged cross-sectional view of the organic EL display, taken along line C-C of FIG. 3.

FIG. 8 schematically illustrates the organic EL display 2 in enlarged cross section, taken along line C-C of FIG. 3. FIG. 8 illustrates the structure of the lines SL that connects the switching circuit 70 to the terminal area 16. As illustrated in FIG. 8, the lines SL include a line SLa disposed on the upper surface of the gate insulating film 22, a pad electrode SLb disposed on the upper surface of the interlayer insulating film 23, and a via conductor SLc interconnecting the line SLa and the pad electrode SLb. The line SLa extends below and across the dams 44 and interconnects the switching circuit 70 in the display area A1 and the via conductor SLc in the bezel area A2. The pad electrode SLb has an upper surface exposed at the bottom of a via hole VH3 defined through the protective film 56 and other layers, and is connected to a pad electrode 16*a* disposed on an inner surface of the via hole VH3. The pad electrode 16*a* represents an electrode functioning as a terminal in the terminal area 16 and is connected to the sensor controller 4 illustrated in FIG. 1 through a line, not depicted.

The configuration of the switching circuit 71 disposed in the display area A1, e.g., the drive circuits 111 for generating and supplying the transmission signals Tx<0> through Tx<6>, will be described in specific detail below. Although the configuration of the switching circuit 71 will be described below by way of example, the configuration of the switching circuit 72 is identical thereto in configuration. Moreover, although the configuration of the drive circuits 111 for generating and supplying the transmission signals Tx<0> through Tx<6> will be described below by way of example, the configuration of the drive circuits 110 for generating and supplying the alternating currents $i_A$ and $i_B$ is identical thereto in configuration.

Figure 9:
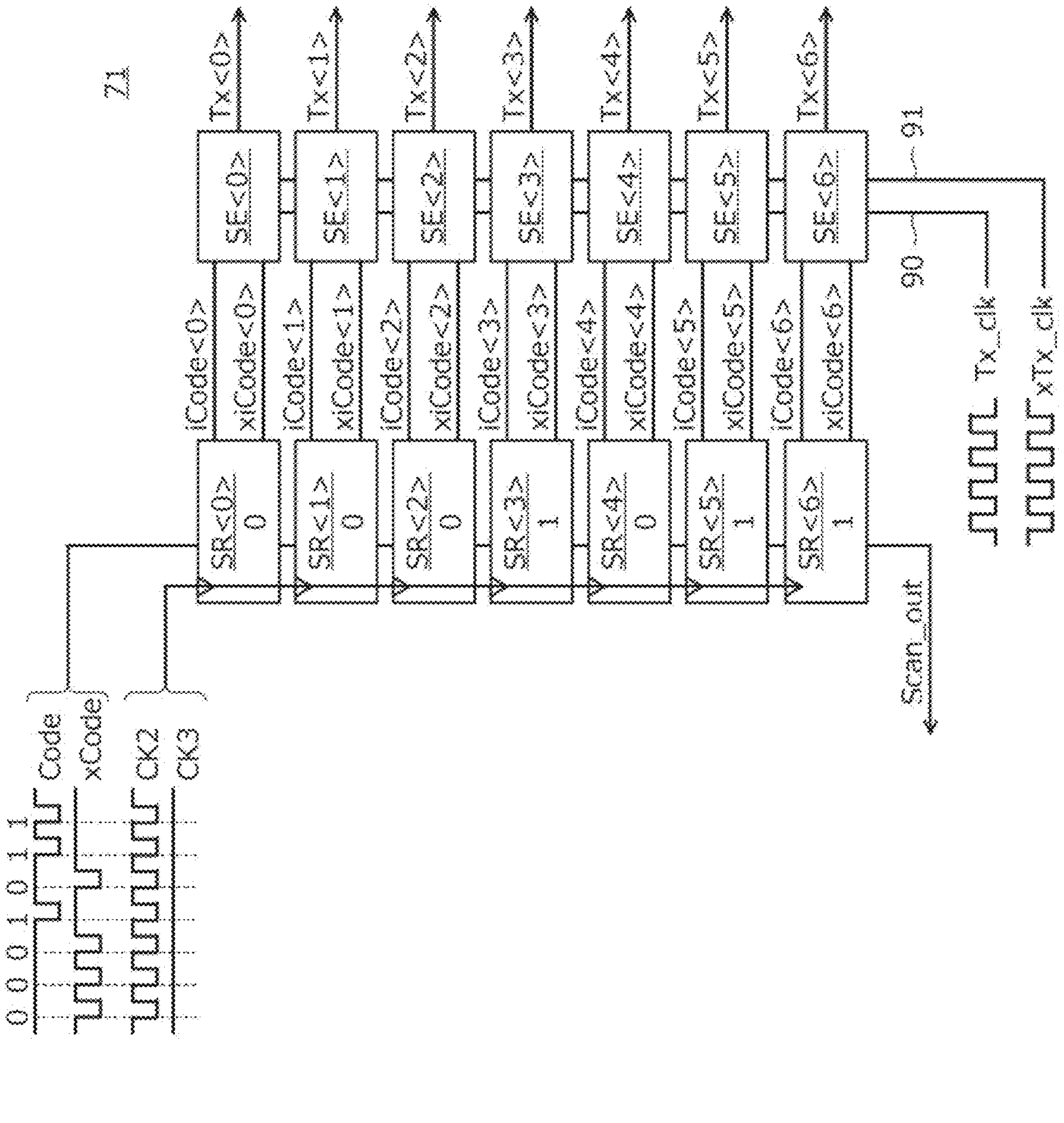
FIG. 9 is a block diagram illustrating the configuration and operation of a drive circuit for generating transmission signals.

FIGS. 9 through 12 illustrate the configuration and operation of the drive circuits 111 in the switching circuit 71. As illustrated in FIG. 9, the switching circuit 71 has seven drive circuits 111 for generating and supplying the respective transmission signals Tx<0> through Tx<6>. The drive circuits 111 include respective shift registers SR<k> (k is an integer ranging from 0 to 6) and respective selection circuits SE<k>.

The shift register SR<0> is supplied with data signals Code and xCode each representing a phase setting value ("+1" or "−1"), successively bit by bit, from the sensor controller 4. The data signal Code (first data signal) represents a low-active binary signal that is activated as a low when the setting value represents "+1." The data signal xCode (second data signal) represents a low-active binary signal that activates itself as a low when the setting value represents "−1." The data signal Code indicating the setting value "+1" and the data signal xCode indicating the setting value "−1" are separately provided in order to make it possible to construct the drive circuits 111 of only MOSFETs of the same channel type. For example, in a case where the drive circuits 111 are constructed of only MOSFETs of the P-channel type, they can only output signals in response to low inputs, and hence they can only output "−1" when a binary signal that has a high level representing "+1" and a low level representing "−1" is input thereto. According to the first embodiment, since both "+1" and "−1" are input as a low, the drive circuits 111 that are constructed of only MOSFETs of the P-channel type can output both "+1" and "−1."

Each of the shift registers SR<k> is supplied with at least clock signals CK2 and CK3 of two types from the sensor controller 4. Each of the clock signals CK2 and CK3 represents a clock signal that oscillates between a ground potential VGL (specifically, −7 V) and a power potential VGH (VGH>VGL, specifically 7 V). The clock signal CK2 is representative of the timing for each shift register SR<k> to read the data signals Code and xCode and the timing for each shift register SR<k> to output the data signals Code and xCode to the next shift register SR<k>. The clock signal CK3 is representative of the timing for each shift register to output signals to the corresponding selection circuit SE<k>.

Each of the shift registers SR<k> represents a circuit for reading and setting in itself the values supplied as the data signals Code and xCode at an activating timing of the clock signal CK2, outputting the set values to the next shift register SR<k> at a next activating timing of the clock signal CK2, and outputting the set values to the corresponding selection circuit SE<k> at an activating timing of the clock signal CK3. The shift register SR<k> outputs the set values as two data signals iCode<k> and xiCode<k> to the selection circuit SE<k>. The data signal iCode<k> represents a low-active binary signal that goes low when the phase setting value is "+1." The data signal xiCode<k> represents a low-active binary signal that goes low when the phase setting value is "−1."

Each of the selection circuits SE<k> is supplied with the drive signals Tx_clk and xTx_clk described above from the sensor controller 4 through the respective drive lines 90 and 91. Each of the selection circuits SE<k> represents a circuit for outputting the drive signal Tx_clk in response to the activation of the data signal iCode<k> and outputting the drive signal xTx_clk in response to the activation of the data signal xiCode<k>. The selection circuits SE<k> output the drive signals Tx_clk and xTx_clk as transmission signals Tx<k>.

The operation of the drive circuits 111 will be described in specific detail below with reference to FIGS. 9 through 12. First, as illustrated in FIG. 9, the sensor controller 4 supplies the shift register SR<0> with 7 bits of the data signals Code and xCode corresponding to the first column, from the left, of the matrix A, successively from the lowermost element of the matrix A, one bit per clock pulse of the clock signal CK2. At this stage, the sensor controller 4 does not supply the shift register SR<0> with the clock signal CK3. Therefore, the supplied bits of the data signals Code and xCode are not output to the selection circuit SE<k>, but output to and set in the next shift register in synchronism with the clock signal CK2. As a result, as illustrated in FIG. 9, at the time the last bits of the data signals Code and xCode are set in the shift register SR<0>, the 7 bits of the data signals Code and xCode corresponding to the first column of the matrix A are set in the respective shift registers SR<0> through SR<6>.

Figure 10:
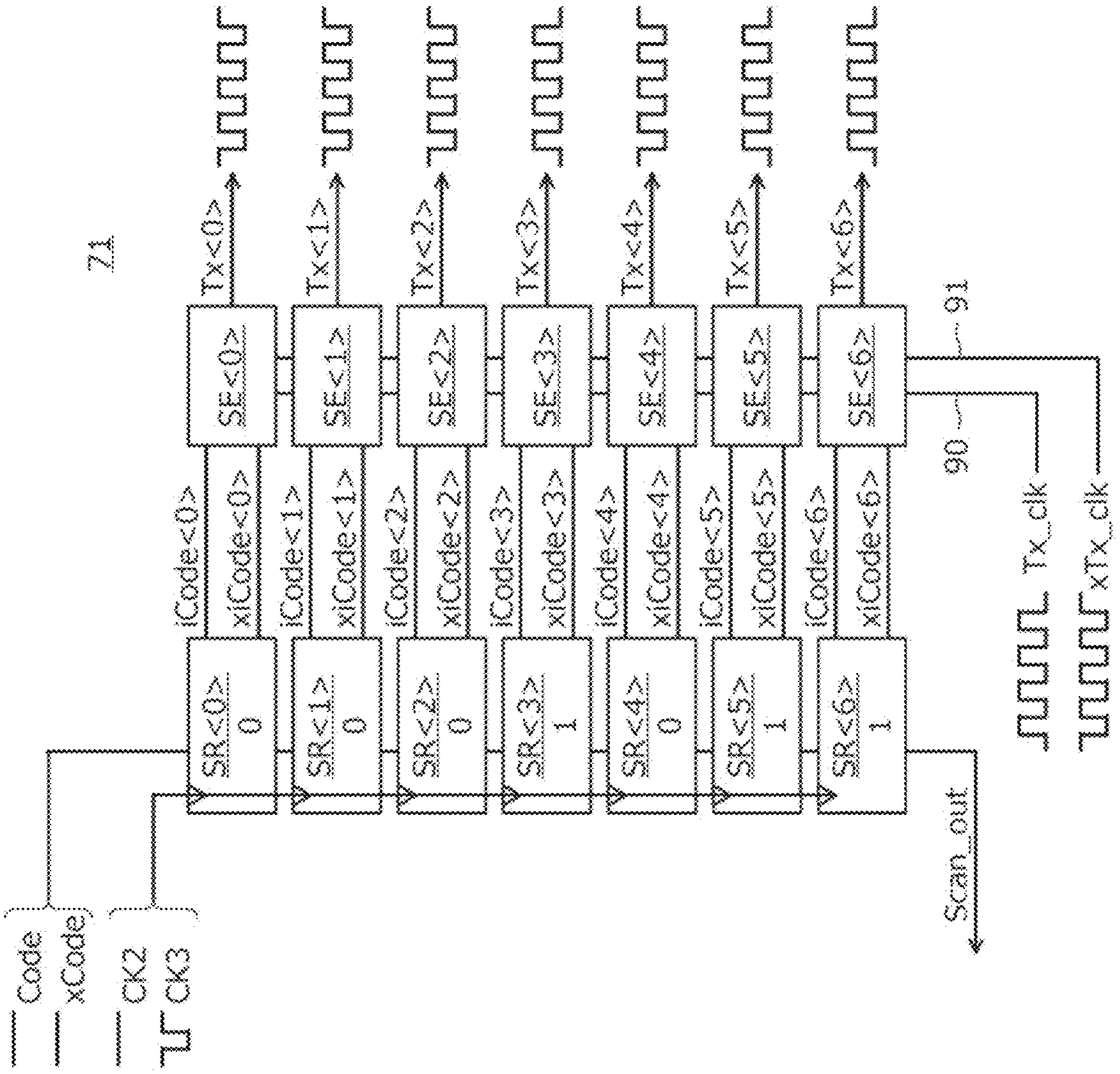
FIG. 10 is a block diagram illustrating the configuration and operation of the drive circuit for generating the transmission signals.

Then, as illustrated in FIG. 10, the sensor controller 4 activates the clock signal CK3. Now, the respective bits set in the shift registers SR<k> are output as the data signals iCode<k> and xiCode<k> to the selection circuits SE<k>. The selection circuits SE<k> that have received the data signals iCode<k> and xiCode<k> output the drive signals Tx_clk if the data signal iCode<k> is activated and output the drive signals xTx_clk if the data signal xiCode<k> is activated. As a consequence, the seven linear electrodes 53 are simultaneously supplied with the transmission signals Tx<0> through Tx<6> whose phases correspond to the first column of the matrix A.

Figure 11:
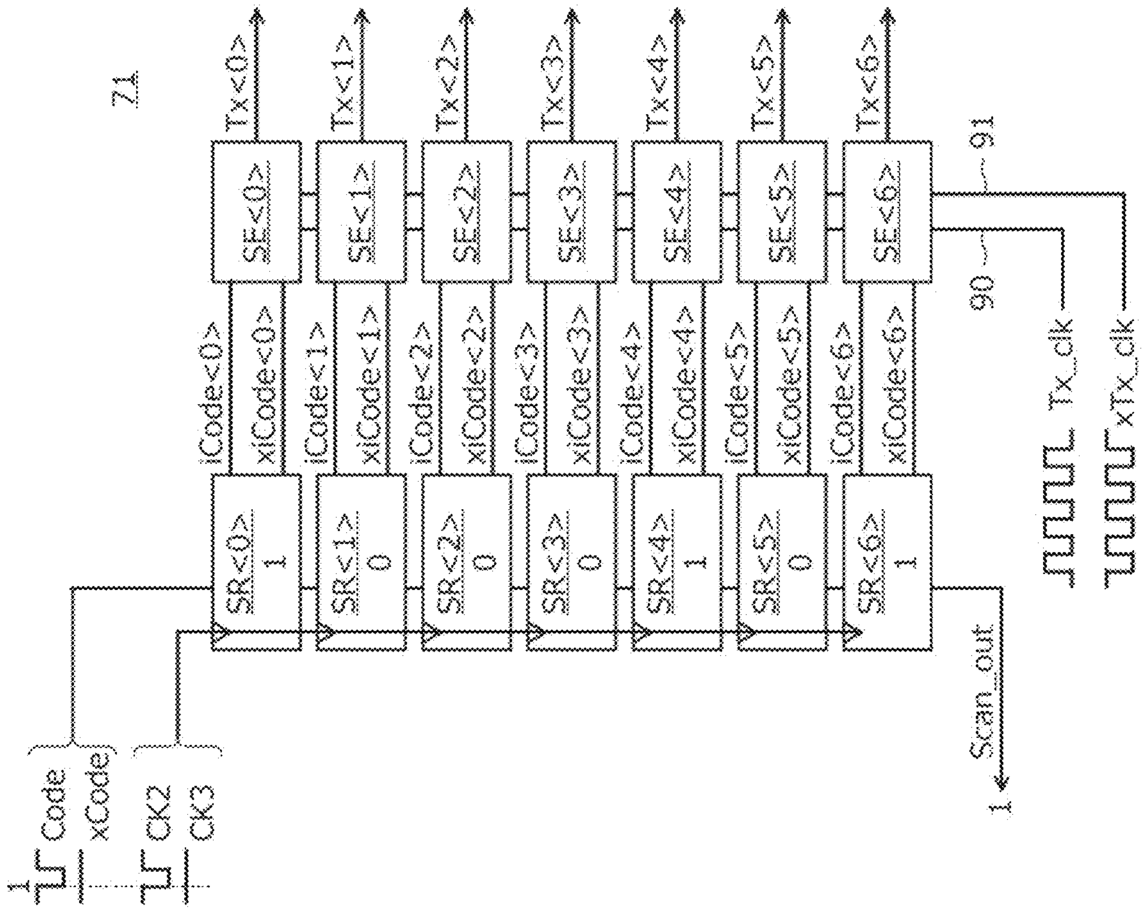
FIG. 11 is a block diagram illustrating the configuration and operation of the drive circuit for generating the transmission signals.

Then, as illustrated in FIG. 11, the sensor controller 4 supplies the shift register SR<0> with, together with one clock pulse of the clock signal CK2, the next bit, i.e., the uppermost value of the second column, from the left, of the matrix A, of the data signals Code and xCode. The values set in the shift registers SR<k> are now shifted, so that the values corresponding to the second column of the matrix A are set respectively in the shift registers SR<0> through SR<6>.

Figure 12:
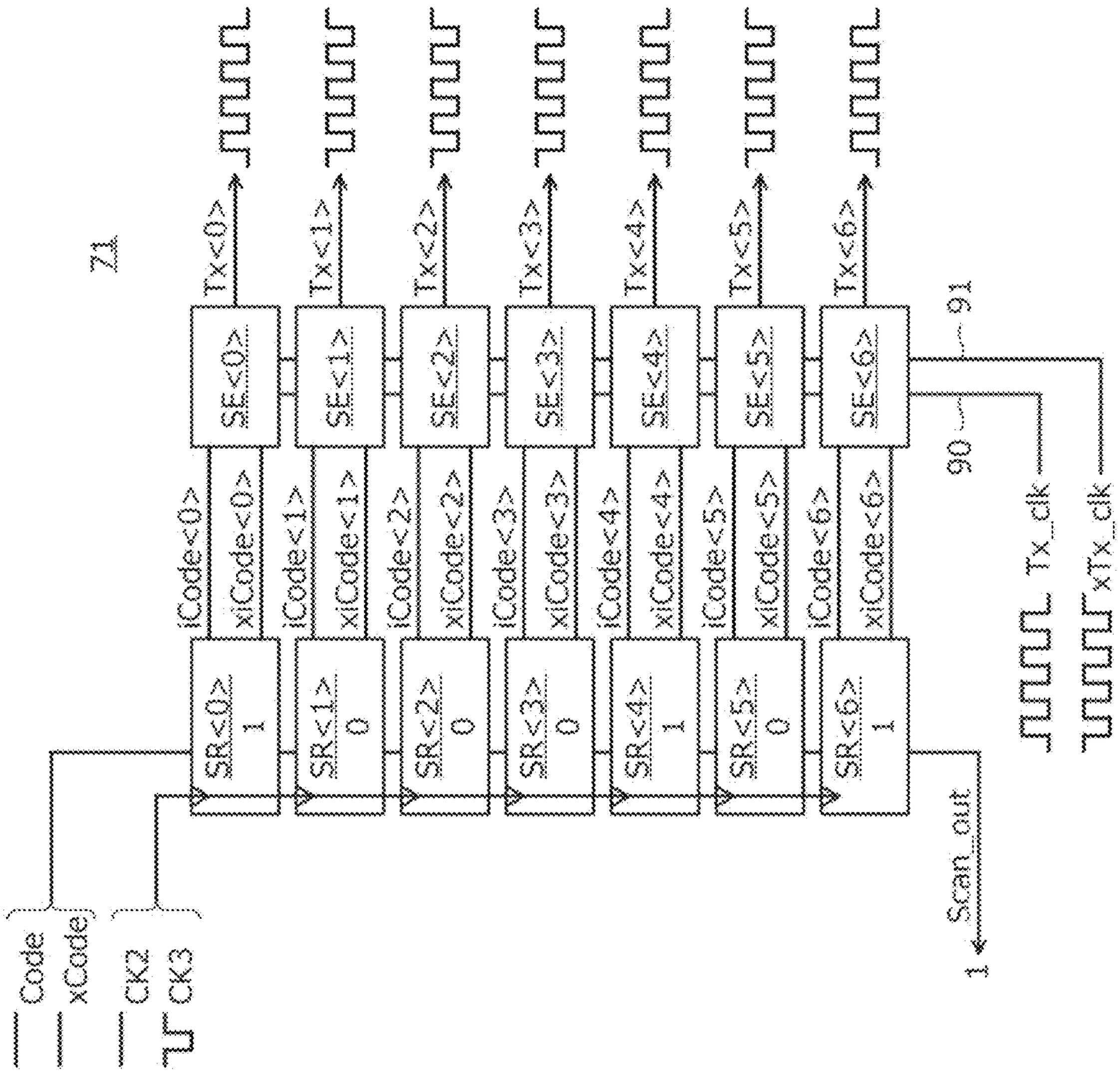
FIG. 12 is a block diagram illustrating the configuration and operation of the drive circuit for generating the transmission signals.

Then, as illustrated in FIG. 12, the sensor controller 4 activates the clock signal CK3 again. Now, the respective bits set in the shift registers SR<k> are output as the data signals iCode<k> and xiCode<k> to the selection circuits SE<k>. As a result, the selection circuits SE<k> simultaneously supply the seven linear electrodes 53 with the transmission signals Tx<0> through Tx<6> whose phases correspond to the second column of the matrix A.

The same process is repeated with respect to the third through seventh rows of the matrix A, so that the seven linear electrodes 53 are supplied with the transmission signals Tx<0> through Tx<6> having the corresponding phases. In this manner, the switching circuit 71 supplies the transmission signals Tx<0> through Tx<6> corresponding to the columns of the matrix A successively to the seven linear electrodes 53.

Figure 13:
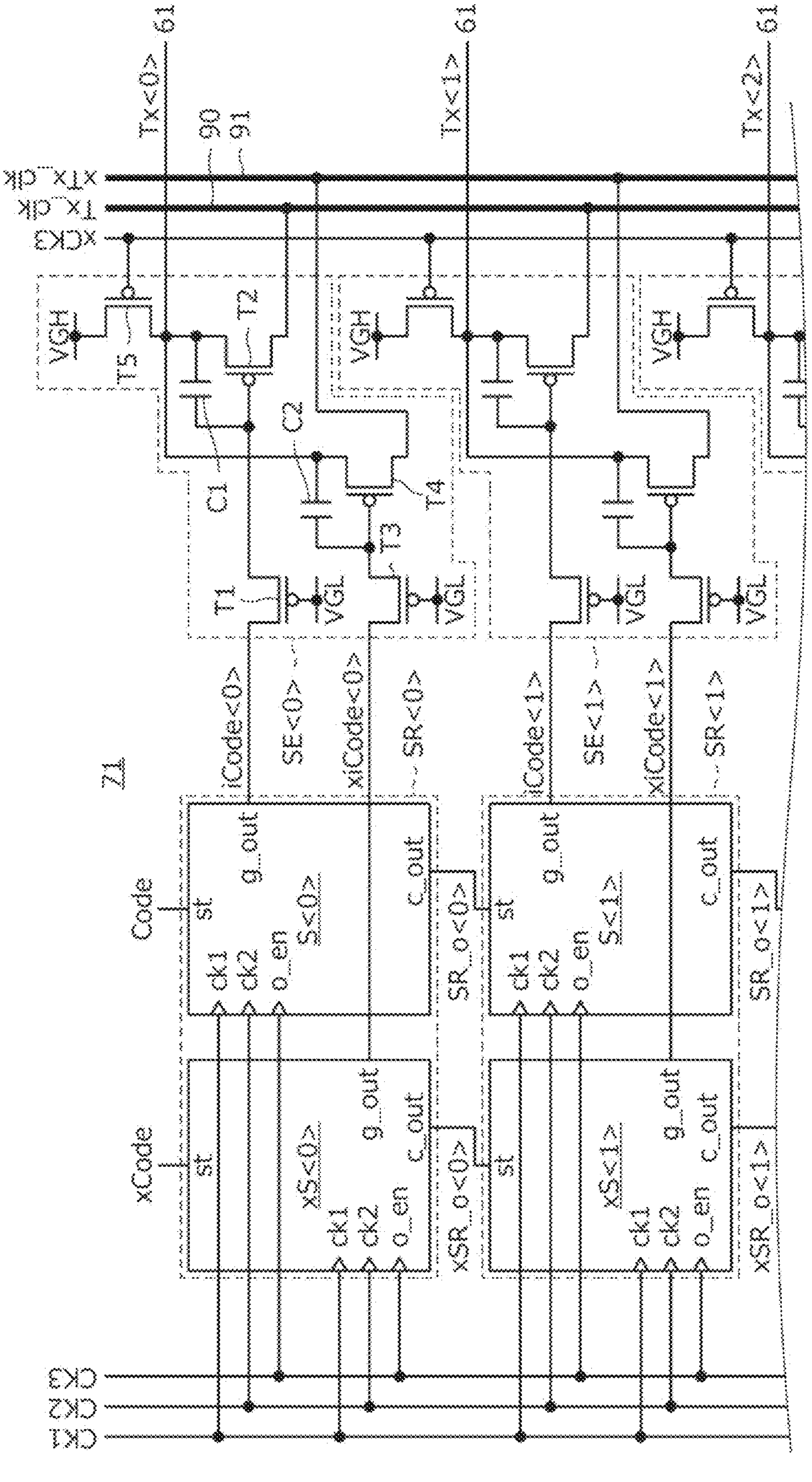
FIG. 13 is a circuit diagram, partly in block form, illustrating the specific configurational details of shift registers and selection circuits illustrated in FIGS. 9 through 12.
Figure 14:
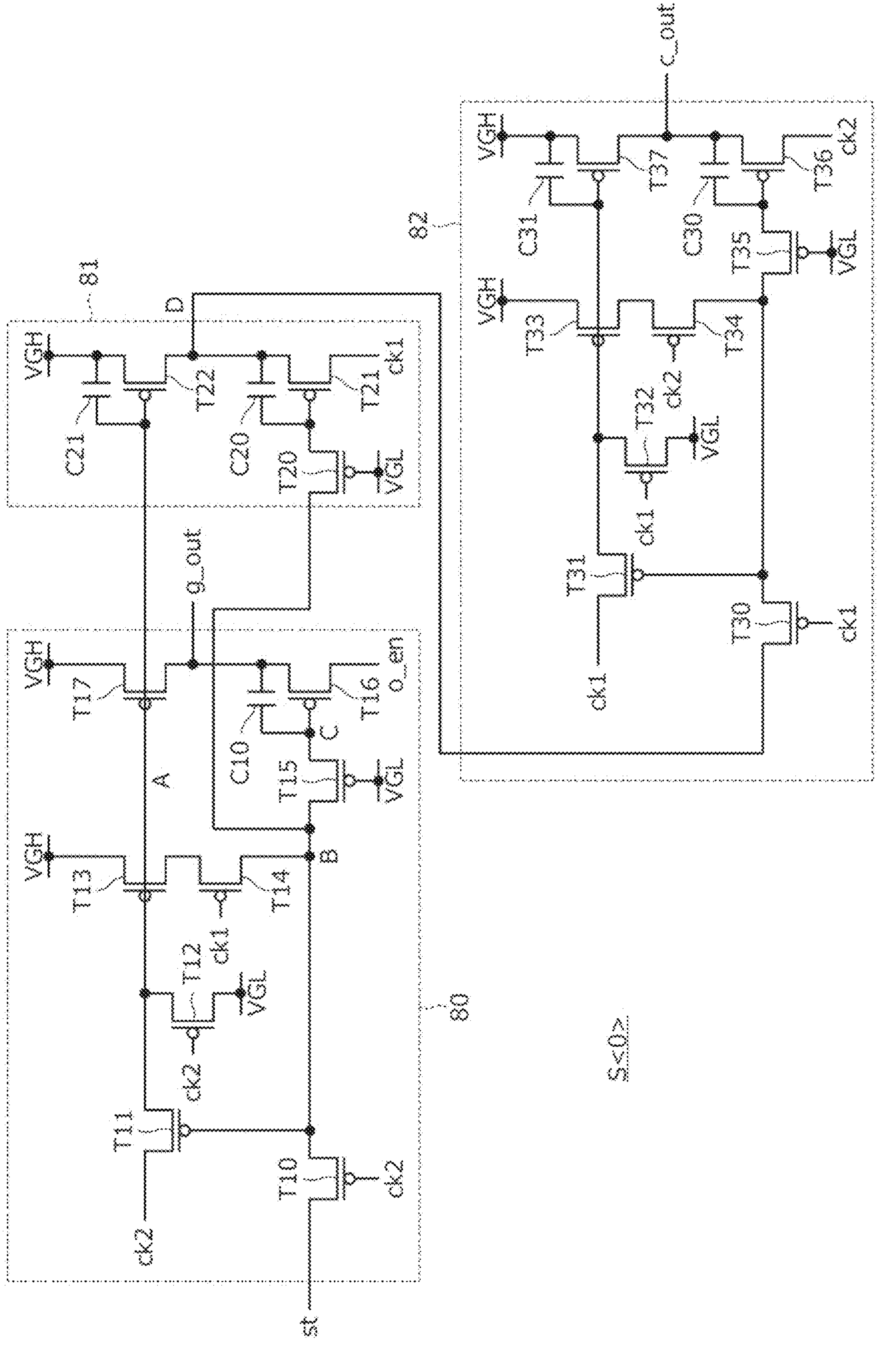
FIG. 14 is a circuit diagram illustrating the internal configuration of a shift register S<0> included in the shift registers.

FIG. 13 illustrates the specific configurational details of the shift registers SR<k> and the selection circuits SE<k> illustrated in FIGS. 9 through 12. FIG. 14 illustrates the internal configuration of the shift register S<0> (to be described below) included in the shift registers SR<k>. Although FIG. 13 illustrates only some of shift registers SR<k> and some of the selection circuits SE<k>, the other shift registers SR<k> and the other selection circuits SE<k> are identical thereto in configuration. Similarly, although FIG. 14 illustrates only the shift register S<0> included in the shift registers SR<0>, the other shift registers S<k> and shift registers xS<k> (to be described below) are identical thereto in configuration.

As illustrated in FIG. 13, each of the shift registers SR<k> includes a shift register S<k> and a shift register xS<k>. Each of the shift register S<k> and the shift register xS<k> has an input terminal st, an output terminal g_out connected to one of the selection circuits SE<k>, an output terminal c_out connected to a next-stage shift register S<k+1>, clock terminals ck1 and ck2, and an output enable terminal o_en.

The input terminal st of the shift register S<0> is supplied with the data signal Code from the sensor controller 4. The input terminal st of the shift register xS<0> is supplied with the data signal xCode from the sensor controller 4. The input terminal st of the shift register S<k+1> is supplied with a signal SR_o<k> output from the output terminal c_out of the previous-stage shift register S<k>. Similarly, the input terminal st of the shift register xS<k+1> is supplied with a signal xSR_o<k> output from the output terminal c_out of the previous-stage shift register xS<k>.

The clock terminals ck1 and ck2 are supplied with respective clock signals CK1 and CK2 from the sensor controller 4. The output enable terminal o_en is supplied with a clock signal CK3 from the sensor controller 4. The clock signals CK2 and CK3 are the same as the clock signals CK2 and CK3 described above with reference to FIGS. 9 through 12. As with the clock signals CK2 and CK3, the clock signal CK1 represents a clock signal that oscillates between the ground potential VGL and the power potential VGH.

The output terminal g_out of the shift register S<k> outputs a data signal iCode<k>, and the output terminal g_out of the shift register xS<k> outputs a data signal xiCode<k>.

As illustrated in FIG. 14, the shift register S<0> includes a register circuit 80, a buffer circuit 81, and a shift circuit 82. The register circuit 80 has transistors T10 through T17 and a capacitor C10. The buffer circuit 81 has transistors T20 through T22 and capacitors C20 and C21. "A" through "D" in FIG. 14 indicate nodes in the shift register S<0>.

All of the transistors in the switching circuits 70 through 72 that include the transistors T10 through T17 and the transistors T20 through T22 are constructed as P-channel MOSFETs in order for the switching circuits 70 through 72 to match the pixel drive circuits 35 that are also constructed as P-channel MOSFETs. Therefore, the switching circuits 70 through 72 can be fabricated by the same process as with the pixel drive circuits 35. However, since the switching circuits 70 through 72 cannot have CMOSs in their output stages as a result, the switching circuits 70 through 72 are configured to operate in a bootstrapping mode for making the gate potential of the low-side P-channel MOSFET in the output stage lower than the low level. Details of the bootstrapping mode will be described later.

The transistor T10 is connected between the input terminal st and the node B and has a gate connected to the clock terminal ck2. The transistor T11 is connected between the clock terminal ck2 and the node A and has a gate connected to the node B. The transistor T12 is connected between a ground line supplied with the ground potential VGL and the node A and has a gate connected to the clock terminal ck2. The transistors T13 and T14 are connected in series between a power line supplied with the power potential VGH and arranged in this order from the power line. The transistor T13 has a gate connected to the node A and the transistor T14 has a gate connected to the clock terminal ck1. The transistor T15 is connected between the node B and the node C and has a gate connected to the ground line supplied with the ground potential VGL. The transistor T16 is connected between the output terminal g_out and the output enable terminal o_en and has a gate connected to the node C. The transistor T17 is connected between the output terminal g_out and the power line supplied with the power potential VGH and has a gate connected to the node A. The capacitor C10 is connected between the node C and the output terminal g_out.

The transistor T20 is connected between the node B and the gate of the transistor T21 and has a gate connected to the ground line supplied with the ground potential VGL. The transistor T21 is connected between the node D that provides an input to the shift circuit 82 and the clock terminal ck1. The transistor T22 is connected to the node D and the power line supplied with the power potential VGH and has a gate connected to the node A. The capacitor C20 is connected to the node D and the gate of the transistor T21, and the capacitor C21 is connected between the node A and the source of the transistor T22.

Figure 15:
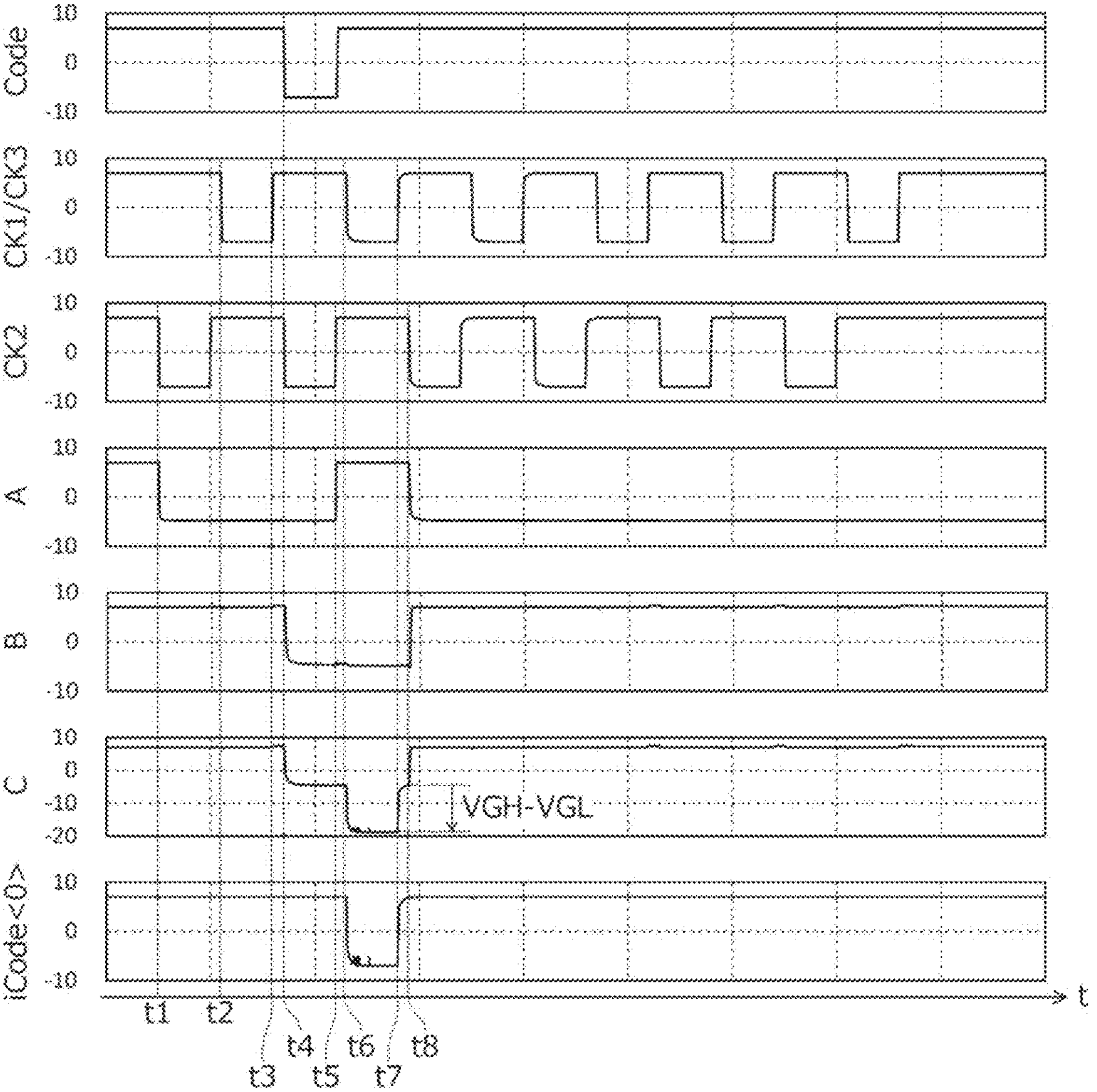
FIG. 15 is a diagram illustrating signal waveforms that simulate operation of a register circuit and a buffer circuit.

FIG. 15 illustrates signal waveforms that simulate operation of the register circuit 80 and the buffer circuit 81. Operation of the register circuit 80 will be described in detail below with reference to FIG. 15 as well as FIG. 14. FIG. 15 has a vertical axis representing voltage values. This also holds true for FIGS. 16 through 21. In FIG. 15, the clock signals CK1 and CK3 are illustrated as identical to each other. The clock signals CK1 and CK3 are identical to each other after the shift registers SR<k> have started to output signals to the selection circuits SE<k> (see FIG. 10). Stated otherwise, FIG. 15 illustrates operation of the register circuit 80 after the shift registers SR<k> have started to output signals to the selection circuits SE<k>. Before the shift registers SR<k> start to output signals to the selection circuits SE<k>, i.e., when the data signal Code is set in the shift registers SR<0> through SR<6> (see FIG. 9), the sensor controller 4 oscillates the clock signal CK1 but does not oscillate the clock signal CK3 (see FIG. 16 and other figures to be described later).

When the clock signal CK2 goes low at time t1, the transistor T12 is turned on, causing the potential at the node A drops to a low level. Therefore, the transistor T17 is turned on, making the potential at the output terminal g_out, i.e., the potential of the output signal iCode<0>, high. Although the transistor T10 is also turned on, since the data signal Code is high at this time, the node B is high, keeping the transistor T11 off. After the clock signal CK2 goes back high, when the clock signal CK1 goes low at time t2, the transistor T14 is turned on. At this time, as the potential at the node A is low and hence the transistor T13 is turned on, the node B is supplied with the power potential VGH. Thereafter, when the clock signal CK1 goes high at time t3, the transistor T14 is turned off, stopping supplying the power potential VGH to the node B.

Then, when the clock signal CK2 goes low again at time t4, as the data signal Code goes low at this time, the potential at the node B drops, turning on the transistor T11. Because the transistor T15 is kept on except in the bootstrapping mode to be described later, the potential at the node B goes low and so does the potential at the node C. At this time, inasmuch as the clock signal CK3 supplied to the output enable terminal o_en is high, the transistor T16 is turned on. Therefore, the output terminal g_out is supplied with the power potential VGH from both the transistors T16 and T17. The capacitor C10 is charged by the potential difference between the output terminal g_out and the node C.

When the clock signal CK2 goes high at time t5, the transistor T10 is turned off. Since the transistor T14 is kept off because the clock signal CK1 is kept high, the potentials at the nodes B and C remain continuously low. As a result, the transistor T11 is kept on. As the clock signal CK2 goes high, the potential at the node A that is connected to the clock terminal ck2 through the transistor T11 goes high, turning off the transistors T13 and T17.

When the clock signal CK3 goes low at time t6, the bootstrapping mode is initiated. Specifically, a current path is created from the node C through the capacitor C10 and the channel region of the transistor T16 to the output enable terminal o_en, making the potential at the node C lower from the low level. The potential drop at the node C at this time is of a value substantially equal to the difference VGH-VHL. Consequently, even when the clock signal CK3 goes low at time 6, the transistor T16 is kept on, making the potential at the output terminal g_out, i.e., the potential of the output signal iCode<0>, low. While the potential at the node C is being lower than the low level, the transistor T15 is turned off, disconnecting the node B and the node C from each other.

Thereafter, when the clock signal CK3 goes high at time t7, the transistor T16 is turned off, finishing the bootstrapping mode and making the potential at the node C back low. The potential of the output signal iCode<0> goes back high. When the clock signal CK2 goes low at time t8, the transistor T12 is turned on, making the potential at the node A back low. As a result, the transistor T17 is turned on, supplying the power potential VGH to the output terminal g_out therethrough. At time t8, the transistor T10 is also turned on, and since the data signal Code is high at this time, the potential at the node B goes high. Since the transistor T15 is turned back on, the potential at the node C also goes high.

As described above, with the register circuit 80 and the buffer circuit 81 thus configured, it is possible for the register circuit 80 to generate the output signal Code due to the bootstrapping mode without using a CMOS in the output stage of the circuit, and it is possible for the buffer circuit 81 to generate the output signal in the same way, i.e., the buffer circuit 81 is able to output an input signal for the shift circuit 82 to the node D without using a CMOS in the output stage. However, since the clock terminal ck1, instead of the output enable terminal o_en, is connected to the source of the transistor T21, the output signal from the buffer circuit 81 goes low at the timing of the clock signal CK1 going low.

FIG. 14 also illustrates the internal configuration of the shift circuit 82. As illustrated in FIG. 14, the shift circuit 82 has transistors T30 through T37 and capacitors C30 and C31. The shift circuit 82 is basically identical in configuration to the register circuit 80 in that the transistors T10 through T17 and the capacitor C20 are replaced with the transistors T30 through T37 and the capacitor C30. However, the shift circuit 82 is different from the register circuit 80 regarding some points, which will be described below.

The shift circuit 82 has an input terminal, i.e., the source of the transistor T30, that is supplied with the output signal from the buffer circuit 81, i.e., the signal at the node D. A comparison between the shift circuit 82 and the register circuit 80 indicates that the clock signal ck1 and the clock signal ck2 in the register circuit 80 are switched around in the shift circuit 82. Moreover, the clock terminal ck2, instead of the output enable terminal o_en, is connected to the source of the transistor T36. The capacitor C31 is connected between the gate and source of the transistor T37. The junction between the transistors T36 and T37 is connected to the output terminal c_out, instead of the output terminal g_out.

As a result of the above configuration of the shift circuit 82, the shift circuit 82 acquires the output signal from the buffer circuit 81 at a rising edge of the clock signal CK1 and outputs the output signal SR_o<0> from the output terminal c_out to a next stage. The shift circuit 82 also operates in the bootstrapping mode so as to be able to generate the output signal SR_o<0> without using a CMOS in its output stage.

Figure 16:
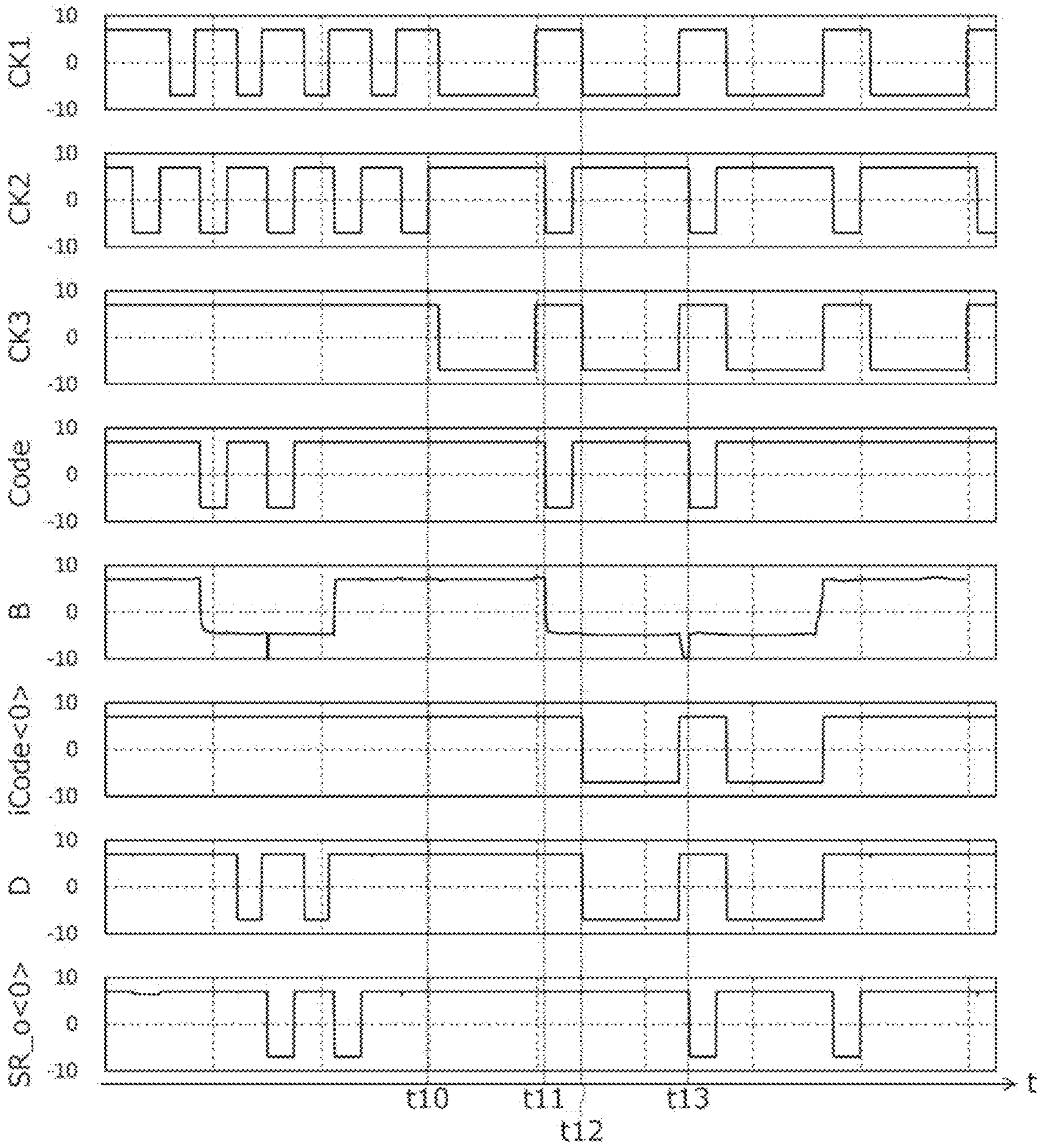
FIG. 16 is a diagram illustrating signal waveforms that simulate operation of the register circuit, the buffer circuit, and a shift circuit.

FIG. 16 illustrates signal waveforms that simulate operation of the register circuit 80, the buffer circuit 81, and the shift circuit 82. In FIG. 16, time t10 represents the timing of the completion of the setting of the data signal Code in the shift registers SR<0> through SR<6> (see FIG. 9). Prior to time t10, the sensor controller 4 does not oscillate the clock signal CK3, thereby preventing the outputting of the output signal iCode<0> while the data signal Code is being set.

As illustrated in FIG. 16, the register circuit 80 acquires the data signal Code at time t11 when the clock signal CK2 goes low and reflects the data signal Code in the potential at the node B, i.e., the potential of the output signal from the register circuit 80 to the buffer circuit 81. Then, at time t12 when the clock signal CK3 goes low, the register circuit 80 changes the output signal iCode<0> to a low level. At the same time, the buffer circuit 81 also changes the potential at the node D to a low level. The buffer circuit 81 changes the potential at the node D to the low level because the clock signal CK1, not the clock signal CK3, goes low.

At time t12 when the clock signal CK1 goes low, the shift circuit 82 acquires the output signal from the buffer circuit 81, i.e., the potential at the node D. At time t13 when the clock signal CK2 goes low, the shift circuit 82 changes the output signal SR_o<0> to a low level. It is thus possible for the register circuit 80 of the next-stage shift register S<1> to reflect the data signal Code in the output signal iCode<1> one clock pulse later than the register circuit 80 of the shift register S<0>.

Figure 17:
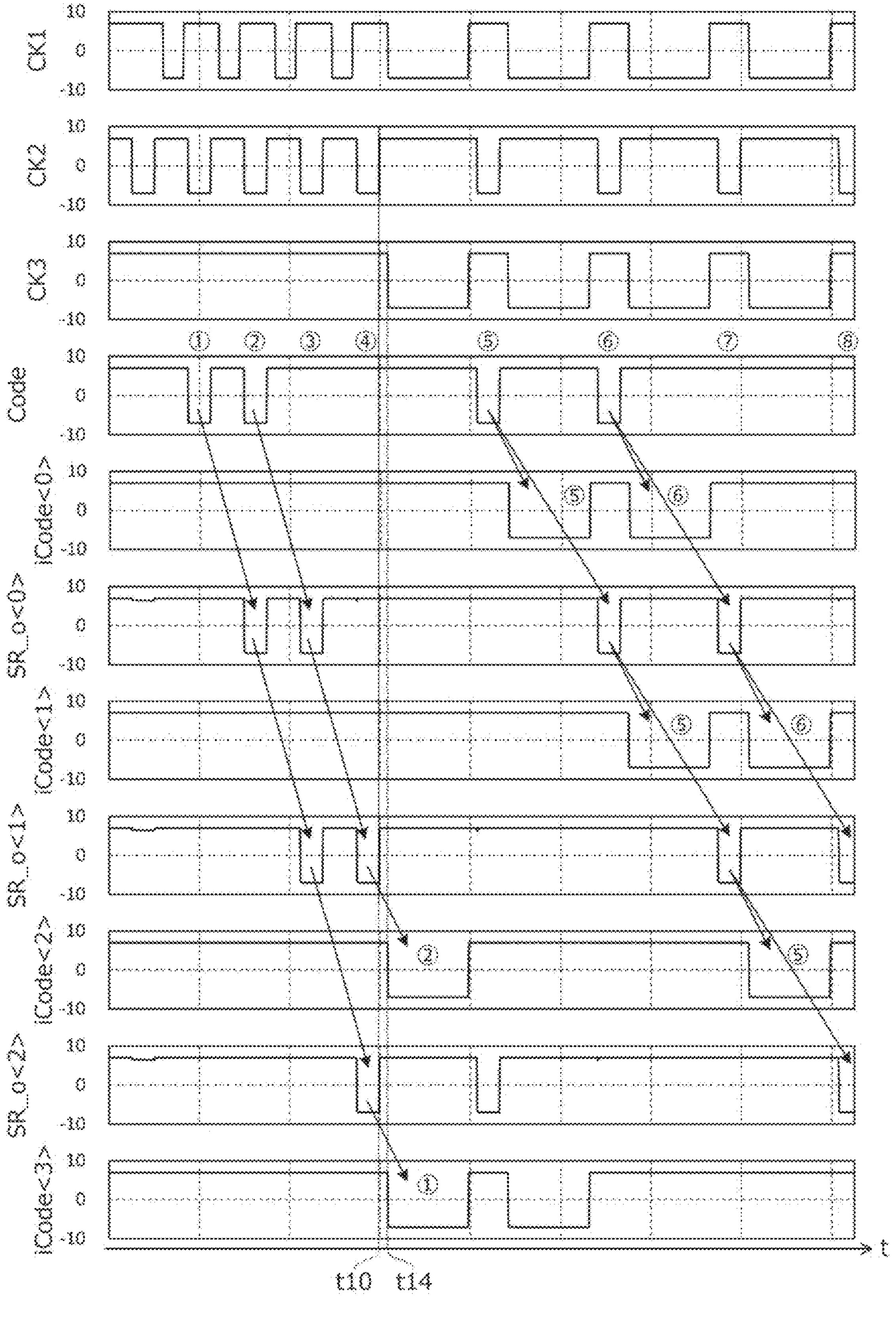
FIG. 17 is a diagram illustrating signal waveforms that simulate various signals applied to respective stages of the shift registers in the same simulation as with FIG. 16.
Figure 18:
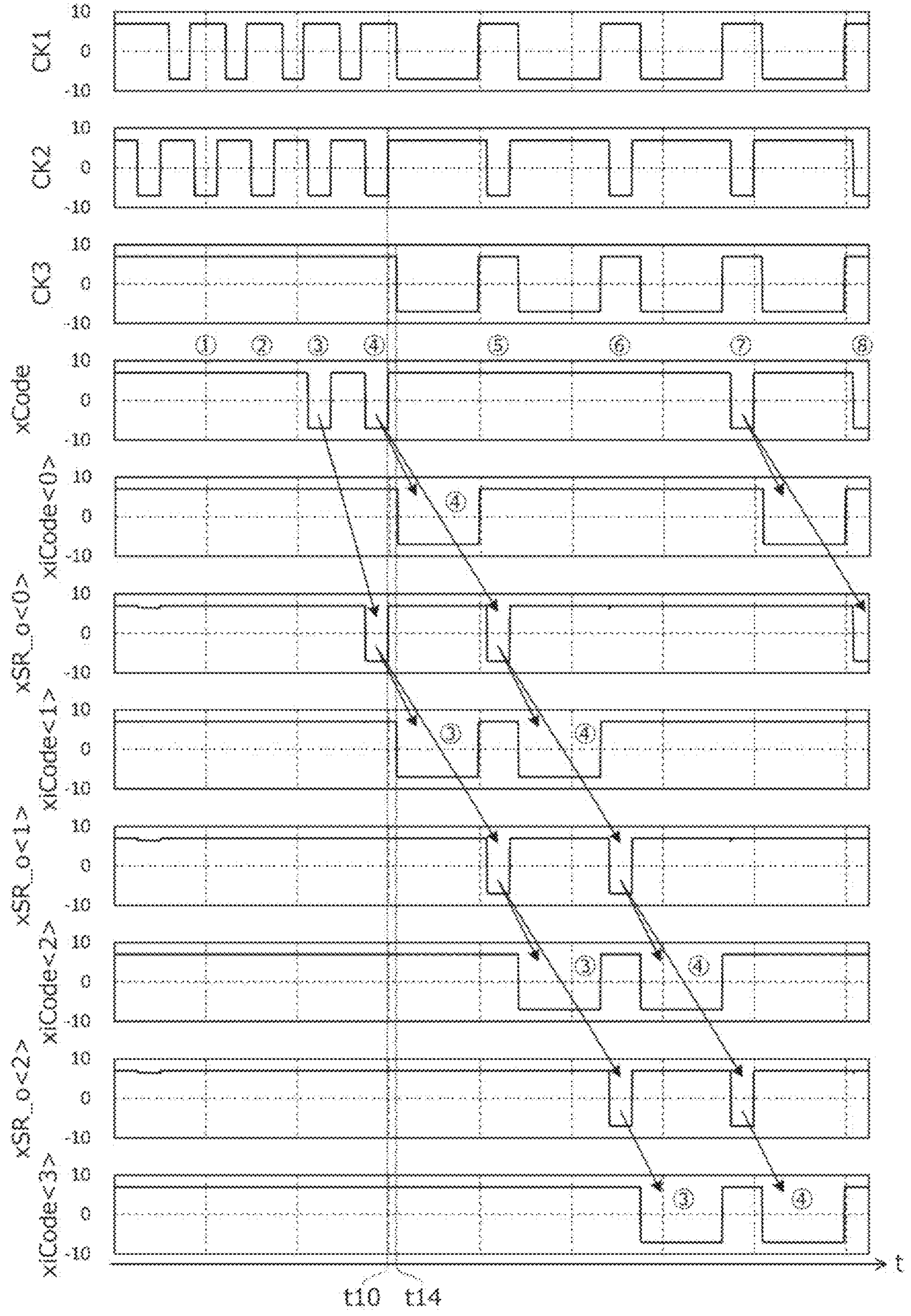
FIG. 18 is a diagram illustrating signal waveforms that simulate various signals applied to respective stages of the shift registers in the same simulation as with FIG. 16.
Figure 19:
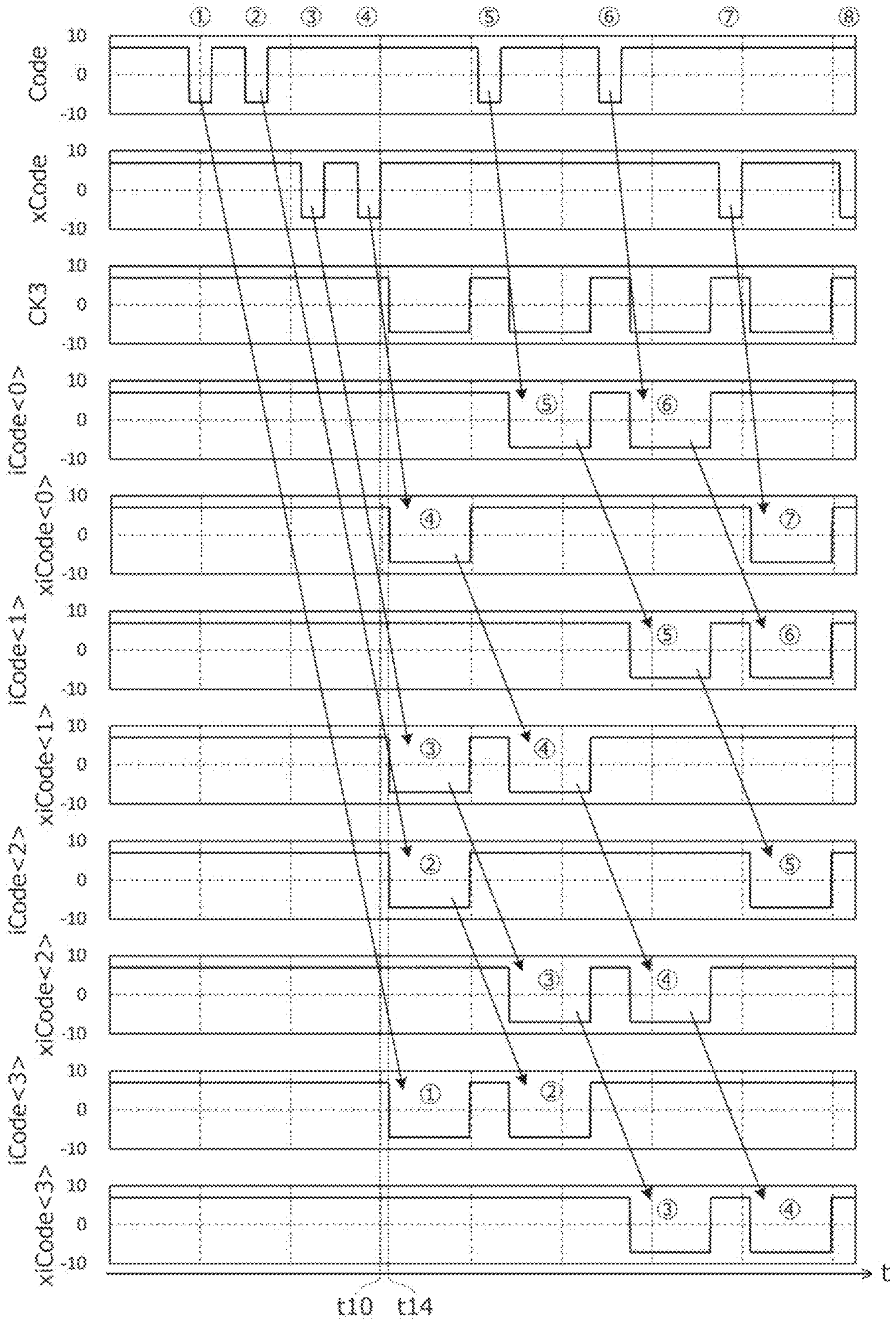
FIG. 19 is a diagram illustrating signal waveforms that simulate various signals applied to respective stages of the shift registers in the same simulation as with FIG. 16.

FIGS. 17 through 19 illustrate signal waveforms that simulate various signals applied to respective stages of the shift registers SR<k> in the same simulation as with FIG. 16. Specifically, FIG. 17 illustrates signal waveforms that simulate output signals iCode<0> through iCode<3> and output signals SR_o<0> through SR_o<2>. FIG. 18 illustrates signal waveforms that simulate output signals xiCode<0> through xiCode<3> and output signals xSR_o<0> through xSR_o<2>. FIG. 19 illustrates signal waveforms that simulate output signals iCode<0> through iCode<3> on the "+1" side and output signals xiCode<0> through xiCode<3> on the "−1" side. Due to space limitations, FIGS. 17 through 19 illustrate an example in which the switching circuit 71 has shift registers SR<k> in four stages (k=0 through 3). However, similar waveforms are applicable to shift registers SR<k> in seven stages.

In FIGS. 17 through 19, encircled numbers refer to the order and timing at which phase setting values are supplied from the sensor controller 4 to the switching circuit 71. In the illustrated example, eight setting values are supplied in the order of "+1," "+1," "−1," "−1," "+1," "+1," "−1," "−1."

As understood from FIGS. 17 through 19, the phase setting values represented by the data signal Code are transferred to successive next stages in synchronism with the clock signal CK2. At time t10 also illustrated in FIG. 16, the first setting value is set in the shift register SR<3>, the second setting value is set in the shift register SR<2>, the third setting value is set in the shift register SR<1>, and the forth setting value is set in the shift register SR<0>. At time t14 when the clock signal CK3 goes low, the shift registers SR<0> through SR<3> simultaneously output the respective first through fourth setting values.

Subsequently, the phase setting values represented by the data signal Code are transferred to the shift registers SR<k> at the successive next stages in synchronism with the clock signal CK2. At the same time, the shift registers SR<k> at the respective stages output the setting values to the selection circuits SE<k> in synchronism with the clock signal CK3. The switching circuit 71 according to the first embodiment is thus able to output the setting values supplied by the data signals Code and xCode simultaneously from the respective shift registers SR<k>.

Referring back to FIG. 13, the selection circuit SE<0> represents a circuit for switching between the connections between the drive lines 90 and 91 and the corresponding routing path 61, and has transistors T1 through T5 and capacitors C1 and C2. The transistor T1 is connected between the output terminal g_out of the shift register S<0> and the gate of the transistor T2. The gate of the transistor T1 is connected to the ground line supplied with the ground potential VGL. The transistor T2 is connected between the drive line 90 and the drain of the transistor T5. The capacitor C1 is connected between the drain of the transistor T5 and the gate of the transistor T2. The transistor T3 is connected between the output terminal g_out of the shift register xS<0> and the gate of the transistor T4. The gate of the transistor T3 is connected to the ground line supplied with the ground potential VGL. The transistor T4 is connected between the drive line 91 and the drain of the transistor T5. The capacitor C2 is connected between the drain of the transistor T5 and the gate of the transistor T4. The source of the transistor T5 is connected to the power line supplied with the power potential VGH. The gate of the transistor T5 is supplied with a clock signal xCK3 that is an inverted signal of the clock signal CK3. The drain of the transistor T5 is connected to the linear electrode 53 through the routing path 61. The transmission signal Tx<0> that is an output signal from the selection circuit SE<0> is extracted from the drain of the transistor T5.

Figure 20:
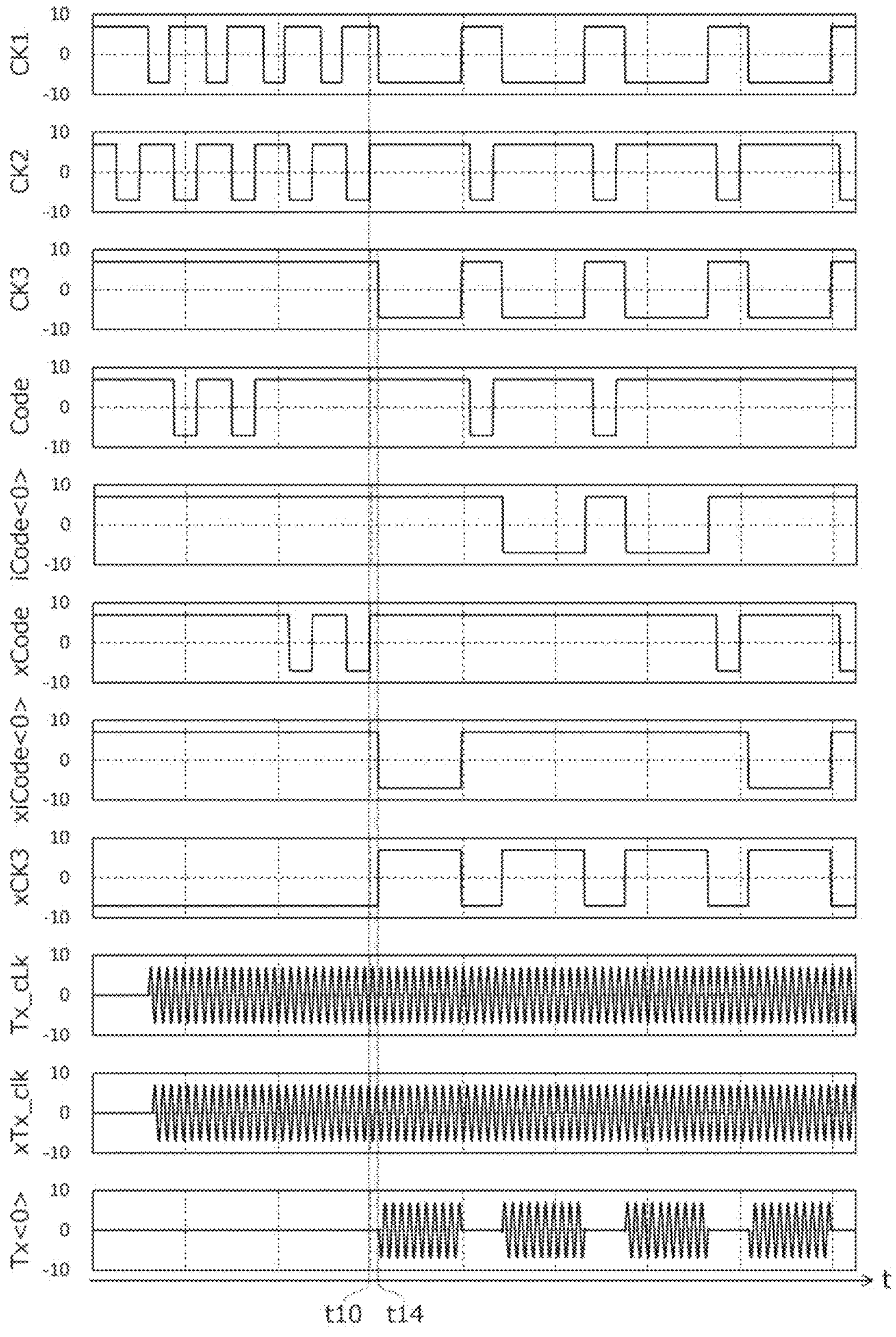
FIG. 20 is a diagram illustrating signal waveforms that simulate various signals applied to a selection circuit in the same simulation as with FIGS. 16 through 19.

FIG. 20 illustrates signal waveforms that simulate various signals applied to the selection circuit SE<0> in the same simulation as with FIGS. 16 through 19. The selection circuit SE<0> configured as described above outputs the drive signal Tx_clk when the clock signal xCK3 is high, i.e., when the transistor T5 is turned off, and the output signal iCode<0> of the shift register SR<0> is low, and outputs the drive signal xTx_clk when the clock signal xCK3 is high and the output signal xiCode<0> of the shift register SR<0> is low.

Figure 21:
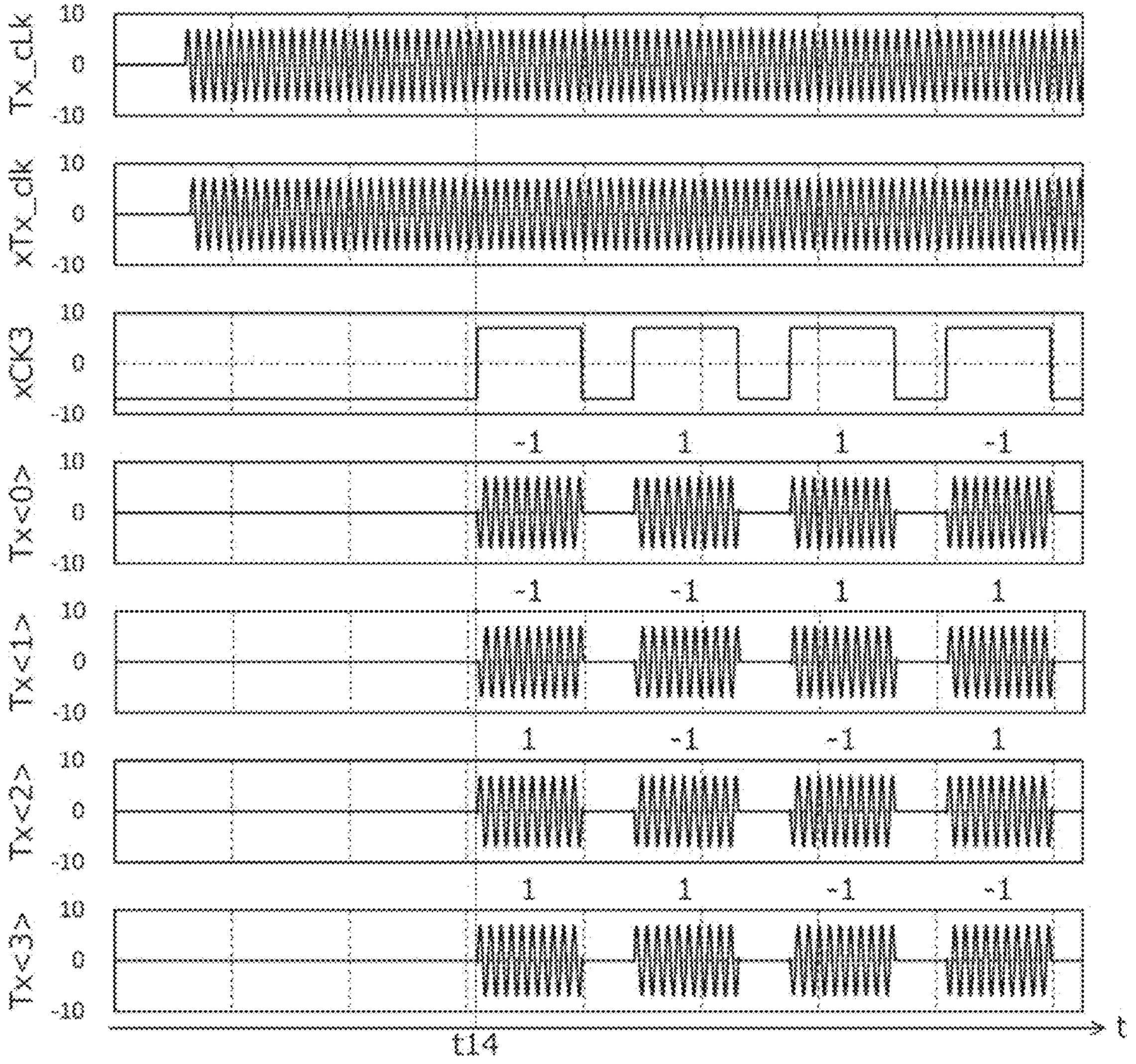
FIG. 21 is a diagram illustrating signal waveforms that simulate the transmission signals that are output from selection circuits in the same simulation as with FIGS. 16 through 20.

FIG. 21 illustrates signal waveforms that simulate the transmission signals Tx<0> through Tx<3> that are output from the selection circuits SE<0> through SE<3> in the same simulation as with FIGS. 16 through 20. As understood from a comparison between FIGS. 19 and 21, the switching circuit 71 according to the first embodiment outputs the transmission signals Tx<k> that are in opposite phase when the output signal iCode<k> is activated and when the output signal xiCode<k> is activated. Therefore, the switching circuit 71 can be said to control the phases of the transmission signals Tx<k> with the data signals Code and iCode. Using these properties, the switching circuit 71 generates the transmission signals Tx<0> through Tx<6> depending on the series of setting values supplied from the sensor controller 4 and supplies the generated transmission signals Tx<0> through Tx<6> to the linear electrodes 53.

Referring back to FIG. 1, the host processor 3 performs, in addition to the process for displaying images based on video signals, a process of moving a cursor displayed on the display surface of the organic EL display 2 and a process of generating stroke data indicative of the path followed by the electromagnetic resonance stylus P or the finger F on the touch surface, using positions and data supplied from the sensor controller 4. With respect to the stroke data, the host processor 3 also performs a process of rendering and displaying the generated stroke data, a process of generating and recording digital ink including the generated stroke data, and a process of transmitting the generated digital ink to an external device in response to an instruction from the user.

The computer 1 according to the first embodiment offers the following advantages. Since the switching circuits 70 through 72 are disposed in the display layer 10 within the display area A1, attempts to reduce the size of the bezel area A2 are not obstructed and the circuit scale of the sensor controller 4 is prevented from increasing while, at the same time, the positions of both the finger F and the electromagnetic resonance stylus P can be detected.

The computer 1 according to the first embodiment is further advantageous as follows. As the routing paths 60 through 62 interconnecting the switching circuits 70 through 72 and the linear electrodes 52 and 53 extend from the upper side of the encapsulation layer 13 to the lower side thereof over and around the dams 44 in and along the edge portion of the encapsulation layer 13, thereby enclosing the dams 44, it is possible to place the switching circuits 70 through 72 in the display layer 10 within the display area A1.

Furthermore, the computer 1 according to the first embodiment is advantageous as follows. Since all of the drive circuits 110 and 111 disposed in the display layer 10 driving for the linear electrodes 53 are constructed of MOSFETs of the same channel type, the cost of manufacturing the organic EL display 2 is prevented from increasing while the drive circuits 110 and 111 for driving the linear electrodes 53 are disposed in the display layer 10.

In addition, the computer 1 according to the first embodiment offers the following advantages. The phase setting values supplied to the drive circuits 110 and 111 in the switching circuits 71 and 72 are represented by the two low-active data signals Code and xCode, and the switching circuits 71 and 72 are configured so as to be operable in the bootstrapping mode. Therefore, it is possible to construct the drive circuits 110 and 111 for the linear electrodes 53 of MOSFETs of the same channel type.

According to the first embodiment, as described above with reference to FIG. 6, the alternating currents $i_A$ and $i_B$ or the transmission signals Tx are supplied from both the switching circuits 71 and 72 to the linear electrodes 53. However, the alternating currents is and i or the transmission signals Tx may alternatively be supplied from only one of the switching circuits 71 and 72 to the linear electrodes 53.

Figure 22B:
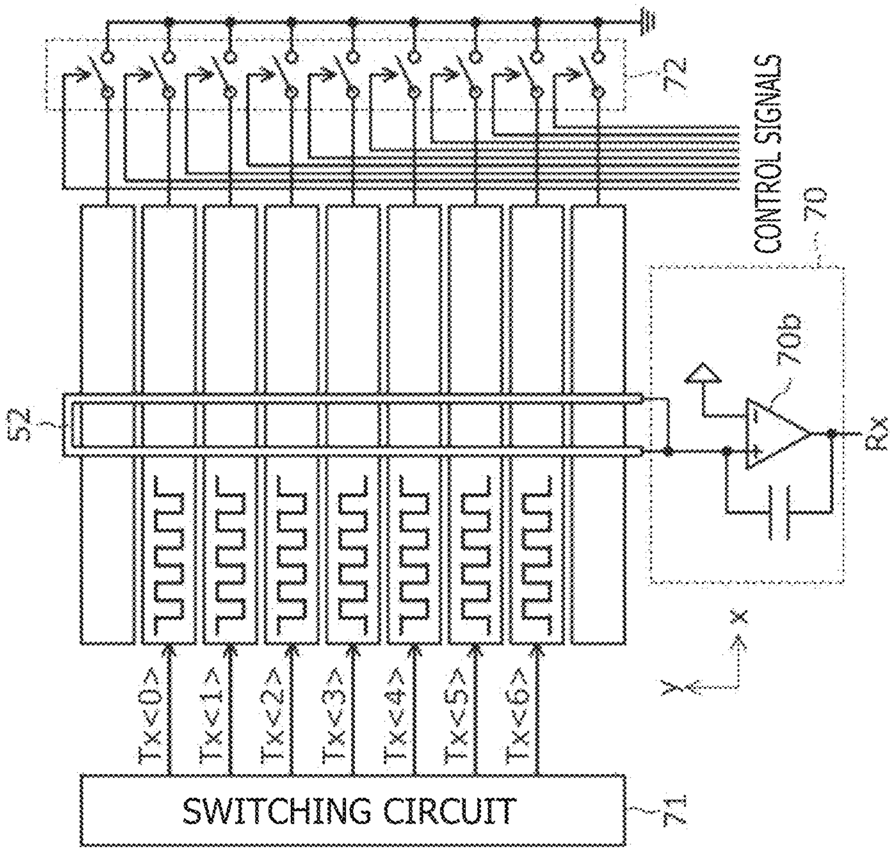
FIGS. 22A and 22B are block diagrams illustrating the manner in which a sensor controller controls switching circuits in a computer according to a modification of the first embodiment.
Figure 22A:
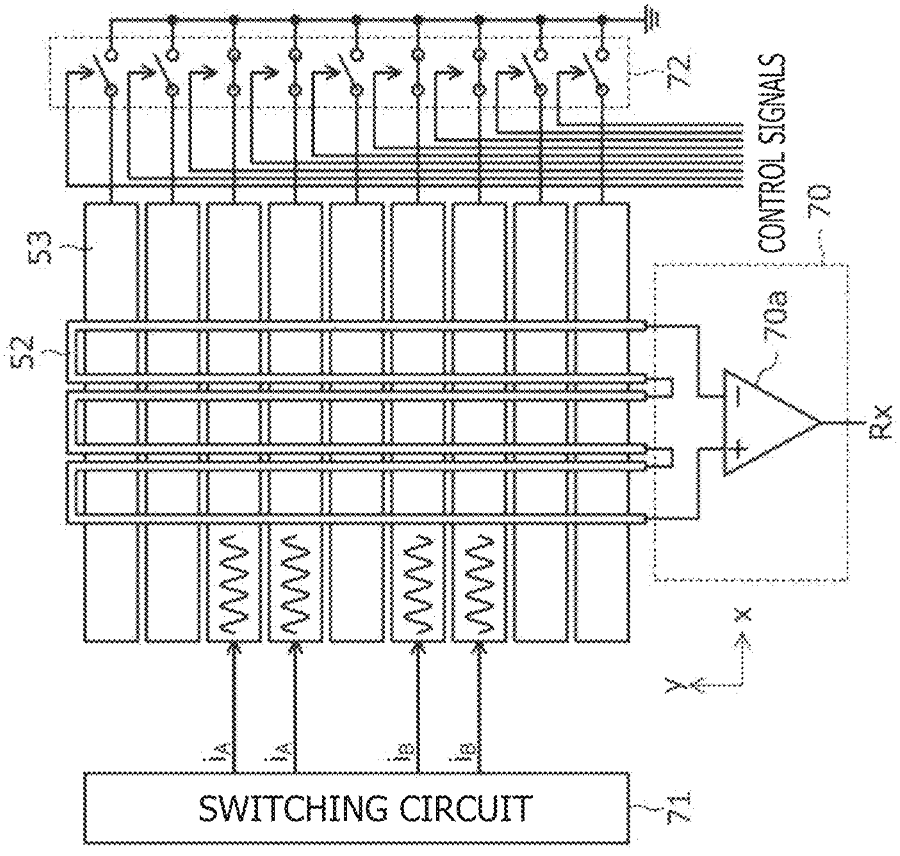

FIGS. 22A and 22B illustrate in block form the manner in which a sensor controller 4 controls switching circuits in a computer 1 according to a modification of the first embodiment. FIG. 22A illustrates in block form the manner in which the sensor controller 4 that has entered a first mode controls the switching circuits, and FIG. 22B illustrates in block form the manner in which the sensor controller 4 that has entered a second mode controls the switching circuits.

As illustrated in FIGS. 22A and 22B, a switching circuit 72 according to the present modification includes a plurality of single-pole single-throw switches connected between the ends remote from the switching circuit 71 in the x-direction of the linear electrodes 53 and a reference line supplied with a reference potential such as a ground potential.

The sensor controller 4 according to the modification uses the illustrated control signals to control the switches in the switching circuit 72 to connect those linear electrodes 53 to be supplied with alternating current $i_A$ and $i_B$ to the reference line in the first mode and to disconnect the other linear electrodes 53 from the reference line, and also to control the switches in the switching circuit 72 to disconnect all the linear electrodes 53 from the reference line in the second mode.

According to the modification, as with the first embodiment, the positions of both the finger F and the electromagnetic resonance stylus P can appropriately be detected. With the switches of the switching circuit 72 being disposed in the display layer 10 within the display area A1, attempts to reduce the size of the bezel area A2 are not obstructed and the circuit scale of the sensor controller 4 is prevented from increasing while, at the same time, the positions of both the finger F and the electromagnetic resonance stylus P can be detected.

According to the first embodiment, it has been described that the drive lines 90 through 93 extend in the display area A1. However, the drive lines 90 through 93 may alternatively extend in the bezel area A2. According to the alternative, the switching circuits 71 and 72 in the display area A1 and the drive lines 90 through 93 may be interconnected by lines that extend below and across the dams 44.

A computer 1 according to a second embodiment of the present disclosure will be described below. The computer 1 according to the second embodiment is different from the computer 1 according to the first embodiment in that linear electrodes 52 and 53 are arranged in a manner different by 90° relative to those of the first embodiment, switching circuits 70 and 71 are disposed in the bezel area A2, and a switching circuit 72 has a different internal configuration. Since the computer 1 according to the second embodiment is identical to the computer 1 according to the first embodiment as to other points, those different features of the computer 1 according to the second embodiment will be described below.

Figure 23:
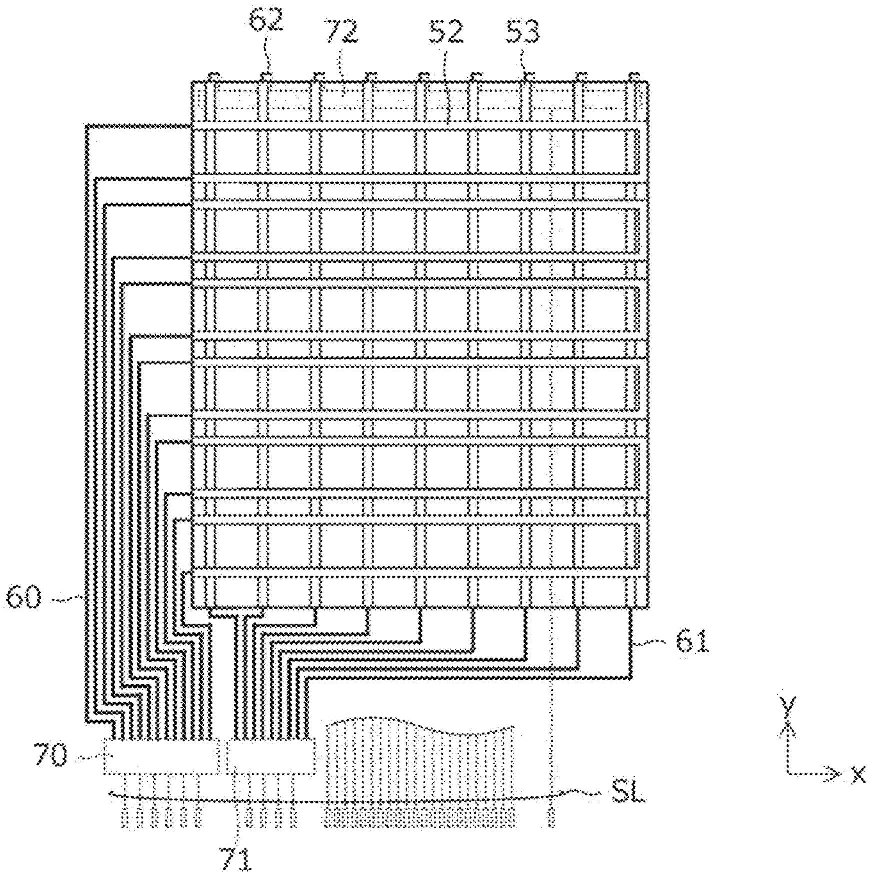
FIG. 23 is a plan view of a sensor layer according to a second embodiment of the present disclosure.
Figure 24:
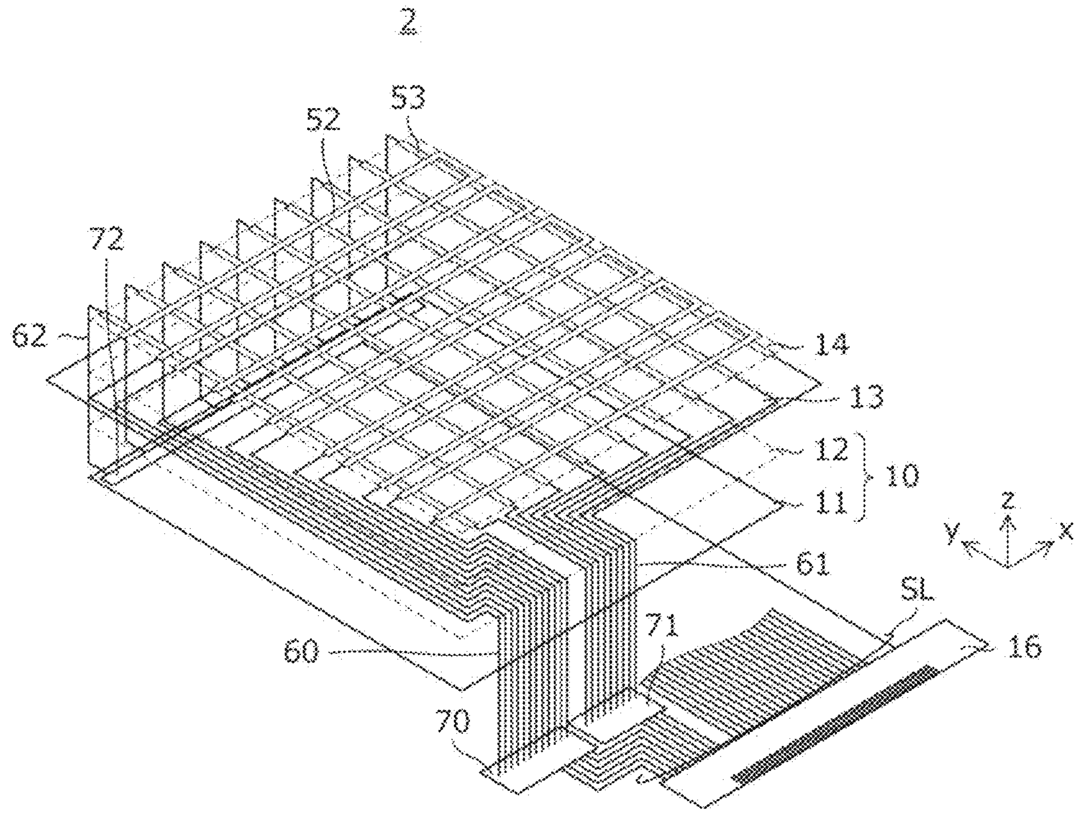
FIG. 24 is a perspective view of an organic EL display according to the second embodiment.

FIG. 23 is a plan view of a sensor layer 14 according to the second embodiment. FIG. 24 illustrates in perspective an organic EL display 2 according to the second embodiment. In FIG. 23, some structural details of a circuit layer 11 and lines SL are depicted in broken lines. In FIG. 24, the positions of the organic EL layer 12 and an encapsulation layer 13 are depicted in broken lines, and some structural details of the circuit layer 11 are depicted. In FIGS. 23 and 24, only six linear electrodes 52 and nine linear electrodes 53 are depicted for illustrative purposes. Actually, however, the sensor layer 14 has more linear electrodes 52 and 53.

As understood from a comparison between FIGS. 23 and 24 and FIGS. 3 and 4, the linear electrodes 52 and 53 of the organic EL display 2 according to the second embodiment are arranged in a manner different by 90° relative to those of the organic EL display 2 according to the first embodiment. According to the second embodiment, therefore, the switching circuit 72 extends along an edge of the display area A1 that is remote from a terminal area 16.

The switching circuits 70 and 71 according to the second embodiment are disposed in the circuit layer 11 within the bezel area A2. Therefore, routing paths 60 and 61 do not extend over and around the dams 44 in and along the edge portion of the encapsulation layer 13, thereby enclosing the dams 44. However, as with the first embodiment, the routing paths 60 and 61 may be disposed in the circuit layer 11 within the display area A1. The routing paths 60 and 61 disposed in the circuit layer 11 extend from an upper side of the encapsulation layer 13 to a lower side thereof over and around dams 44 (see FIG. 2) in and along the edge portion of the encapsulation layer 13, thereby enclosing the dams 44.

The switching circuit 72 according to the second embodiment is disposed in the circuit layer 11 in the display area A1, as with the first embodiment. Therefore, a routing path 62 extends from the upper side of the encapsulation layer 13 to the lower side thereof over and around the dams 44 (see FIG. 2) in and along the edge portion of the encapsulation layer 13, thereby enclosing the dams 44. However, the switching circuit 72 according to the second embodiment does not have the drive circuits 110 and 111 for generating and supplying the alternating currents $i_A$ and $i_B$ and the transmission signals Tx<0> through Tx<6>, and is constructed of a simple set of switches. This feature will be described in detail below with reference to FIGS. 25A and 25B.

Figure 25B:
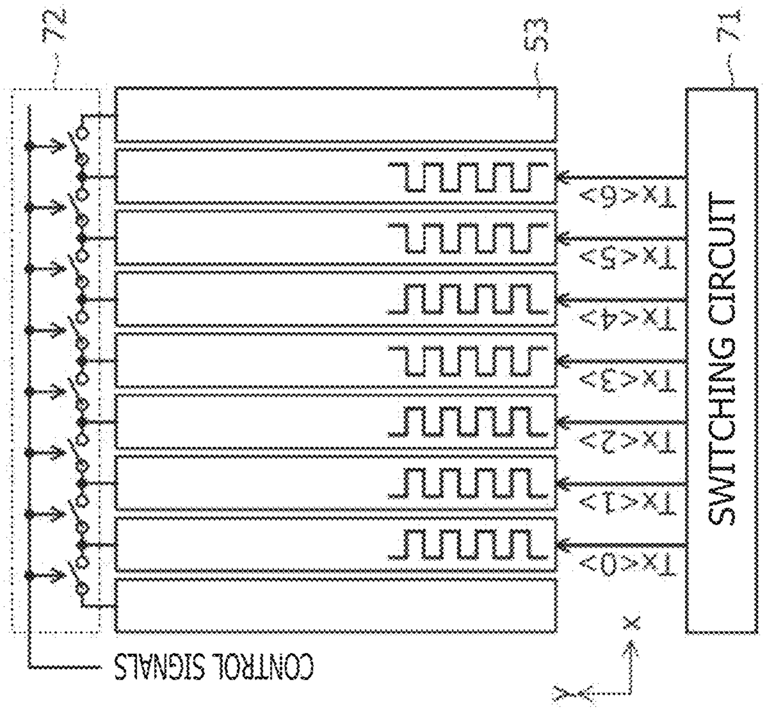
FIGS. 25A and 25B are block diagrams illustrating the manner in which a sensor controller controls switching circuits in a computer according to the second embodiment.
Figure 25A:
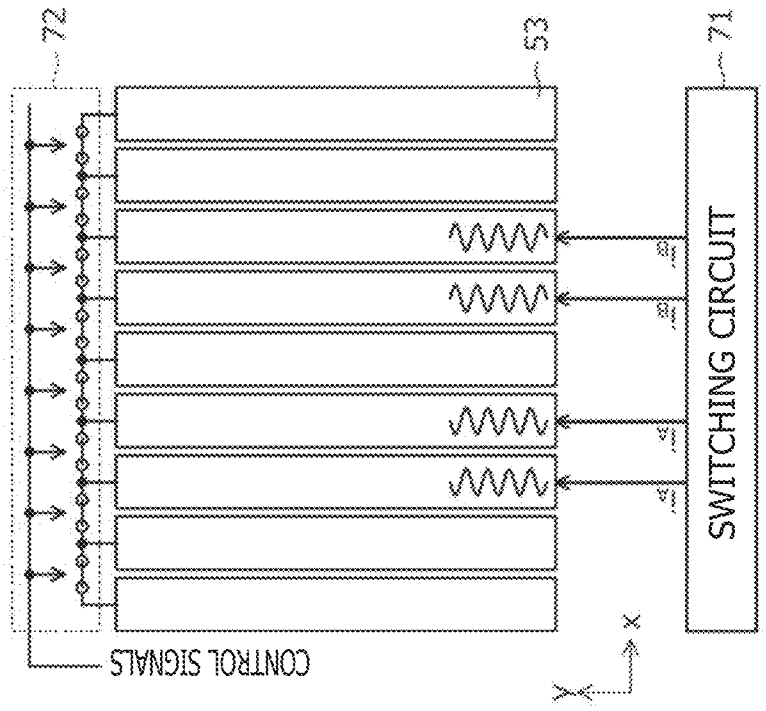

FIGS. 25A and 25B illustrate in block form the manner in which the sensor controller 4 controls switching circuits in the computer 1 according to the second embodiment. FIG. 25A illustrates in block form the manner in which the sensor controller 4 that has entered the first mode controls the switching circuits, and FIG. 25B illustrates in block form the manner in which the sensor controller 4 that has entered the second mode controls the switching circuits. In FIGS. 25A and 25B, the linear electrodes 52 and the switching circuit 70 are omitted from illustration. The linear electrodes 52 and the switching circuit 70 are identical to those illustrated in FIGS. 6A and 6B except that the linear electrodes 52 extend in the x-direction.

As illustrated in FIGS. 25A and 25B, the switching circuit 72 according to the second embodiment includes a plurality of single-pole single-throw switches each connected between the ends remote from the switching circuit 71 in the y-direction of adjacent two of the linear electrodes 53. The sensor controller 4 uses the illustrated control signal to control the switches to connect all of the adjacent twos of the linear electrodes 53 in the first mode and also to control the switches to disconnect all of the adjacent twos of the linear electrodes 53 in the second mode. The ends remote from the switching circuit 71 in the y-direction of the linear electrodes 53 in the second mode are in the same state as the state illustrated in FIG. 22B. On the other hand, the ends remote from the switching circuit 71 in the y-direction of the linear electrodes 53 in the first mode are in a different state from the state illustrated in FIG. 22A. However, even though the linear electrodes 53 are connected as illustrated in FIG. 25A, the sensor controller 4 can appropriately detect the position of the electromagnetic resonance stylus P.

The computer 1 according to the second embodiment is advantageous as follows. Since the switching circuit 72 is disposed in the display layer 10 within the display area A1, attempts to reduce the size of the bezel area A2 are not obstructed and the circuit scale of the sensor controller 4 is prevented from increasing while, at the same time, the positions of both the finger F and the electromagnetic resonance stylus P can be detected. The switching circuits 70 and 71 may also be disposed in the display layer 10 within the display area A1 for thereby enhancing the advantages described above.

A computer 1 according to a third embodiment of the present disclosure will be described below. The computer 1 according to the third embodiment is different from the computer 1 according to the second embodiment in that linear electrodes 52 and 53 are made of a mesh conductor and the computer 1 further include switching circuits 73 through 75. Since the computer 1 according to the third embodiment is identical to the computer 1 according to the second embodiment as to other points, those different features of the computer 1 according to the third embodiment will be described below.

Figure 26:
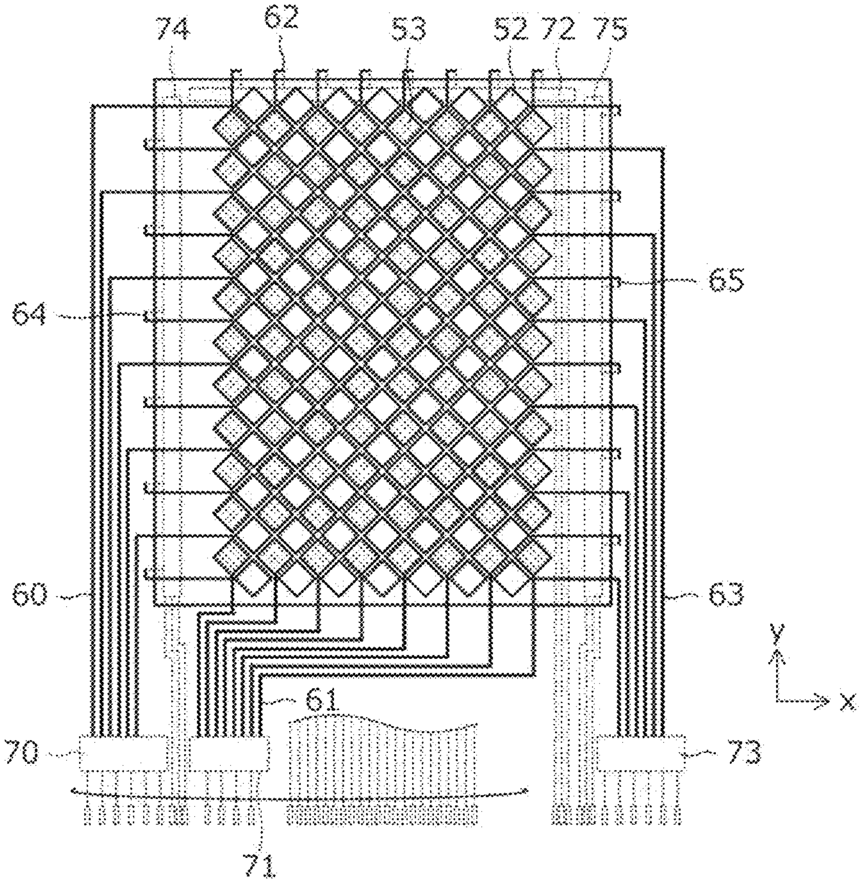
FIG. 26 is a plan view of a sensor layer according to a third embodiment of the present disclosure.
Figure 27:
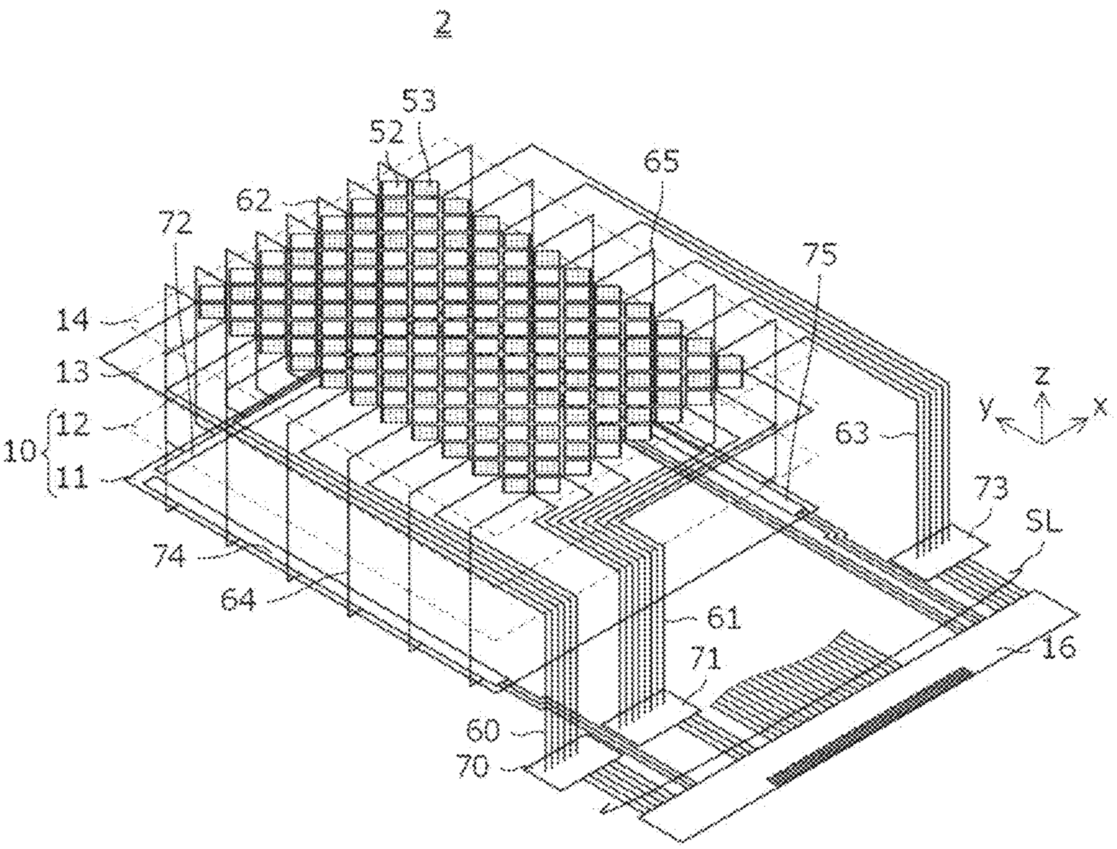
FIG. 27 is a perspective view of an organic EL display according to the third embodiment.

FIG. 26 is a plan view of a sensor layer 14 according to the third embodiment. FIG. 27 illustrates in perspective an organic EL display 2 according to the third embodiment. In FIG. 26, some structural details of a circuit layer 11 and lines SL are depicted in broken lines. In FIG. 27, the positions of the organic EL layer 12 and an encapsulation layer 13 are depicted in broken lines, and some structural details of the circuit layer 11 are depicted. In FIGS. 26 and 27, only twelve linear electrodes 52 and eight linear electrodes 53 are depicted for illustrative purposes. Actually, however, the sensor layer 14 has more linear electrodes 52 and 53.

The linear electrodes 52 and 53 are made of a mesh conductor in the form of thin wires combined in lozenge shapes and joined in chains. Although not depicted, portions of one of the lozenge shapes of the linear electrodes 52 are connected to portions of another one of the lozenge shapes that is positioned adjacent to the one lozenge shape in the y-direction, and portions of one of the lozenge shapes of the linear electrodes 53 are connected to portions of another one of the lozenge shapes that is positioned adjacent to the one lozenge shape in the x-direction. The linear electrodes 52 and 53 according to the third embodiment may alternatively be made of a solid conductor as with the first and second embodiments. Conversely, the linear electrodes 52 and 53 according to the first and second embodiments may alternatively be made of a mesh conductor according to the third embodiment.

The switching circuits 73 through 75 represent circuits for switching between a first mode in which a sensor controller 4 uses the linear electrodes 52 and 53 to detect induced currents and a second mode in which the sensor controller 4 uses the linear electrodes 52 and 53 to detect capacitances. According to the third embodiment, the switching circuits 70, 71, and 73 are disposed in the circuit layer 11 within the bezel area A2, whereas the switching circuits 72, 74, and 75 are disposed in the circuit layer 11 within the display area A1. However, all of the switching circuits 70 through 75 may be disposed in the circuit layer 11 within the display area A1.

Ends in the x-direction of the respective linear electrodes 52 are alternately connected to the switching circuit 70 and the switching circuit 74. The other ends in the x-direction of the respective linear electrodes 52 are alternately connected to the switching circuit 73 and the switching circuit 75. More specifically, those linear electrodes 52 whose ends in the x-direction are connected to the switching circuit 70 have the other ends in the x-direction connected to the switching circuit 75, and those linear electrodes 52 whose ends in the x-direction are connected to the switching circuit 74 have the other ends in the x-direction connected to the switching circuit 73. The alternate connections of the linear electrodes 52 make it possible to equalize the widths of the both sides of the bezel area A2 in the x-direction.

The linear electrodes 52 and the switching circuit 70 are connected to each other by routing paths 60, whereas the linear electrodes 52 and the switching circuit 74 are connected to each other by routing paths 64. The linear electrodes 52 and the switching circuit 73 are connected to each other by routing paths 63, whereas the linear electrodes 52 and the switching circuit 75 are connected to each other by routing paths 65. As the switching circuits 74 and 75 are disposed in the circuit layer 11 within the display area A1, the routing paths 64 and 65 extend from an upper side of the encapsulation layer 13 to a lower side thereof over and around dams 44 (see FIG. 2) in and along the edge portions of the encapsulation layer 13, thereby enclosing the dams 44.

The switching circuit 73 is identical in configuration to and separate from the switching circuit 70 and is capable of performing similar processes to those performed by the switching circuit 70. Specifically, the switching circuit 73 includes reception circuits and selection circuits similar to those of the switching circuit 70, and is controlled by the sensor controller 4 to switch between the reception circuits to be used and also between the connection destinations for each of the linear electrodes 52 for extracting a reception signal Rx from each of the linear electrodes 52.

Figure 28:
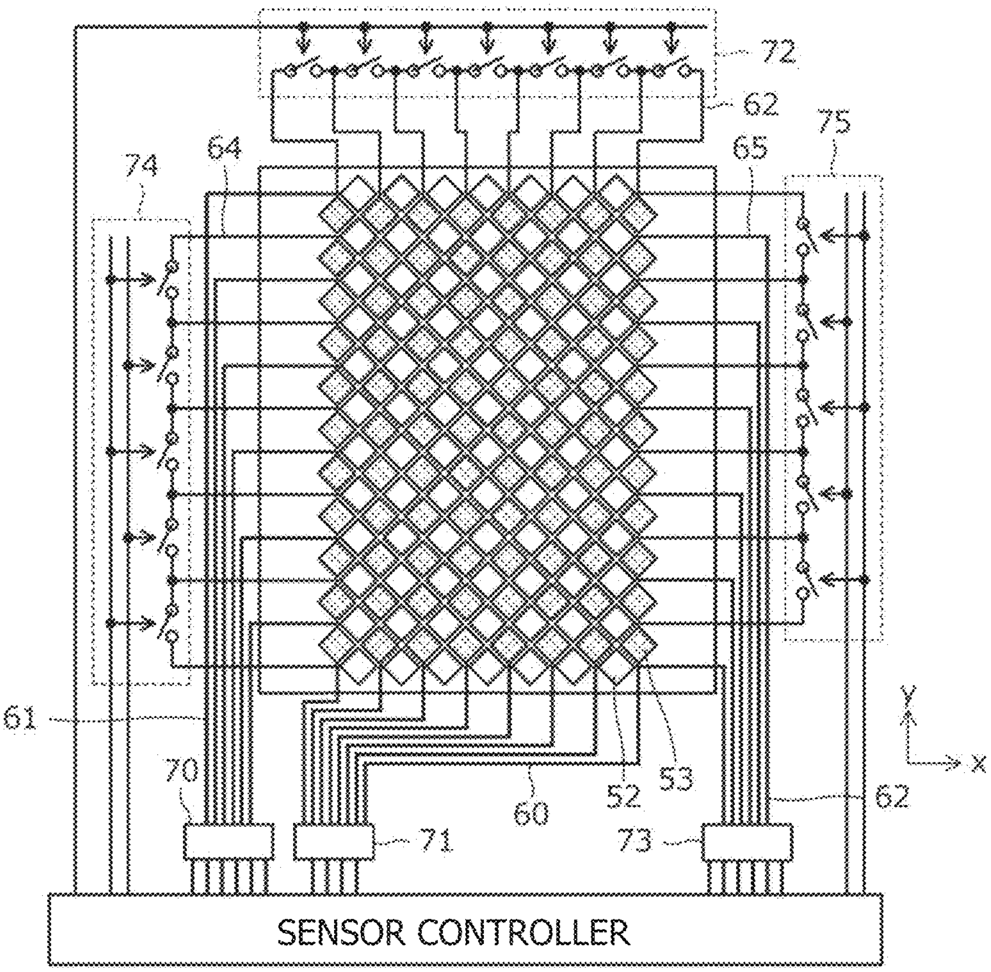
FIG. 28 is a circuit diagram illustrating the internal configurations of switching circuits according to the third embodiment.

FIG. 28 illustrates the internal configurations of the switching circuits 72, 74, and 75. As illustrated in FIG. 28, the switching circuit 72 is identical in configuration to the switching circuit 72 according to the second embodiment.

The switching circuit 74 includes a plurality of single-pole single-throw switches each connected between the ends remote from the switching circuit 75 in the x-direction of adjacent two of the linear electrodes 52. Similarly, the switching circuit 75 includes a plurality of single-pole single-throw switches each connected between the ends remote from the switching circuit 74 in the x-direction of adjacent two of the linear electrodes 52. The switching circuits 74 and 75 are configured so as to be able to control their switches to be turned on and off with alternately different control signals supplied thereto from the sensor controller 4.

Figure 29:
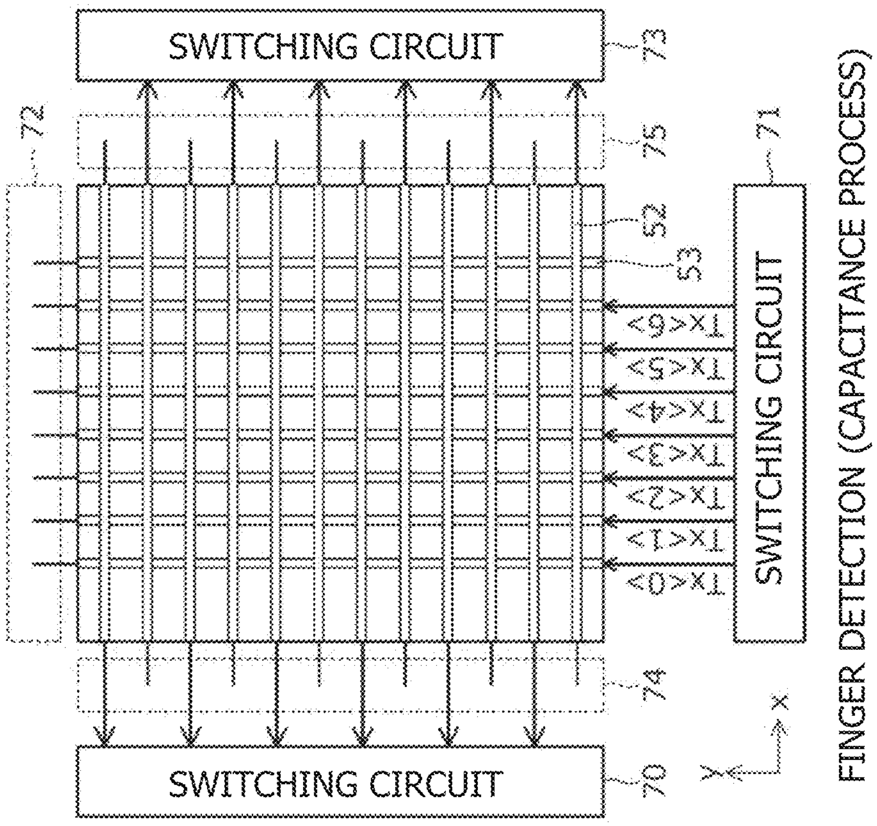
FIG. 29 is a block diagram illustrating the manner in which a sensor controller that has entered a second mode controls switching circuits in a computer according to the third embodiment.
Figure 30B:
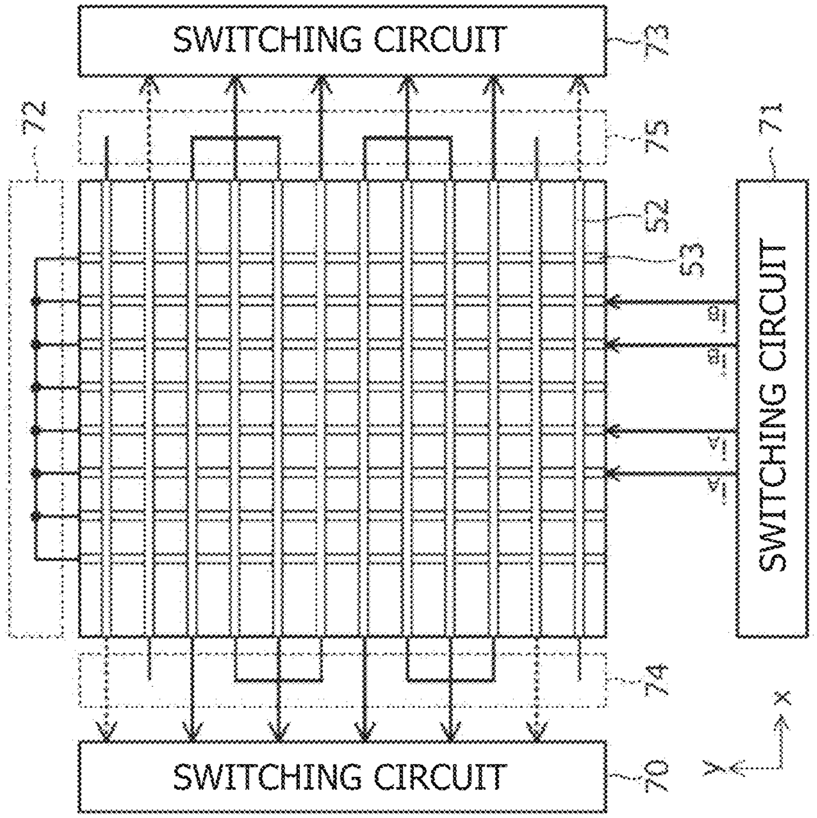
FIGS. 30A and 30B are block diagrams illustrating the manner in which the sensor controller that has entered a first mode controls the switching circuits in the computer according to the third embodiment.
Figure 30A:
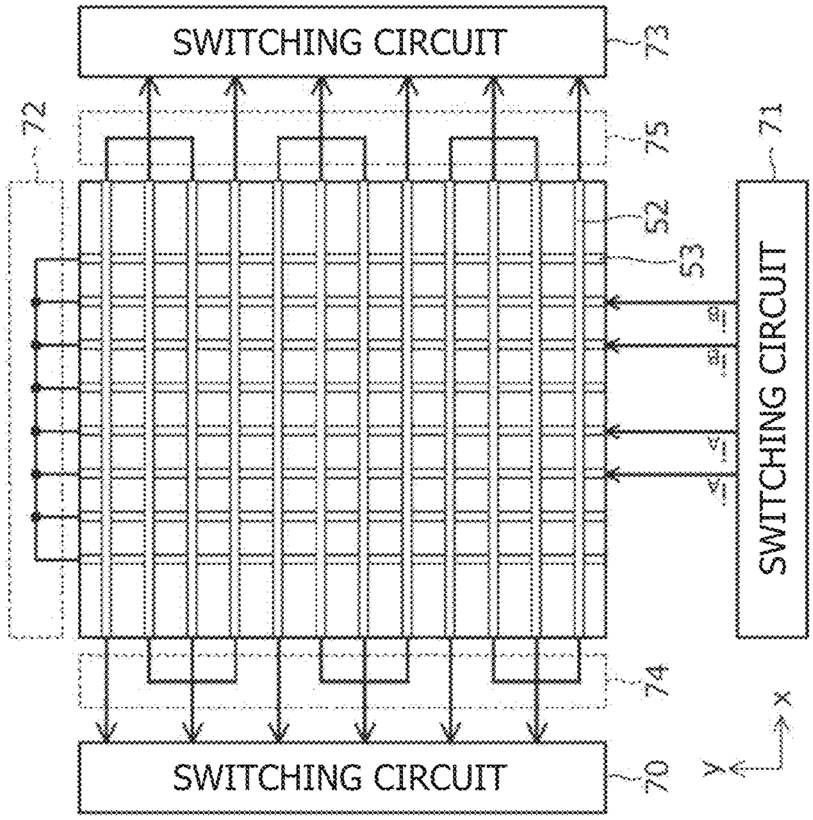

FIGS. 29, 30A, and 30B illustrate in block form the manner in which the sensor controller 4 controls the switching circuits in the computer 1 according to the third embodiment. FIG. 29 illustrates in block form the manner in which the sensor controller 4 that has entered a second mode controls the switching circuits, and FIGS. 30A and 30B illustrate in block form the manner in which the sensor controller 4 that has entered a first mode controls the switching circuits. In FIGS. 29, 30A, and 30B, the linear electrodes 52 and 53 are depicted as simple rectangular shapes for an easier understanding. However, the linear electrodes 52 and 53 are actually shaped as a mesh.

As illustrated in FIG. 29, the sensor controller 4 that has entered the second mode turns off all of the switches illustrated in FIG. 28 by initially controlling the switching circuits 72, 74, and 75. Therefore, all of the ends of the linear electrodes 53 that are not connected to the switching circuit 71 and the ends of the linear electrodes 53 that are not connected to the switching circuits 70 and 73 are rendered open.

Then, the sensor controller 4 controls the switching circuit 71 to select adjacent seven linear electrodes 53 and controls the switching circuits 70 and 73 to connect the ends of the linear electrodes 52 to an operational amplifier 70*b* (see FIGS. 6A and 6B). The switching circuit 71 controlled by the sensor controller 4 selects the indicated seven linear electrodes 53 and supplies transmission signals Tx<0> through Tx<6> to the linear electrodes 53. While the switching circuit 71 is supplying the transmission signals Tx<0> through Tx<6> to the linear electrodes 53, the sensor controller 4 acquires signals output from the switching circuits 70 and 73 based on the respective linear electrodes 52 as reception signals Rx from the linear electrodes 52 and derives capacitances at the crossings between the linear electrode 52 and the seven linear electrodes 53 that have been selected by performing the arithmetic operation expressed by the equation (4) referred to above.

The sensor controller 4 repeatedly performs the above process while changing linear electrodes 53 to be selected by the switching circuit 71 until the selection of all the linear electrodes 53 is completed. When the repetition of the process is finished, the sensor controller 4 has acquired the capacitances at the crossings between the linear electrodes 52 and the linear electrodes 53. The sensor controller 4 now derives a distribution on the panel surface of the capacitances thus acquired and then derives the position of the finger F on the basis of the derived distribution.

Then, as illustrated in FIGS. 30A and 30B, the sensor controller 4 that has entered the first mode initially controls the switching circuits 72, 74, and 75 to establish the state illustrated in FIG. 30A. Specifically, the sensor controller 4 controls the switching circuit 72 to connect all of adjacent twos of the linear electrodes 53 to each other and controls the switching circuits 74 and 75 to connect every two of the linear electrodes 52 to each other. After the switching circuits 74 and 75 have been controlled, the every two of the linear electrodes 52 that have been connected to each other have made up a loop coil.

Then, the sensor controller 4 controls the switching circuit 71 to select one of the linear electrodes 53 and controls the switching circuits 70 and 73 to connect both ends of each loop coil to a differential amplifier 70*a* (see FIGS. 6A and 6B). The switching circuit 71 controlled by the sensor controller 4 selects the indicated linear electrode 53 and supplies alternating currents $i_A$ to two linear electrodes 53 adjacent to one side of the selected linear electrode 53 and alternating currents $i_B$ to two linear electrodes 53 adjacent to the other side of the selected linear electrode 53. Immediately after having supplied the alternating currents $i_A$ and $i_B$, the sensor controller 4 acquires signals output from the switching circuits 70 and 73 per every loop coil, as reception signals Rx at the respective loop coils.

Then, the sensor controller 4 controls the switching circuits 74 and 75 to establish the state illustrated in FIG. 30B. Specifically, the sensor controller 4 controls the switching circuits 74 and 75 to change linear electrodes 52 to be connected to each other. Now, loop coils are formed at positions shifted one loop from those positions illustrated in FIG. 30A. Thereafter, the sensor controller 4 performs the same process as the process described above, acquiring reception signals Rx at the respective loop coils.

The sensor controller 4 repeatedly performs the above process while changing linear electrodes 53 to be selected by the switching circuit 71 until the selection of all the linear electrodes 53 except two linear electrodes 53 at each of the ends in the x-direction is completed. When the repeated process is finished, the sensor controller 4 has acquired the reception signals Rx at the loop coils from the respective linear electrodes 53. The sensor controller 4 now derives a distribution on the panel surface of the signal intensities of the reception signals Rx thus acquired and then derives the position of the electromagnetic resonance stylus P on the basis of the derived distribution.

The computer 1 according to the third embodiment offers the following advantages. Since the switching circuits 72, 74, and 75 are disposed in the display layer 10 within the display area A1, attempts to reduce the size of the bezel area A2 are not obstructed and the circuit scale of the sensor controller 4 is prevented from increasing while, at the same time, the positions of both the finger F and the electromagnetic resonance stylus P can be detected. The switching circuits 70, 71, and 73 may also be disposed in the display layer 10 within the display area A1 for thereby enhancing the advantages described above.

A computer 1 according to a fourth embodiment of the present disclosure will be described below. The computer 1 according to the fourth embodiment is different from the computer 1 according to the third embodiment in that the linear electrodes 52 and 53 are angularly spaced 90°, that switching circuits 74 and 75 are connected to linear electrodes 53, not linear electrodes 52, and as to the internal configurations of the switching circuits 72 through 75. Since the computer 1 according to the fourth embodiment is identical to the computer 1 according to the third embodiment as to other points, those different features of the computer 1 according to the fourth embodiment will be described below.

Figure 31:
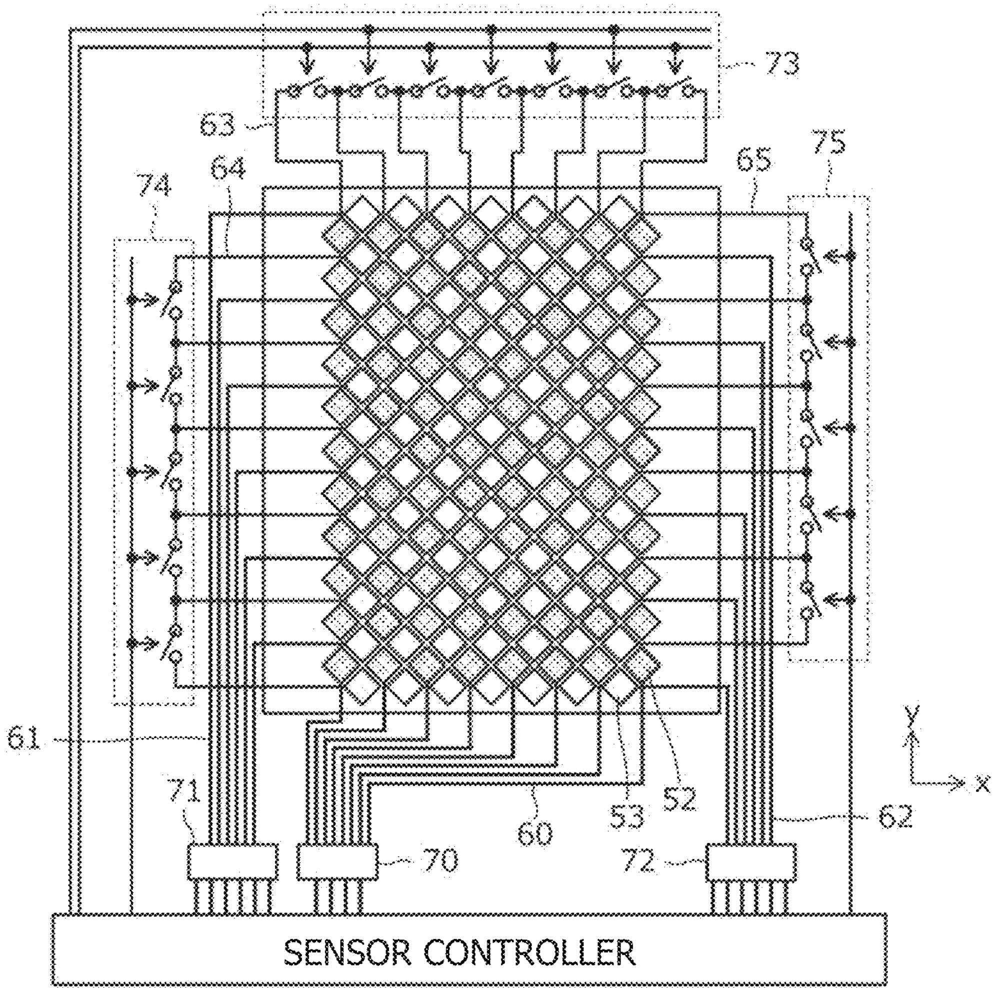
FIG. 31 is a circuit diagram illustrating the configuration of an organic EL display and the internal configurations of switching circuits according to a fourth embodiment of the present disclosure.

FIG. 31 illustrates the configuration of an organic EL display 2 and the internal configurations of switching circuits 73 through 75 according to the fourth embodiment. According to the fourth embodiment, the switching circuits 70 through 72 are disposed in the circuit layer 11 within the bezel area A2. The switching circuits 73 through 75 are disposed in the circuit layer 11 within the display area A1. However, all of the switching circuits 70 through 75 may be disposed in the circuit layer 11 within the display area A1.

As illustrated in FIG. 31, the linear electrodes 53 according to the fourth embodiment have ends in the x-direction that are alternately connected to the switching circuit 71 and the switching circuit 74. The other ends in the x-direction of the linear electrodes 53 are alternately connected to the switching circuit 72 and the switching circuit 75. More specifically, the linear electrodes 53 whose ends in the x-direction are connected to the switching circuit 71 have the other ends in the x-direction connected to the switching circuit 75, and the linear electrodes 53 whose ends in the x-direction are connected to the switching circuit 74 have the other ends in the x-direction connected to the switching circuit 72. The alternate connections make it possible to equalize the widths of the both sides of the bezel area A2 in the x-direction.

The linear electrodes 53 and the switching circuit 71 are connected to each other by routing paths 61, and the linear electrodes 53 and the switching circuit 74 are connected to each other by routing paths 64. The linear electrodes 53 and the switching circuit 72 are connected to each other by routing paths 62, and the linear electrodes 53 and the switching circuit 75 are connected to each other by routing paths 65. Since the switching circuits 74 and 75 are disposed in the circuit layer 11 within the display area A1, the routing paths 64 and 65 extend from an upper side of an encapsulation layer 13 to a lower side thereof over and around dams 44 (see FIG. 2) in and along the edge portion of the encapsulation layer 13, thereby enclosing the dams 44.

The linear electrodes 52 have ends remote in the y-direction from the switching circuit 73 that are connected to the switching circuit 70 and other ends remote in the y-direction from the switching circuit 70 that are connected to the switching circuit 73. The linear electrodes 52 and the switching circuit 70 are connected to each other by routing paths 60, and the linear electrodes 52 and the switching circuit 73 are connected to each other by routing paths 63. Since the switching circuit 73 is disposed in the circuit layer 11 within the display area A1, the routing path 63 extends from the upper side of the encapsulation layer 13 to the lower side thereof over and around the dams 44 (see FIG. 2) in and along the edge portion of the encapsulation layer 13, thereby enclosing the dams 44.

The switching circuit 72 according to the fourth embodiment is similar in configuration to and separate from the switching circuit 71 and is capable of performing similar processes to those performed by the switching circuit 71. Specifically, the switching circuit 72 includes drive circuits 110 and 111 and a selection circuit 112 (see FIG. 5) similar to those of the switching circuit 71, and is controlled by the sensor controller 4 to switch between the drive circuits to be used and also between the connection destinations for each of the linear electrodes 53 in a time-division multiplex fashion for supply currents and applying voltages to the linear electrodes 53.

The switching circuit 73 according to the fourth embodiment does not have reception circuits and a selection circuit unlike the switching circuit 73 according to the third embodiment, and is constructed of a simple set of switches. Specifically, the switching circuit 73 includes a plurality of single-pole single-throw switches each connected between the ends in the y-direction of adjacent two of the linear electrodes 53. The switching circuit 73 is configured so as to be able to control their switches to be turned on and off with alternately different control signals supplied thereto.

The switching circuit 74 according to the fourth embodiment includes a plurality of single-pole single-throw switches each connected between the ends remote from the switching circuit 75 in the x-direction of adjacent two of the linear electrodes 53. Similarly, the switching circuit 75 includes a plurality of single-pole single-throw switches each connected between the ends remote from the switching circuit 74 in the x-direction of adjacent two of the linear electrodes 53. The switching circuits 74 and 75 are configured so as to be able to simultaneously control all of their switches to be turned on and off with a control signal supplied thereto.

Figure 32:
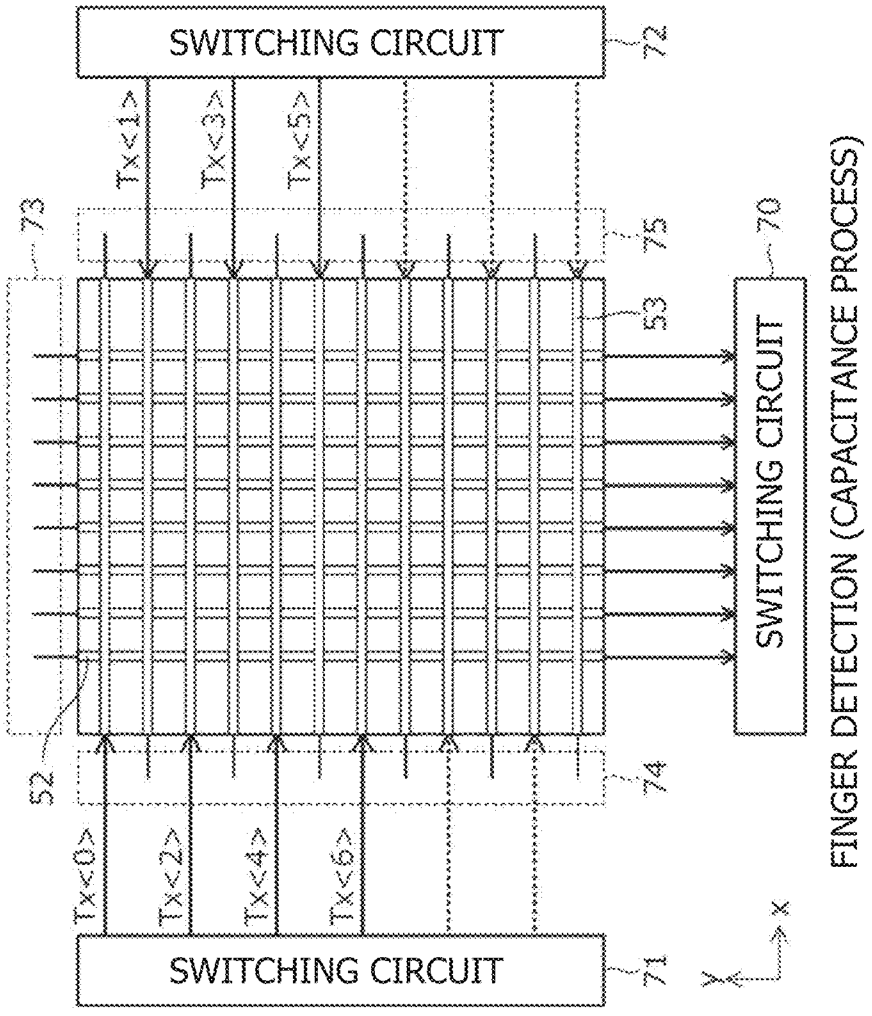
FIG. 32 is a block diagram illustrating the manner in which a sensor controller that has entered a second mode controls the switching circuits in a computer according to the fourth embodiment.

FIGS. 32 through 34A and 34B illustrate in block form the manner in which the sensor controller 4 controls the switching circuits in the computer 1 according to the fourth embodiment. FIG. 32 illustrates the manner in which the sensor controller 4 that has entered a second mode controls the switching circuits, and FIGS. 33A, 33B 34A, and 34B illustrates the manner in which the sensor controller 4 that has entered a first mode controls the switching circuits. In FIGS. 32 through 34B, the linear electrodes 52 and 53 are depicted as simple rectangular shapes for an easier understanding. However, the linear electrodes 52 and 53 are actually shaped as a mesh.

As illustrated in FIG. 32, the sensor controller 4 that has entered the second mode initially controls the switching circuits 73 through 75 to turn off all of the switches illustrated in FIG. 31. Therefore, all of the ends of the linear electrodes 53 that are not connected to the switching circuits 71 and 72 and the ends of the linear electrodes 52 that are not connected to the switching circuit 70 are rendered open.

Then, the sensor controller 4 controls the switching circuits 71 and 72 to select adjacent seven linear electrodes 53 and controls the switching circuit 70 to connect the ends of the linear electrodes 52 to an operational amplifier 70*b* (see FIGS. 6A and 6B). The switching circuits 71 and 72 controlled by the sensor controller 4 selects the indicated seven linear electrodes 53 and supplies transmission signals Tx<0> through Tx<6> to the linear electrodes 53. According to the fourth embodiment, since the linear electrodes 52 are alternately connected to the switching circuits 71 and 72, the transmission signals Tx<0> through Tx<6> are alternately output from the switching circuits 71 and 72. While the switching circuits 71 and 72 are supplying the transmission signals Tx<0> through Tx<6> to the linear electrodes 53, the sensor controller 4 acquires signals output from the switching circuit 70 based on the respective linear electrodes 52 as reception signals Rx from the linear electrodes 52 and derives capacitances at the crossings between the linear electrode 52 and the seven linear electrodes 53 that have been selected by performing the arithmetic operation expressed by the equation (4) referred to above.

The sensor controller 4 repeatedly performs the above process while changing linear electrodes 53 to be selected by the switching circuits 71 and 72 until the selection of all the linear electrodes 53 is completed. When the repeated process is finished, the sensor controller 4 has acquired the capacitances at the crossings between the linear electrodes 52 and the linear electrodes 53. The sensor controller 4 now derives a distribution on the panel surface of the capacitances thus acquired and then derives the position of the finger F on the basis of the derived distribution.

Figure 33B:
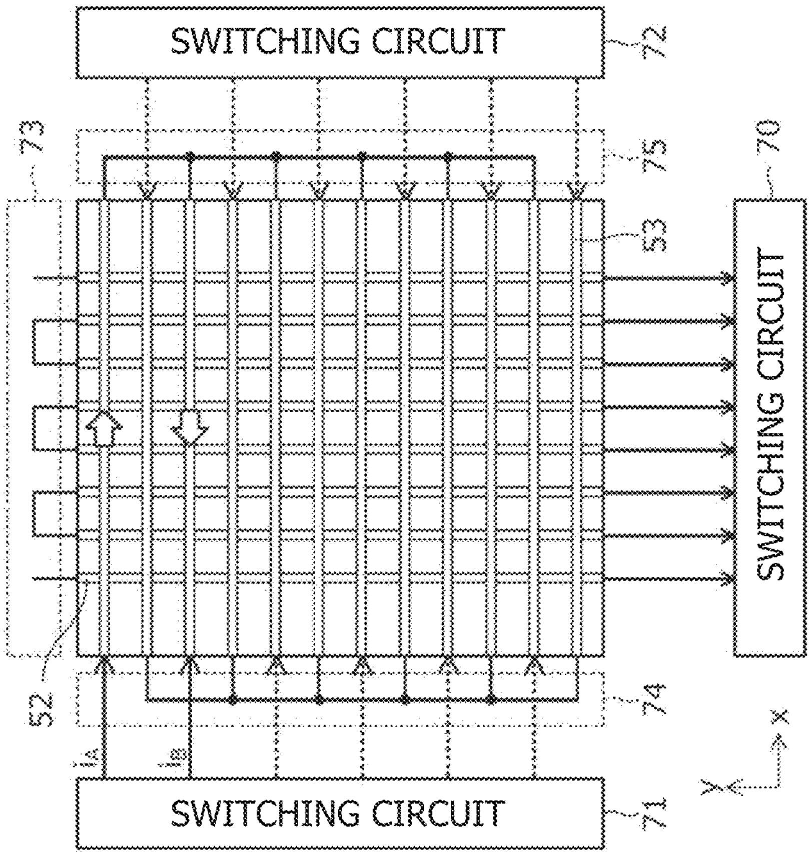
FIGS. 33A and 33B are block diagrams illustrating the manner in which the sensor controller that has entered a first mode controls the switching circuits in the computer according to the fourth embodiment.
Figure 33A:
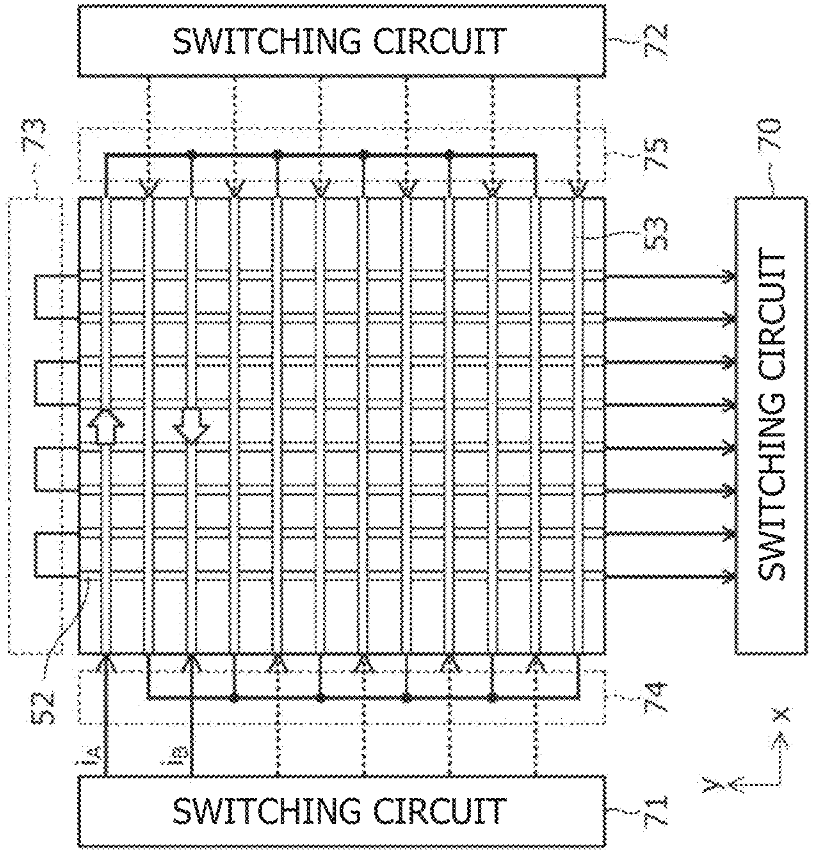

As illustrated in FIGS. 33A, 33B, 34A, and 34B, the sensor controller 4 that has entered the first mode controls the switching circuits 73 through 75 to establish the state illustrated in FIG. 33A. Specifically, the sensor controller 4 controls the switching circuit 73 to connect every two of the linear electrodes 52 to each other and controls the switching circuits 74 and 75 to connect all of the linear electrodes 53 to each other. After the switching circuit 73 has been controlled, the every two of the linear electrodes 52 that have been connected to each other have made up a loop coil.

Then, the sensor controller 4 controls the switching circuit 71 to select one of the linear electrodes 53 that is not connected to itself and controls the switching circuit 70 to connect both ends of each loop coil to a differential amplifier 70*a* (see FIGS. 6A and 6B). The switching circuit 71 controlled by the sensor controller 4 selects the indicated linear electrode 53 and supplies an alternating current $i_A$ to a linear electrode 53 adjacent to one side of the selected linear electrode 53 and an alternating current $i_B$ to a linear electrode 53 adjacent to the other side of the selected linear electrode 53. Immediately after having supplied the alternating currents $i_A$ and $i_B$, the sensor controller 4 acquires signals output from the switching circuit 70 per every loop coil, as reception signals Rx at the respective loop coils.

Then, the sensor controller 4 controls the switching circuit 73 to establish the state illustrated in FIG. 33B. Specifically, the sensor controller 4 controls the switching circuit 73 to change linear electrodes 52 to be connected to each other. Now, loop coils are formed at positions shifted one loop from those positions illustrated in FIG. 33A. Thereafter, the sensor controller 4 performs the same process as the process described above, acquiring reception signals Rx at the respective loop coils.

Figure 34B:
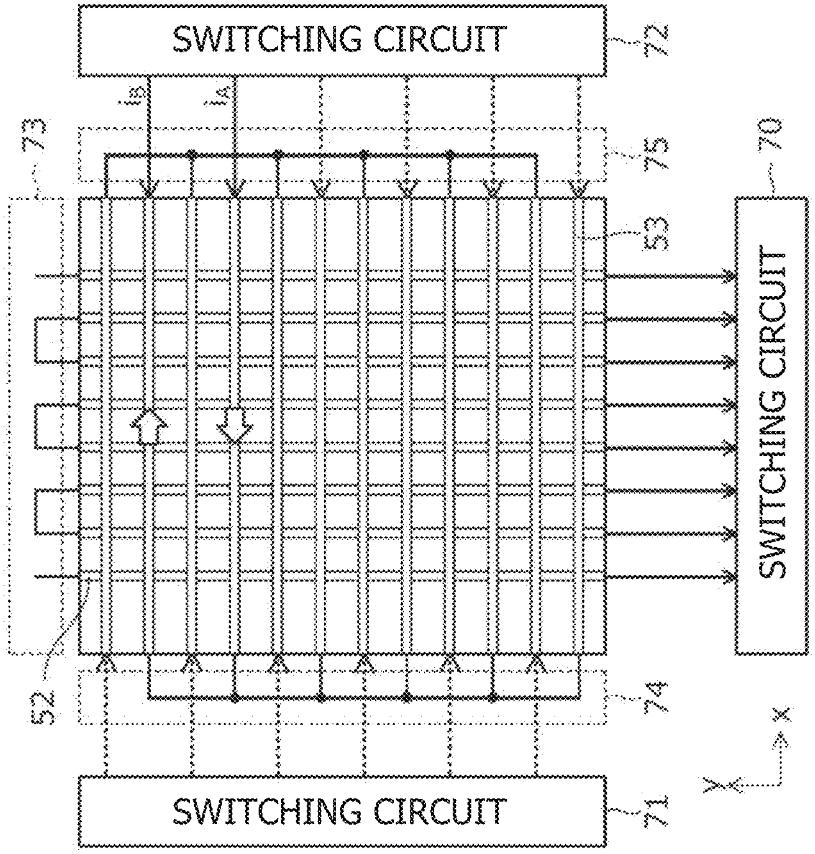
FIGS. 34A and 34B are block diagrams illustrating the manner in which the sensor controller that has entered the first mode controls the switching circuits in the computer according to the fourth embodiment.
Figure 34A:
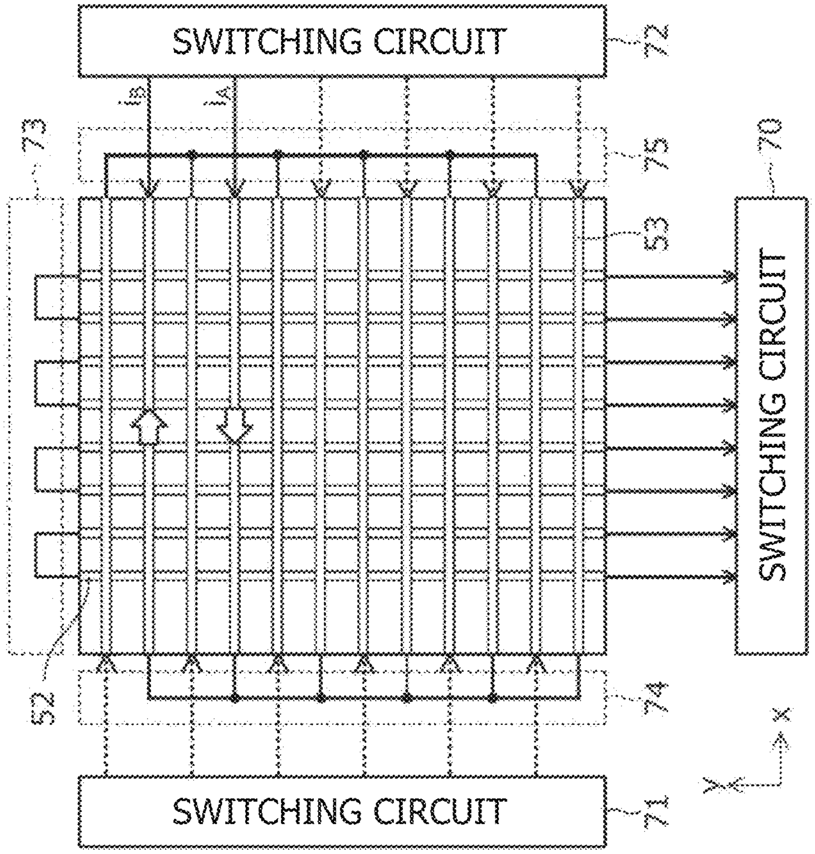
Figure 35B:
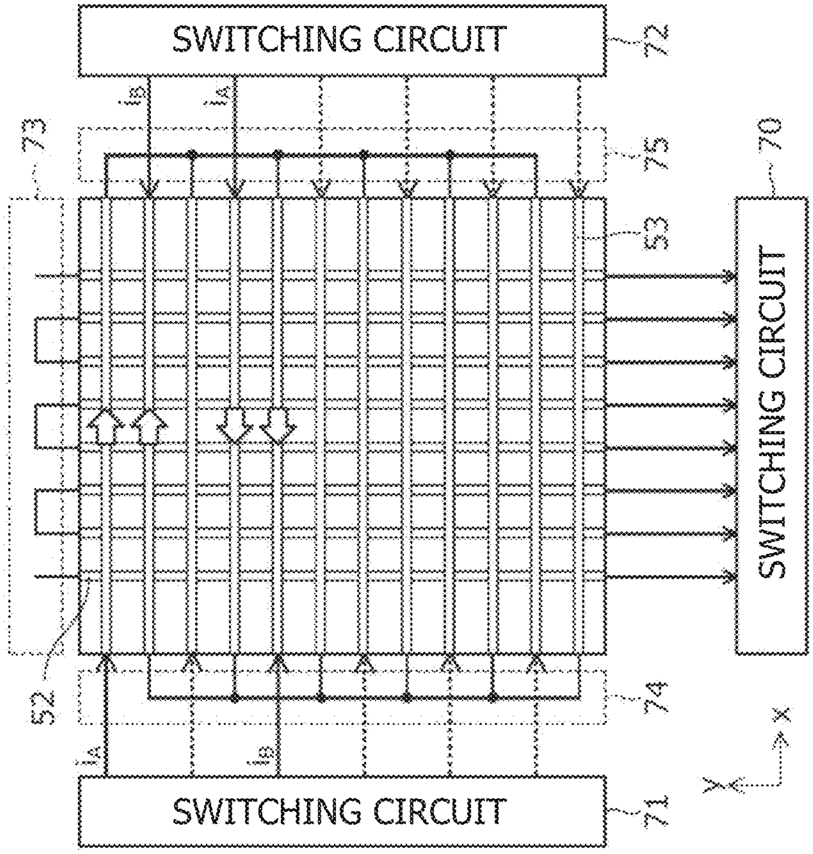
FIGS. 35A and 35B are block diagrams illustrating the manner in which a sensor controller that has entered a first mode controls switching circuits in a computer according to a modification of the fourth embodiment.
Figure 35A:
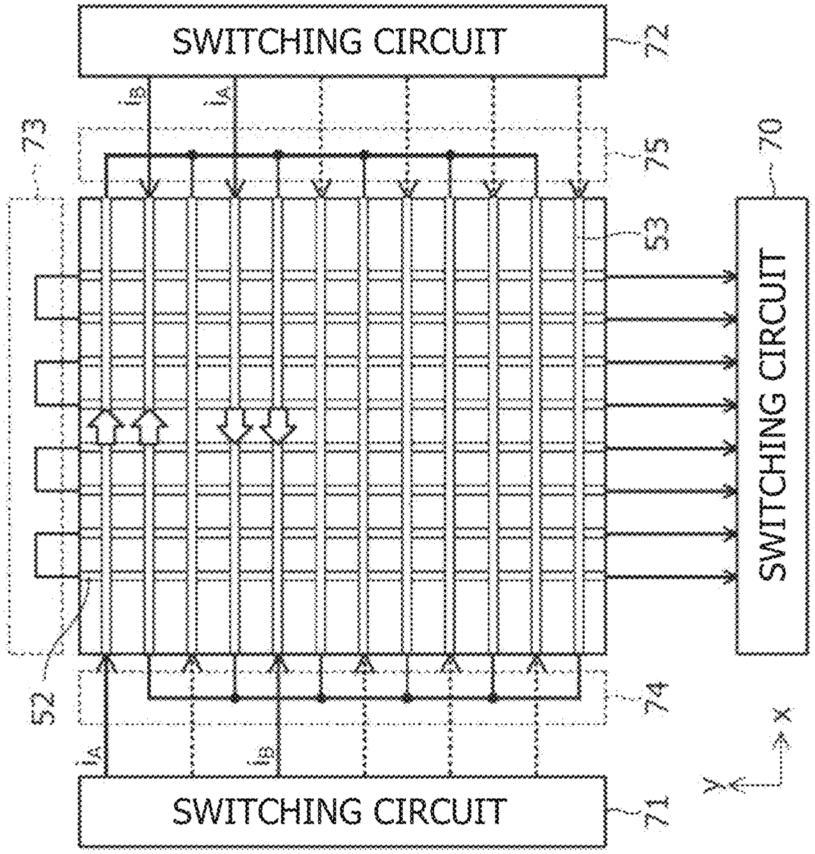
Figure 36B:
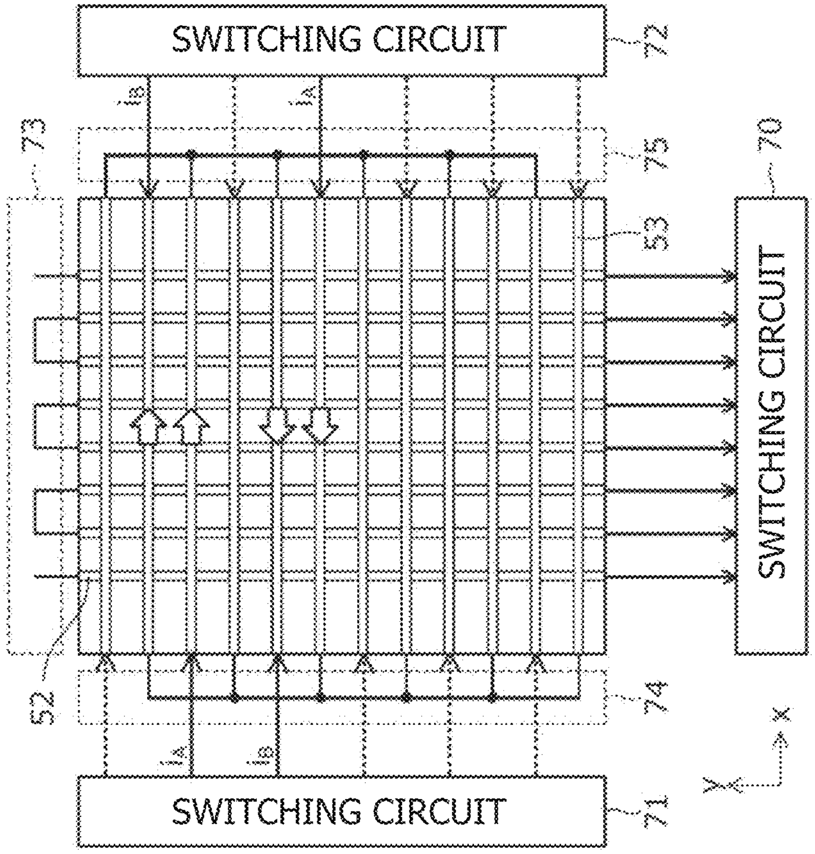
FIGS. 36A and 36B are block diagrams illustrating the manner in which the sensor controller that has entered the first mode controls the switching circuits in the computer according to the modification of the fourth embodiment.
Figure 36A:
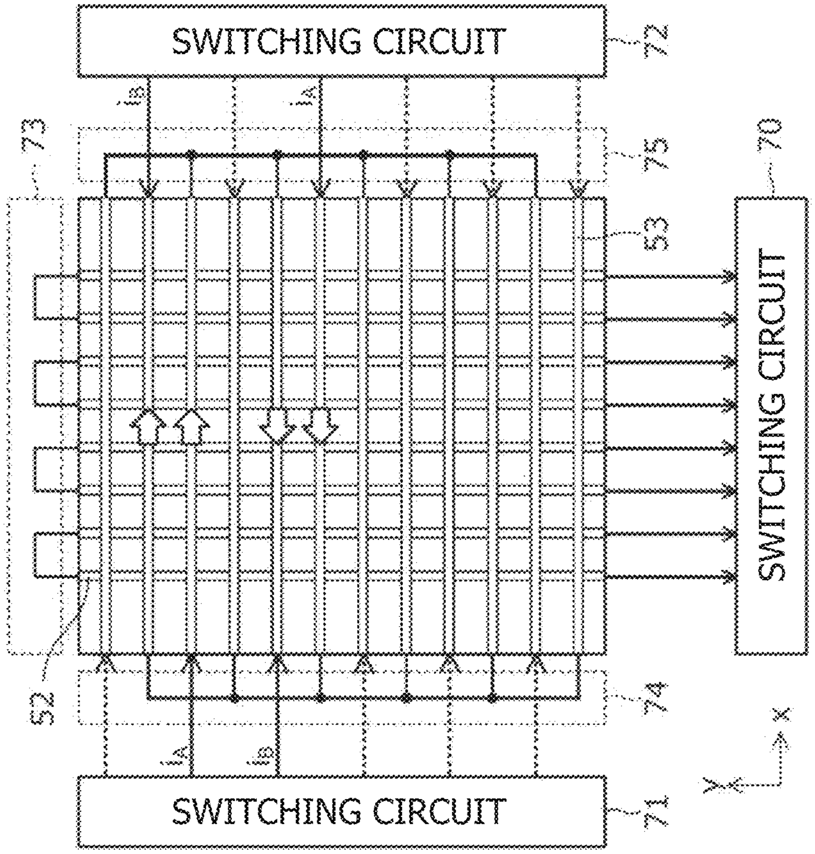

Then, the sensor controller 4 controls the switching circuit 73 to establish the state illustrated in FIG. 34A. The switching circuit 73 is thus in the same state as the state illustrated in FIG. 33A. Then, the sensor controller 4 controls the switching circuit 72 to select one of the linear electrodes 53 that is not connected to itself. The switching circuit 72 controlled by the sensor controller 4 selects the indicated linear electrode 53 and supplies an alternating current $i_A$ to a linear electrode 53 adjacent to one side of the selected linear electrode 53 and an alternating current $i_B$ to a linear electrode 53 adjacent to the other side of the selected linear electrode 53. Immediately after having supplied the alternating currents $i_A$ and $i_B$, the sensor controller 4 acquires signals output from the switching circuits 70 and 73 per every loop coil, as reception signals Rx at the respective loop coils.

Then, the sensor controller 4 controls the switching circuit 73 to establish the state illustrated in FIG. 34B. Specifically, the sensor controller 4 controls the switching circuit 73 to change linear electrodes 52 to be connected to each other. The switching circuit 73 is thus in the same state as the state illustrated in FIG. 33B. Thereafter, the sensor controller 4 performs the same process as described above to acquire reception signals Rx at the respective loop coils.

The sensor controller 4 repeatedly performs the above process while changing linear electrodes 53 to be selected by the switching circuit 71 or 72 until the selection of all the linear electrodes 53 except one linear electrode 53 at each of opposite ends in the y-direction is completed. When the repeated process is finished, the sensor controller 4 has acquired the reception signals Rx at the respective loop coils from the linear electrodes 53. The sensor controller 4 now derives a distribution on the panel surface of the signal intensities of the reception signals Rx thus acquired and then derives the position of the electromagnetic resonance stylus P on the basis of the derived distribution.

The computer 1 according to the fourth embodiment is advantageous as follows. Since the switching circuits 73 through 75 are disposed in the display layer 10 within the display area A1, attempts to reduce the size of the bezel area A2 are not obstructed and the circuit scale of the sensor controller 4 is prevented from increasing while, at the same time, the positions of both the finger F and the electromagnetic resonance stylus P can be detected. The switching circuits 70 through 72 may also be disposed in the display layer 10 within the display area A1 for thereby enhancing the advantages described above.

FIGS. 35A, 35B, 36A, and 36B illustrate in block form the manner in which a sensor controller 4 that has entered a first mode controls switching circuits in a computer 1 according to a modification of the fourth embodiment. The sensor controller 4 according to the modification is different from the sensor controller 4 according to the fourth embodiment in that it controls switching circuits 71 and 72 to supply alternating currents $i_A$ and $i_B$ simultaneously to four linear electrodes 53. Specifically, the sensor controller 4 according to the modification supplies the alternating current $i_A$ to two linear electrodes 53 adjacent to one side of a selected linear electrode 53 and the alternating current $i_B$ to two linear electrodes 53 adjacent to the other side of the selected linear electrode 53. As a consequence, two linear electrodes 53 each on both sides in the y-direction are unable to transmit alternating magnetic fields, whereas each of the other linear electrodes 53 is able to transmit an alternating magnetic field at a stronger intensity.

A computer 1 according to a fifth embodiment of the present disclosure will be described below. The computer 1 according to the fifth embodiment is different from the computer 1 according to the second embodiment in that it further includes a plurality of linear electrodes 54 and a switching circuit 76, a switching circuit 72 is disposed in the bezel area A2, and linear electrodes 52 do not make up loop coils. Since the computer 1 according to the fifth embodiment is identical to the computer 1 according to the second embodiment as to other points, those different features of the computer 1 according to the fifth embodiment will be described below.

Figure 37:
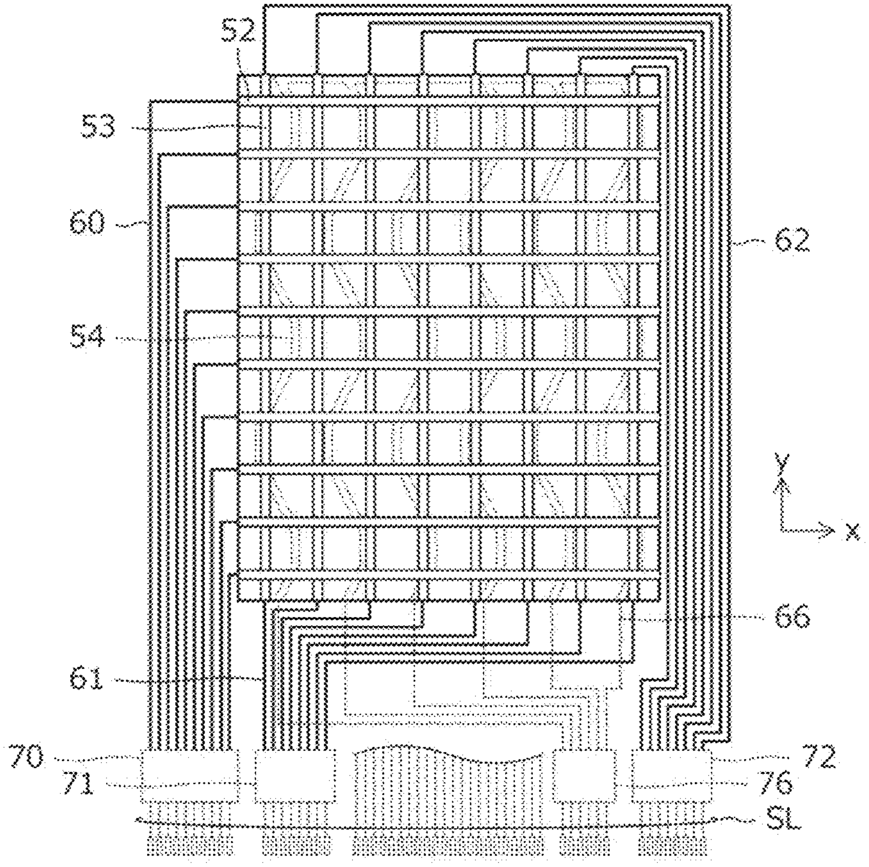
FIG. 37 is a plan view of a sensor layer according to a fifth embodiment of the present disclosure.
Figure 38:
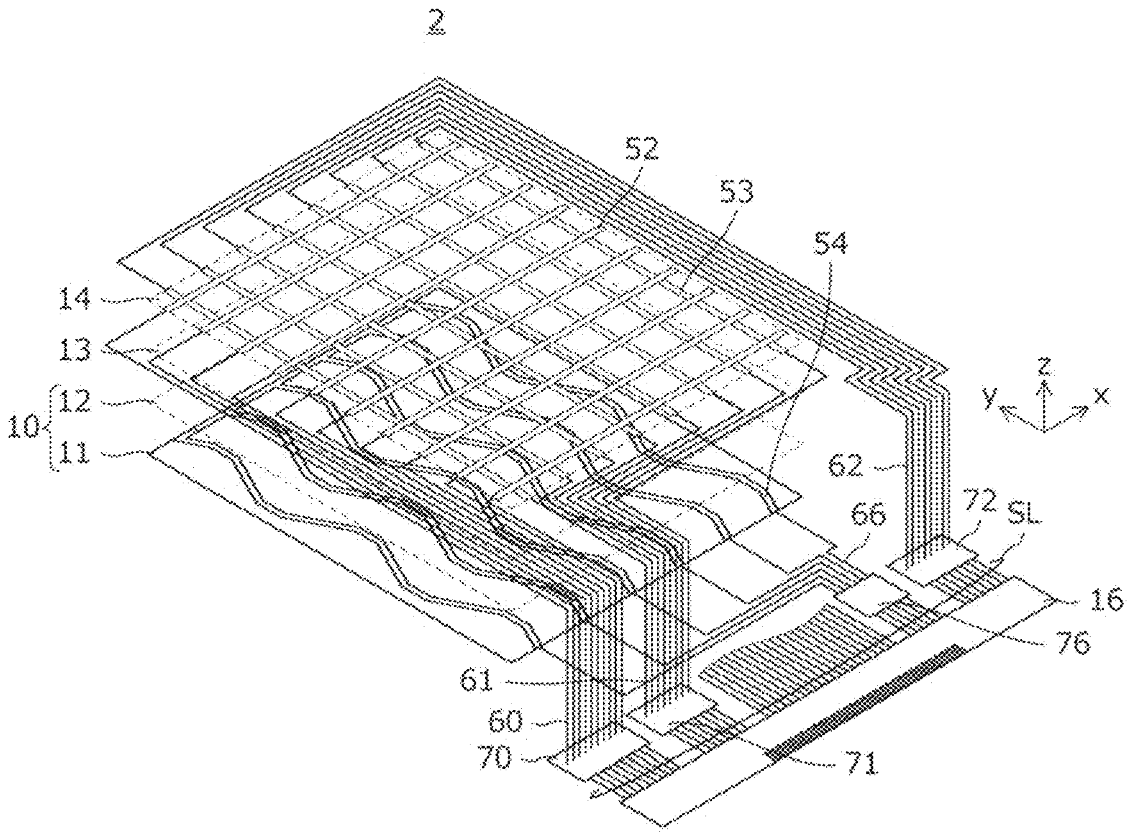
FIG. 38 is a perspective view of an organic EL display according to the fifth embodiment.

FIG. 37 is a plan view of a sensor layer 14 according to the fifth embodiment. FIG. 38 illustrates in perspective an organic EL display 2 according to the fifth embodiment. In FIG. 37, some structural details of a circuit layer 11 and lines SL are depicted in broken lines. In FIG. 38, the positions of the organic EL layer 12 and an encapsulation layer 13 are depicted in broken lines, and some structural details of the circuit layer 11 are depicted. In FIGS. 37 and 38, only ten linear electrodes 52, eight linear electrodes 53, and six linear electrodes 54 are depicted for illustrative purposes. Actually, however, the sensor layer 14 has more linear electrodes 52 through 54.

As illustrated in FIGS. 37 and 38, the organic EL display 2 according to the fifth embodiment has a plurality of linear electrodes 54 as well as a plurality of linear electrodes 52 and a plurality of linear electrodes 53. Each of the linear electrodes 54 is made of a linear solid conductor extending tortuously generally in the y-direction. The linear electrodes 54 are fabricated on the upper surface of a planarizing insulating film 24 by the same process as with anode electrodes 31 (see FIG. 2) of light-emitting elements 30.

Figure 39:
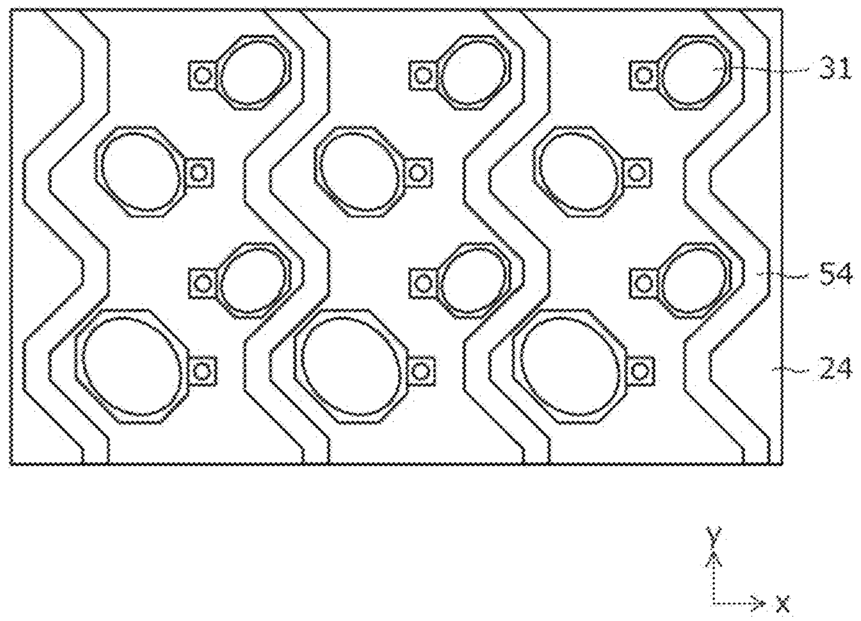
FIG. 39 is a plan view illustrating an upper surface of a planarizing insulating film of the organic EL display according to the fifth embodiment.

FIG. 39 is a plan view of the upper surface of the planarizing insulating film 24 of the organic EL display 2 according to the fifth embodiment. As illustrated in FIG. 39, the anode electrodes 31 are arranged in a matrix on the upper surface of the planarizing insulating film 24. The linear electrodes 54 extend tortuously to avoid the anode electrodes 31 laid out in the matrix.

Referring back to FIGS. 37 and 38, the ends of the linear electrodes 54 close to a terminal area 16 are connected through routing paths 66 to the switching circuit 76, and the other ends thereof are connected to each other. According to the fifth embodiment, the switching circuit 76, not a switching circuit 71, generates and supplies alternating currents $i_A$ and $i_B$ to the linear electrodes 54. Therefore, alternating magnetic fields for detecting the position of the electromagnetic resonance stylus P are transmitted from the linear electrodes 54. The linear electrodes 53 are not supplied with the alternating currents $i_A$ and $i_B$, and a switching circuit 70 supplies only transmission signals Tx<0> through Tx<6> for detecting the position of the finger F to the linear electrodes 53. The switching circuit 72 may include only a set of switches similar to those of the switching circuit 72 according to the second embodiment, or may supply the linear electrodes 53 with transmission signals Tx<0> through Tx<6> identical in nature to those from the switching circuit 71, as is the case with the switching circuit 72 according to the first embodiment.

With the computer 1 according to the fifth embodiment, as with the first through fourth embodiments, the sensor controller 4 is able to detect the positions of the electromagnetic resonance stylus P and the finger F and to acquire data transmitted from the electromagnetic resonance pen P. Moreover, with the computer 1 according to the fifth embodiment, it is possible for the linear electrodes 54 that transmit alternating magnetic fields for detecting the position of the electromagnetic resonance stylus P to be disposed in the display layer 10, not the sensor layer 14.

Although the preferred embodiments of the present disclosure have been descried above, the present disclosure is not limited to the details of the preferred embodiments, and various changes and modifications may be made therein without departing from the scope of the disclosure.

What is claimed is:

1. A display, comprising:

a display layer including a group of light-emitting elements disposed in a display area and a group of pixel drive circuits for turning on and off the light-emitting elements;

an encapsulation layer encapsulating the display layer;

a group of linear electrodes disposed on the encapsulation layer;

a group of routing paths having first ends connected to the linear electrodes;

a switching circuit disposed in the display layer within the display area and connected to second ends of the routing paths, for switching between a first mode in which the linear electrodes are used to detect induced currents and a second mode in which the linear electrodes are used to detect capacitances;

a group of first drive lines to be supplied with first drive signals from a sensor controller; and a group of second drive lines to be supplied with second drive signals that are in opposite phase to the first drive signals from the sensor controller;

wherein the switching circuit includes a selection circuit for switching connections between the first drive lines and the routing paths;

the selection circuit connects either the first drive lines or the second drive lines to the routing paths; and the first drive lines and the second drive lines extend in the same layer as data lines which supply drive currents to the group of light-emitting elements.

2. The display according to claim 1, wherein the group of linear electrodes includes a plurality of linear electrodes extending in a first direction, the routing paths extend in the first direction, and the first drive lines and the second drive lines extend in a second direction which crosses the first direction.

3. The display according to claim 1, wherein the first drive lines and the second drive lines extend in the display area.

4. The display according to claim 1, wherein the first drive lines and the second drive lines extend outside of the display area.

5. The display according to claim 1, wherein the routing paths extend from an upper side to a lower side of the encapsulating layer to enclose dams which form an edge portion of the encapsulation layer.

6. The display according to claim 1, wherein the first drive signals include alternating signals.

7. The display according to claim 1, wherein the first drive signals include signals generated by a switch being turned on and off.

8. The display according to claim 1, further comprising:

a reference line extending at second ends of the linear electrodes, wherein the switching circuit includes a circuit for switching connections between the reference line and the linear electrodes.

9. The display according to claim 1, wherein the group of linear electrodes includes a plurality of first linear electrodes to be supplied with alternating currents or voltage signals, and the switching circuit includes a circuit for connecting first ends of the first linear electrodes to each other when the first linear electrodes are supplied with the alternating currents and disconnecting the first ends of the first linear electrodes from each other when the first linear electrodes are supplied with the voltage signals.

10. The display according to claim 9, further comprising:

a terminal area for connecting the group of linear electrodes to the sensor controller, wherein the switching circuit extends along an edge of the display area that is opposite from the terminal area.

11. The display according to claim 1, wherein the group of linear electrodes includes a plurality of first linear electrodes extending in a first direction, the switching circuit includes a first switching circuit disposed at first ends of the first linear electrodes, a second switching circuit disposed at second ends of the first linear electrodes, a third switching circuit disposed at the first ends of the first linear electrodes, and a fourth switching circuit disposed at the second ends of the first linear electrodes, the first ends of the first linear electrodes are alternately connected to the first switching circuit and the third switching circuit, and the second ends of the first linear electrodes are alternately connected to the second switching circuit and the fourth switching circuit.

12. The display according to claim 11, wherein the first switching circuit has a plurality of single-pole single-throw switches connected between the first ends of adjacent twos of the first linear electrodes, to which the first switching circuit is connected, and the second switching circuit has a plurality of single-pole single-throw switches connected between the second ends of adjacent twos of the first linear electrodes, to which the second switching circuit is connected.

13. The display according to claim 11, wherein the third switching circuit and the fourth switching circuit include circuits for extracting induced currents or voltage signals from the first linear electrodes.

14. The display according to claim 11, wherein the third switching circuit and the fourth switching circuit include circuits for generating and supplying alternating currents or voltage signals to the first linear electrodes.

15. The display according to claim 1, wherein the switching circuit includes a group of drive circuits for generating and supplying, to the linear electrodes, alternating currents or voltage signals depending on phase setting values supplied from the sensor controller, and the sensor controller supplies the phase setting values to the drive circuits by supplying the drive circuits with first data signals that are activated when the phase setting values represent 0° and second data signals that are activated when the phase setting values represent 180°.

16. The display according to claim 15, wherein the drive circuits are configured to be operable in a bootstrapping mode for reducing gate potentials of low-side P-channel metal-oxide semiconductor field effect transistors at output stages to a level which is lower than a low level.

17. A display, comprising:

a display layer including a group of light-emitting elements disposed in a display area and a group of pixel drive circuits for turning on and off the light-emitting elements;

a group of linear electrodes superposed on the display layer; and a group of drive circuits disposed in the display layer for driving the linear electrodes, wherein the drive circuits are formed of one or more metal-oxide semiconductor field effect transistors all of the same channel type; and the drive circuits are configured to be operable in a bootstrapping mode for reducing gate potentials of low-side P-channel metal-oxide semiconductor field effect transistors at output stages to a level lower than a low level.

18. The display according to claim 17, wherein the drive circuits include circuits for generating and supplying, to the linear electrodes, alternating currents or voltage signals depending on phase setting values supplied from a sensor controller, and the sensor controller supplies the phase setting values to the drive circuits by supplying the drive circuits with first data signals that are activated when the phase setting values represent 0° and second data signals that are activated when the phase setting values represent 180°.

* * * * *